(12) United States Patent
Huang et al.

(10) Patent No.: US 11,929,905 B2
(45) Date of Patent: Mar. 12, 2024

(54) NETWORK TOPOLOGY DETERMINING METHOD AND APPARATUS, AND SYSTEM

(71) Applicant: HUAWEI TECHNOLOGIES CO., LTD., Shenzhen (CN)

(72) Inventors: Hualin Huang, Xi'an (CN); Zhenguang Chen, Xi'an (CN); Bo Wang, Dongguan (CN); Lu Yan, Dongguan (CN); Yi Yang, Xi'an (CN); Yaojun Fu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 465 days.

(21) Appl. No.: 17/337,694

(22) Filed: Jun. 3, 2021

(65) Prior Publication Data
US 2021/0297338 A1  Sep. 23, 2021

Related U.S. Application Data

(63) Continuation of application No. PCT/CN2019/126612, filed on Dec. 19, 2019.

(30) Foreign Application Priority Data

Dec. 27, 2018  (CN) .......................... 201811613944.0

(51) Int. Cl.
| | |
|---|---|
| *H04L 45/02* | (2022.01) |
| *H04L 12/42* | (2006.01) |
| *H04L 43/045* | (2022.01) |

(52) U.S. Cl.
CPC .............. *H04L 45/02* (2013.01); *H04L 12/42* (2013.01); *H04L 43/045* (2013.01)

(58) Field of Classification Search
CPC ....... H04L 45/02; H04L 12/42; H04L 43/045; H04L 45/03; H04L 45/033; H04L 45/036;
(Continued)

(56) References Cited

U.S. PATENT DOCUMENTS

| 2007/0201384 A1 | 8/2007 | Cunningham et al. |
| 2009/0316602 A1 | 12/2009 | Nandy et al. |
| (Continued) | | |

FOREIGN PATENT DOCUMENTS

| CN | 101754055 A | 6/2010 |
| CN | 102143007 A | 8/2011 |
| (Continued) | | |

OTHER PUBLICATIONS

Translation copy of CN 101483935A (Year: 2011).*
(Continued)

*Primary Examiner* — Ian N Moore
*Assistant Examiner* — Sun Jong Kim
(74) *Attorney, Agent, or Firm* — Rimon PC

(57) ABSTRACT

A network topology determining apparatus includes: an obtaining module, configured to obtain a connection relationship between a plurality of network elements in a network and a network grade of each network element, where the network grade is used to indicate an importance degree of the network element in the network; a first determining module, configured to determine a plurality of subnets based on the connection relationship between the plurality of network elements and the network grade of each network element; a second determining module, configured to determine location information of each network element in a descending order of the network grades of the network elements in the network based on a connection relationship between network elements in each subnet; and an establishment module, configured to establish a network topology based on the connection relationship between the plurality of network elements and the location information of each network element.

19 Claims, 26 Drawing Sheets

(58) Field of Classification Search
CPC ............. H04L 45/037; H04L 45/0377; H04W 40/246
See application file for complete search history.

(56) References Cited

U.S. PATENT DOCUMENTS

| | | | |
|---|---|---|---|
| 2011/0286337 | A1 | 11/2011 | Olsson |
| 2014/0003228 | A1* | 1/2014 | Shah ................. H04L 45/28 370/242 |
| 2014/0278273 | A1 | 9/2014 | Bowler et al. |
| 2017/0208377 | A1 | 7/2017 | Rajan et al. |

FOREIGN PATENT DOCUMENTS

| | | | |
|---|---|---|---|
| CN | 101483935 | B * | 11/2011 |
| CN | 103475513 | A | 12/2013 |
| CN | 103533102 | A | 1/2014 |
| CN | 103580897 | A | 2/2014 |
| CN | 103634147 | A | 3/2014 |
| CN | 104125154 | A | 10/2014 |
| CN | 105634763 | A * | 6/2016 |
| CN | 105634763 | A | 6/2016 |
| CN | 105991334 | A | 10/2016 |
| CN | 108055207 | A | 5/2018 |
| CN | 108880899 | A | 11/2018 |
| CN | 109842520 | A | 6/2019 |

OTHER PUBLICATIONS

Translation copy of CN105634763A (Year: 2016).*
ITU-T G.8013/Y.1731, Operation, administration and maintenance (OAM) functions and echanisms for Ethernet-based networks Amendment 1,(Nov. 2018), Total 104 Pages.

* cited by examiner

NETWORK TOPOLOGY DETERMINING METHOD AND APPARATUS, AND SYSTEM

CROSS-REFERENCE TO RELATED APPLICATIONS

This application is a continuation of International Application No. PCT/CN2019/126612, filed on Dec. 19, 2019, which claims priority to Chinese Patent Application No. 201811613944.0, filed on Dec. 27, 2018. The disclosures of the aforementioned applications are hereby incorporated by reference in their entireties.

TECHNICAL FIELD

The present application relates to the field of network technologies, and in particular, to a network topology determining method and apparatus, and a system.

BACKGROUND

A network topology is a physical layout of network elements that are interconnected by using a transmission medium. The network topology is generally obtained based on a connection manner of various network elements in a network. Obtaining a network topology is an important basis for network evaluation, planning, and maintenance. Therefore, how to quickly obtain a clear network topology is an urgent requirement for all services.

In a related technology, after the connection manner of various network elements in the network is obtained, an energy model of the entire network may be first established based on the connection manner by using Hooke's law, then the network element is moved iteratively. When a minimum energy value of the energy model is obtained, a location corresponding to the minimum energy value is determined as a location of the network element, so as to obtain a network topology of the network.

However, efficiency of obtaining the network topology in this manner is relatively low.

SUMMARY

This application provides a network topology determining method and apparatus, to improve efficiency of obtaining a network topology. Technical solutions provided in this application are as follows:

According to a first aspect, an example embodiment of this application provides a network topology determining method. The method includes: obtaining a connection relationship between a plurality of network elements that are included in a network and a network grade of each network element, where the network grade is used to indicate an importance degree of the network element in the network; determining a plurality of subnets based on the connection relationship between the plurality of network elements and the network grade of each network element; determining location information of each network element in a descending order of network grades of the network elements in the network based on a connection relationship between network elements in each subnet; and establishing a network topology based on the connection relationship between the plurality of network elements and the location information of each network element.

According to the network topology determining method provided in this application, a plurality of subnets are determined based on the connection relationship between the plurality of network elements and the network grade of each network element; the location information of each network element is determined in a descending order of network grades of the network elements in the network based on the connection relationship between the network elements in each subnet; and a network topology is established based on the connection relationship between the plurality of network elements and the location information of each network element. Compared with a related technology, in this application, the location information of the network element can be automatically obtained, and the network topology does not need to be manually adjusted. This effectively improves efficiency of obtaining the network topology.

When a network element whose location information is to be determined is a core network element, an implementation process of determining the location information of each network element in a descending order of network grades of the network elements in the network based on the connection relationship between the network elements in each subnet may include: sequencing a plurality of core network elements that are included in a core subnet, to obtain a first network element queue, where the core network elements are network elements of highest network grades in the plurality of network elements; obtaining a first spacing between every two adjacent core network elements in the first network element queue; and determining location information of each core network element based on the first spacing and a total quantity of core network elements.

Optionally, the plurality of core network elements are arranged on a boundary of a first graph. The determining location information of each core network element based on the first spacing and a total quantity of core network elements includes: determining a first fixed-length parameter of the first graph based on the total quantity of core network elements, where the first fixed-length parameter is used to indicate a geometric feature satisfied by points on the first graph; and sequentially determining location information of all core network elements in the first network element queue in order of positions in the first network element queue, where the determining operation is performed based on the first fixed-length parameter and the first spacing.

For example, the first graph includes a circle, an ellipse, or a regular polygon.

The obtaining a first spacing between every two adjacent core network elements in the first network element queue includes: determining the first spacing based on a first total quantity of connected network elements between the two core network elements.

In a possible implementation, the first spacing is represented by a first included angle formed by lines connecting a specified point and the two core network elements. The determining the first spacing based on a first total quantity of connected network elements between the two core network elements includes: determining a first total quantity proportion of the first total quantity in a second total quantity, where the second total quantity is a total quantity of connected network elements of all the core network elements; and determining a product of the first total quantity proportion and 360 degrees as the first included angle.

The core network element is arranged on the first graph, and the first spacing between the two core network elements is determined based on the first total quantity of connected network elements between the two core network elements. This ensures that no crossing exists among all connected network elements of a same core network element.

When a network element whose location information is to be determined is a secondary network element, the determining location information of each network element in a descending order of network grades of the network elements in the network based on a connection relationship between network elements in each subnet includes: classifying a plurality of secondary network elements in a secondary subnet into a plurality of first network element groups based on the connection relationship between the network elements, where the secondary network elements are network elements directly connected to core network elements in the plurality of network elements, and the core network elements are the network elements of highest network grades in the plurality of network elements; sequencing at least one secondary network element in each first network element group to obtain a second network element queue; sequencing the plurality of first network element groups to obtain a network element group queue; determining a layout width of each first network element group based on a third total quantity of connected network elements of all secondary network elements in each first network element group; determining a layout start location of any first network element group based on the layout width of each first network element group and a position of the any first network element group in the network element group queue; and determining location information of each secondary network element based on the layout width, the layout start location, a total group quantity of the plurality of first network element groups, the second network element queue, the network element group queue, and a total quantity of secondary network elements in each first network element group.

Optionally, the plurality of secondary network elements are arranged on a boundary of at least one second graph. The determining location information of each secondary network element based on the layout width, the layout start location, a total group quantity of the plurality of first network element groups, the second network element queue, the network element group queue, and a total quantity of secondary network elements in each first network element group includes: determining, based on a position of the first network element group in which each secondary network element is located in the network element group queue, a second graph on which each secondary network element is located; determining a second fixed-length parameter of each second graph based on the total quantity of secondary network elements and the total group quantity of first network element groups, where the second fixed-length parameter is used to indicate a geometric feature satisfied by points on the corresponding second graph; and determining the location information of the secondary network element based on a position of each secondary network element in the second network element queue, the second fixed-length parameter corresponding to the secondary network element, the layout width, the layout start location, and the total quantity of secondary network elements in the first network element group in which each secondary network element is located.

Optionally, to ensure a hierarchy between networks, each second graph is located outside the first graph corresponding to the core network element. In addition, when the at least one second graph is one second graph, the second graph is a circle, an ellipse, or a regular polygon. When the at least one second graph is a plurality of second graphs, an overall graph formed by the plurality of second graphs is a graph including concentric circles, a graph including concentric ellipses, or a graph including concentric regular polygons.

In a possible implementation, the sequencing the plurality of first network element groups to obtain a network element group queue includes: performing initial sequencing on the plurality of first network element groups in a descending order of third total quantities corresponding to the first network element groups, to obtain an initial network element group queue; and re-sequencing the initial network element group queue in a descending order of target distances corresponding to the first network element groups, to obtain a network element group queue, where the target distance is a distance from a location of the first network element group in the initial network element group queue to a central location of the initial network element group queue.

Optionally, the layout width of each first network element group is represented by a second included angle formed by lines connecting a specified point and two secondary network elements on an outermost side of the first network element group. The determining a layout width of each first network element group based on a third total quantity of connected network elements of all secondary network elements in each first network element group includes: determining a second total quantity proportion of the third total quantity corresponding to any first network element group in a fourth total quantity, where the fourth total quantity is a total quantity of connected network elements of all the secondary network elements in the plurality of first network element groups; and determining the second included angle of the any first network element group based on the second total quantity proportion corresponding to the any first network element group.

Optionally, the layout start location of each first network element group is represented by a layout start angle, and the layout start angle is an offset angle, relative to specified 0 degrees, of a line connecting the layout start location and a specified point. The determining a layout start location of any first network element group based on the layout width of each first network element group and a position of the any first network element group in the network element group queue includes: obtaining a layout start angle of the any first network element group based on the position of the any first network element group in the network element group queue and a layout width of another first network element group that is in the network element group queue and that is before the any first network element group.

The secondary network elements are arranged on the second graph, and the layout width of each first network element group is determined based on the third total quantity of connected network elements of all the secondary network elements in each first network element group. This ensures that no crossing exists among all the connected network elements in each first network element group.

When a network element whose location information is to be determined is a ring network element, the determining location information of each network element in a descending order of network grades of the network elements in the network based on a connection relationship between network elements in each subnet includes: classifying at least one ring subnet into at least one second network element group, where network elements in the ring subnet are connected in a ring shape, and the network elements belonging to the ring subnet are ring network elements; determining a layout width of any ring subnet based on a fifth total quantity of ring subnets in each second network element group; determining graph parameters of a third graph corresponding to ring network elements in the any ring subnet, where the ring network elements that are included in the any ring subnet are arranged on a boundary of the corresponding third graph, and the graph parameters are used to indicate a geometric feature satisfied by points on the corresponding third graph; and determining location information of each ring network element in the any ring subnet based on a sixth total quantity of connected network elements in the any ring subnet, the corresponding graph parameters, the corresponding layout width, and location information of a start ring network element and an end ring network element in the any ring subnet.

When the network elements in the network are arranged from top to bottom in a descending order of network grades, the determining location information of each ring network element in the any ring subnet based on a sixth total quantity of connected network elements in the any ring subnet, the corresponding graph parameters, the corresponding layout width, and location information of a start ring network element and an end ring network element in the any ring subnet includes: obtaining, based on the sixth total quantity of connected network elements in the any ring subnet, the corresponding graph parameters, the corresponding layout width, and the location information of the start ring network element and the end ring network element in the any ring subnet, location information, in a first direction, of each ring network element in the any ring subnet by using a dichotomous iterative algorithm; and determining location information, in a second direction, of any ring network element based on the corresponding graph parameters and the location information of the any ring network element in the first direction, where the second direction is perpendicular to the first direction.

Optionally, before the determining graph parameters of a third graph corresponding to ring network elements in the any ring subnet, the method further includes: sequencing at least one ring subnet in any second network element group based on location information of a start ring network element and an end ring network element in each ring subnet in the any second network element group, to obtain a first network queue.

Correspondingly, the determining graph parameters of a third graph corresponding to ring network elements in the any ring subnet includes: determining location information of a first gravity center of any second network element group based on the location information of the start ring network element and the end ring network element in the ring subnet in the any second network element group; determining, based on the location information of the first gravity center of the any second network element group, the layout width of the any ring subnet, a position of the any ring subnet in the first network queue, and a ring level of the any ring subnet, location information of at least one target ring network element in a ring network element directly connected to the start ring network element and a ring network element directly connected to the end ring network element; and determining the graph parameters based on a function relationship between the location information of the target ring network element corresponding to the any ring subnet and the corresponding third graph.

When the network elements in the network are arranged in a centrifugal hierarchical layout mode, the determining location information of each ring network element in the any ring subnet based on a sixth total quantity of connected network elements in the any ring subnet, the corresponding graph parameters, the corresponding layout width, and location information of a start ring network element and an end ring network element in the any ring subnet includes: determining, based on the location information of the start ring network element and the end ring network element in the any ring subnet, a third graph coordinate system corresponding to the any ring subnet; and determining the location information of each ring network element in the any ring subnet based on the sixth total quantity, the third graph coordinate system, and the graph parameters that correspond to the any ring subnet.

The determining the location information of each ring network element in the any ring subnet based on the sixth total quantity, the third graph coordinate system, and the graph parameters that correspond to the any ring subnet includes: determining, based on the layout width, the sixth total quantity, are the graph parameters that correspond to the any ring subnet, and a distance between the start ring network element and the end ring network element in the any ring subnet, a target ring network element, from the plurality of ring network elements included in the any ring subnet, that is used as a vertex of the any ring subnet; and determining the location information of each ring network element based on the layout width corresponding to the any ring subnet, a position of the target ring network element in the plurality of ring network elements in the any ring subnet, the distance between the start ring network element and the end ring network element in the any ring subnet, and the third graph coordinate system and graph parameters that correspond to the any ring subnet.

Optionally, the determining, based on the layout width, the sixth total quantity, and the graph parameters that correspond to the any ring subnet, and a distance between the start ring network element and the end ring network element in the any ring subnet, a target ring network element, from the plurality of ring network elements included in the any ring subnet, that is used as a vertex of the any ring subnet includes: determining, based on the graph parameters and the layout width that correspond to the any ring subnet, and the distance between the start ring network element and the end ring network element in the any ring subnet, a first arc length and a second arc length of a third graph corresponding to the any ring subnet, where the first arc length and the second arc length are lengths of arcs located on two sides of a vertex of the third graph; and determining, based on the first arc length and the second arc length that correspond to the any ring subnet and the sixth total quantity corresponding to the any ring subnet, the target ring network element used as the vertex of the any ring subnet.

In a possible implementation, the determining, based on the location information of the start ring network element and the end ring network element in the any ring subnet, a third graph coordinate system corresponding to the any ring subnet includes: determining a midpoint of the start ring network element and the end ring network element in the any ring subnet as a coordinate origin of the third graph coordinate system corresponding to the any ring subnet; determining a reference graph corresponding to the second network element group in which the any ring subnet is located, where the reference graph is a circle that uses a specified fixed length as a radius and the coordinate origin of the corresponding third graph coordinate system as a circle center; determining a target intersection point corresponding to the any ring subnet, where the target intersection point is an intersection point between the reference graph corresponding to the second network element group in which the any ring subnet is located and a third connection line of the any ring subnet, and a vertex of the any ring subnet and a specified point are located on the third connection line; determining a direction of a line connecting the coordinate origin of the corresponding third graph coordinate system and the target intersection point as the second direction of the corresponding third graph coordinate system; and determining a direction perpendicular to the second direction as the first direction of the corresponding third graph coordinate system.

In another possible implementation, the determining, based on the location information of the start ring network element and the end ring network element in the any ring subnet, a third graph coordinate system corresponding to the any ring subnet includes: determining, based on the graph parameters corresponding to the any ring subnet, a first relative location, in the third graph, of a geometric center of the third graph corresponding to the any ring subnet; determining, based on the first relative location and the layout width that correspond to the any ring subnet, a second relative location that is of the geometric center corresponding to the any ring subnet and that is in a target second network element group in which the any ring subnet is located; determining, based on the second relative location corresponding to the any ring subnet and location information of a home point, location information of a geometric center corresponding to the any ring subnet, where the home point is a ring network element that exists in each of at least one ring subnet in the target second network element group; determining the location information of the geometric center corresponding to the any ring subnet as location information of the origin of the corresponding third graph coordinate system; determining a direction of a connection line connecting the geometric center corresponding to the any ring subnet and the corresponding home point as the first direction of the third graph coordinate system corresponding to the any ring subnet; and determining a direction perpendicular to the first direction as the second direction of the third graph coordinate system corresponding to the any ring subnet.

Optionally, the determining graph parameters of a third graph corresponding to ring network elements in the any ring subnet includes: estimating, based on the sixth total quantity corresponding to the any ring subnet, a first perimeter of the third graph corresponding to the any ring subnet; determining a second perimeter of the third graph according to a perimeter formula of the third graph corresponding to the any ring subnet; and obtaining, based on the first perimeter and the second perimeter, the graph parameters corresponding to the any ring subnet.

The obtaining, based on the first perimeter and the second perimeter, the graph parameters corresponding to the any ring subnet includes: obtaining, based on the first perimeter and the second perimeter that correspond to the any ring subnet, a first sub-parameter in the graph parameters corresponding to the any ring subnet; and determining, based on the first sub-parameter corresponding to the any ring subnet, the layout width corresponding to the any ring subnet, and the distance between the start ring network element and the end ring network element in the any ring subnet, another sub-parameter in the graph parameters corresponding to the any ring subnet, to obtain the graph parameters corresponding to the any ring subnet.

When the network elements in the network are arranged in a centrifugal hierarchical layout mode, the classifying at least one ring subnet into at least one second network element group includes: classifying ring subnets having a same start ring network element and a same end ring network element into a same second network element group, to obtain at least one second network element group.

When the network elements in the network are arranged from top to bottom in a descending order of network grades, the classifying at least one ring subnet into at least one second network element group includes: classifying ring subnets of a same ring level into a same second network element group, to obtain the at least one second network element group.

Optionally, the layout width of the any ring subnet is represented by a third included angle of the any ring subnet. The determining a layout width of any ring subnet based on a fifth total quantity of ring subnets in each second network element group includes: determining a quotient obtained by dividing 180 degrees by the fifth total quantity corresponding to any second network element group as the third included angle occupied by each ring subnet in the any second network element group.

The layout width of the any ring subnet is represented by a third included angle of the any ring subnet. The determining a layout width of any ring subnet based on a fifth total quantity of ring subnets in each second network element group includes: determining a fourth included angle formed by a first connection line and a second connection line, where the first connection line connects a specified point and a start ring network element in any second network element group, and the second connection line connects the specified point and an end ring network element in the any second network element group; and when the network elements in the network are arranged in a centrifugal hierarchical layout mode, determining a quotient obtained by dividing the fourth included angle by a target total quantity as a third included angle formed by third connection lines of every two adjacent ring subnets in the any second network element group, where a vertex of the ring subnet and the specified point are located on the third connection line, and the target total quantity is equal to the fifth total quantity corresponding to the any second network element group minus 1.

When the network elements in the network are arranged from top to bottom in a descending order of network grades, the layout width of the any ring subnet is represented by a third included angle of the any ring subnet; and the determining a layout width of any ring subnet based on a fifth total quantity of ring subnets in each second network element group includes: determining the layout width of the any ring subnet based on the sixth total quantity corresponding to the any ring subnet.

When a network element whose location information is to be determined is a tree network element, the determining location information of each network element in a descending order of network grades of the network elements in the network based on a connection relationship between network elements in each subnet includes: determining a first root network element from a plurality of tree network elements that are included in a tree subnet, where network elements in the tree subnet are connected in a tree shape, and the network elements belonging to the tree subnet are tree network elements; obtaining a layout start location and a layout width of each tree network element; and determining location information of any other tree network element based on a layout start location and a layout width of the any other tree network element and location information of the first root network element, where the other tree network element is a tree network element other than the first root network element in the plurality of tree network elements.

Before the determining location information of any other tree network element based on a layout start location and a layout width of the any other tree network element and location information of the first root network element, the method further includes: obtaining a depth of each other network element.

Correspondingly, the determining location information of any other tree network element based on a layout start location and a layout width of the any other tree network element and location information of the first root network element includes: determining the location information of the any other tree network element based on a depth, the layout start location, and the layout width of the any other tree network element, and the location information of the first root network element.

Optionally, the layout start location of each tree network element is represented by a layout start angle. The obtaining a layout start location of each tree network element includes: determining, based on the location information of the first root network element, a straight line through which the first root network element and a specified point are connected as a target straight line; and determining an included angle formed by a target ray and a specified straight line as a layout start angle of the first root network element, where the target ray is a ray that is perpendicular to the target straight line and that extends in a direction away from the specified point; or determining that a layout start angle of the first root network element is −180 degrees.

The layout start location of each tree network element is represented by a layout start angle. The obtaining a layout start location of each tree network element includes: sequencing, based on a connection relationship between the tree network elements, a plurality of sub-network elements connected to a same parent network element, to obtain a third network element queue; and determining a layout start angle of any other tree network element based on a layout start angle, a layout width, and a width of a parent network element connected to the any other tree network element, and a width of another tree network element that is in the third network element queue and that is before the any other tree network element.

In a possible implementation, the layout width of each tree network element is represented by a fifth included angle. The obtaining a layout width of each tree network element includes: determining, that a fifth included angle of the first root network element is 180 degrees; and/or determining a fifth included angle of the any other tree network element based on the connection relationship between the tree network elements, the width of the any other tree network element, and a fifth included angle and the width of the parent network element connected to the any other tree network element.

Optionally, the determining location information of each network element in a descending order of network grades of the network elements in the network based on a connection relationship between network elements in each subnet includes: sequencing second root network elements in all isolated tree subnets to obtain a fourth network element queue, where network elements in the isolated tree subnet are connected in a tree shape, the network elements belonging to the isolated tree subnet are isolated tree network elements, there is no connection path between the isolated tree network element and the core network element, and the core network element is a network element of the highest network grade in the plurality of network elements; and determining location information of any second root network element based on a specified radius, a sum of widths of all the second root network elements, and a sum of widths of other second root network elements that are in the fourth network element queue and that are before the any second root network element.

In a possible implementation, the layout start location of each tree network element is represented by the layout start angle. The obtaining a layout start location of each tree network element includes: determining a layout start location of the second root network element based on a width of another second root network element that is in the fourth network element queue and that is before the any second root network element.

In another possible implementation, the layout width of each tree network element is represented by a fifth included angle. The obtaining a layout width of each tree network element includes: obtaining a width of each tree network element based on the connection relationship between the tree network elements; and determining the layout width of each tree network element based on the width of each tree network element.

Optionally, the plurality of other tree network elements connected to the same first root network element are arranged on a circle using the first root network element as a circle center and using the specified length as a radius.

The tree network elements are arranged in an arc tree, and the width of the tree network element is allocated based on the width of the tree network element. This ensures that no crossing exists among all tree network elements under a same root network element.

When a network element whose location information is to be determined is a tree network element, and a depth of the tree network element is greater than a specified depth threshold, the determining location information of each network element in a descending order of network grades of the network elements in the network based on a connection relationship between network elements in each subnet includes: obtaining location information of a second gravity center of an entire network comprising a plurality of tree subnets; obtaining a width of each tree subnet; sequencing the plurality of tree subnets based on location information of a third root network element in each tree subnet, to obtain a second network queue; determining the location information of the third root network element in any tree subnet based on the width of each tree subnet, the location information of the second gravity center, and a width of another tree subnet that is in the second network queue and that is before the any tree subnet; sequencing, based on the connection relationship between the tree network elements, a plurality of sub-network elements connected to a same parent network element, to obtain a fifth network element queue; and determining location information of any other tree network element based on location information of a parent network element connected to the any other tree network element, a width of the any other tree network element, and location information and a width of another tree network element that is in the fifth network element queue and that is before the any other tree network element.

The determining a plurality of subnets based on the connection relationship between the plurality of network elements and the network grade of each network element includes: determining, as a core subnet, a network comprising core network elements that are connected, where the core network elements are the network elements of highest network grades.

Optionally, the determining a plurality of subnets based on the connection relationship between the plurality of network elements and the network grade of each network element further includes: determining, as a ring subnet, a network comprising other network elements that are connected in a ring shape, where the other network elements are network elements other than the core network element in the network; and/or determining, as a tree subnet, a network comprising other network elements that are connected in a tree shape.

In a possible implementation, network elements in the network topology are arranged from inside to outside in a descending order of network grades by using a network element that is of the highest network grade as a start point. In this case, a plurality of network elements in the obtained network topology are more evenly arranged, so that a layout of the network topology is more aesthetic. In addition, when network construction is performed based on the network topology, interference between the network elements can be reduced.

In another possible implementation, the network elements in the network topology are arranged from top to bottom in a descending order of network grades by using a network element that is of the highest network grade as a start point. In this case, a topology hierarchy of the network elements in the obtained network topology is clearer, and a relationship among a network structure, network grades of the network elements, and different subnets can be clearly presented.

According to a second aspect, an example embodiment of this application provides a network topology determining apparatus. The apparatus includes: an obtaining module, configured to obtain a connection relationship between a plurality of network elements that are included in a network and a network grade of each network element, where the network grade is used to indicate an importance degree of the network element in the network; a first determining module, configured to determine a plurality of subnets based on the connection relationship between the plurality of network elements and the network grade of each network element; a second determining module, configured to determine location information of each network element in a descending order of network grades of the network elements in the network based on a connection relationship between network elements in each subnet; and an establishment module, configured to establish a network topology based on the connection relationship between the plurality of network elements and the location information of each network element.

Optionally, the second determining module is configured to: sequence a plurality of core network elements that are included in a core subnet, to obtain a first network element queue, where the core network elements are network elements of highest network grades in the plurality of network elements; obtain a first spacing between every two adjacent core network elements in the first network element queue; and determine location information of each core network element based on the first spacing and a total quantity of core network elements.

Optionally, the plurality of core network elements are arranged on a boundary of a first graph. When determining the location information of each core network element based on the first spacing and the total quantity of core network elements, the second determining module is configured to: determine a first fixed-length parameter of the first graph based on the total quantity of core network elements, where the first fixed-length parameter is used to indicate a geometric feature satisfied by points on the first graph; and sequentially determine location information of all core network elements in the first network element queue in order of positions in the first network element queue, where the determining operation is performed based on the first fixed-length parameter and the first spacing.

Optionally, the first graph includes a circle, an ellipse, or a regular polygon.

Optionally, when obtaining the first spacing between every two adjacent core network elements in the first network element queue, the second determining module is configured to: determine the first spacing based on a first total quantity of connected network elements between the two core network elements.

Optionally, the first spacing is represented by a first included angle formed by lines connecting a specified point and the two core network elements; and when determining the first spacing based on the first total quantity of connected network elements between the two core network elements, the second determining module is configured to: determine a first total quantity proportion of the first total quantity in a second total quantity, where the second total quantity is a total quantity of connected network elements of all the core network elements; and determine a product of the first total quantity proportion and 360 degrees as the first included angle.

Optionally, the second determining module is configured to: classify a plurality of secondary network elements in a secondary subnet into a plurality of first network element groups based on the connection relationship between the network elements, where the secondary network elements are network elements directly connected to core network elements in the plurality of network elements, and the core network elements are the network elements of highest network grades in the plurality of network elements; sequence at least one secondary network element in each first network element group to obtain a second network element queue; sequence the plurality of first network element groups to obtain a network element group queue; determine a layout width of each first network element group based on a third total quantity of connected network elements of all secondary network elements in each first network element group; determine a layout start location of any first network element group based on the layout width of each first network element group and a position of the any first network element group in the network element group queue; and determine location information of each secondary network element based on the layout width, the layout start location, a total group quantity of the plurality of first network element groups, the second network element queue, the network element group queue, and a total quantity of secondary network elements in each first network element group.

Optionally, the plurality of secondary network elements are arranged on a boundary of at least one second graph; and when determining the location information of each secondary network element based on the layout width, the layout start location, the total group quantity of the plurality of first network element groups, the second network element queue, the network element group queue, and the total quantity of secondary network elements in each first network element group, the second determining module is configured to: determine, based on a position of the first network element group in which each secondary network element is located in the network element group queue, a second graph on which each secondary network element is located; determine a second fixed-length parameter of each second graph based on the total quantity of secondary network elements and the total group quantity of the first network element groups, where the second fixed-length parameter is used to indicate a geometric feature satisfied by points on the corresponding second graph; and determine the location information of the secondary network element based on a position of each secondary network element in the second network element queue, the second fixed-length parameter corresponding to the secondary network element, the layout width, the layout start location, and the total quantity of secondary network elements in the first network element group in which each secondary network element is located.

Optionally, each second graph is located outside the first graph corresponding to the core network element. In addition, when the at least one second graph is one second graph, the second graph is a circle, an ellipse, or a regular polygon. When the at least one second graph is a plurality of second graphs, an overall graph formed by the plurality of second graphs is a graph including concentric circles, a graph including concentric ellipses, or a graph including concentric regular polygons.

Optionally, when sequencing the plurality of first network element groups to obtain the network element group queue, the second determining module is configured to: perform initial sequencing on the plurality of first network element groups in a descending order of third total quantities corresponding to the first network element groups, to obtain an initial network element group queue; and re-sequence the initial network element group queue in a descending order of target distances corresponding to the first network element groups, to obtain a network element group queue, where the target distance is a distance from a location of the first network element group in the initial network element group queue to a central location of the initial network element group queue.

Optionally, the layout width of each first network element group is represented by a second included angle formed by lines connecting a specified point and two secondary network elements on an outermost side of the first network element group. When determining the layout width of each first network element group based on the third total quantity of connected network elements of all secondary network elements in each first network element group, the second determining module is configured to: determine a second total quantity proportion of the third total quantity corresponding to any first network element group in a fourth total quantity, where the fourth total quantity is a total quantity of connected network elements of all the secondary network elements in the plurality of first network element groups; and determine the second included angle of the any first network element group based on the second total quantity proportion corresponding to the any first network element group.

Optionally, the layout start location of each first network element group is represented by a layout start angle, and the layout start angle is an offset angle, relative to specified 0 degrees, of a line connecting the layout start location and a specified point. When determining a layout start location of any first network element group based on the layout width of each first network element group and a position of the any first network element group in the network element group queue, the second determining module is configured to: obtain a layout start angle of the any first network element group based on the position of the any first network element group in the network element group queue and a layout width of another first network element group that is in the network element group queue and that is before the any first network element group.

Optionally, the second determining module is configured to: classify at least one ring subnet into at least one second network element group, where network elements in the ring subnet are connected in a ring shape, and the network elements belonging to the ring subnet are ring network elements; determine a layout width of any ring subnet based on a fifth total quantity of ring subnets in each second network element group; determine graph parameters of a third graph corresponding to ring network elements in the any ring subnet, where the ring network elements that are included in the any ring subnet are arranged on a boundary of the corresponding third graph, and the graph parameters are used to indicate a geometric feature satisfied by points on the corresponding third graph; and determine location information of each ring network element in the any ring subnet based on a sixth total quantity of connected network elements in the any ring subnet, the corresponding graph parameters, the corresponding layout width, and location information of a start ring network element and an end ring network element in the any ring subnet.

Optionally, when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the second determining module is configured to: obtain, based on the sixth total quantity of connected network elements in the any ring subnet, the corresponding graph parameters, the corresponding layout width, and the location information of the start ring network element and the end ring network element in the any ring subnet, location information, in a first direction, of each ring network element in the any ring subnet by using a dichotomous iterative algorithm; and determine location information, in a second direction, of any ring network element based on the corresponding graph parameters and the location information of the any ring network element in the first direction, where the second direction is perpendicular to the first direction.

Optionally, the second determining module is further configured to: sequence at least one ring subnet in any second network element group based on location information of a start ring network element and an end ring network element in each ring subnet in the any second network element group, to obtain a first network queue.

Correspondingly, when determining the graph parameters of the third graph corresponding to the ring network elements in the any ring subnet, the second determining module is configured to: determine location information of a first gravity center of any second network element group based on the location information of the start ring network element and the end ring network element in the ring subnet in the any second network element group; determine, based on the location information of the first gravity center of the any second network element group, the layout width of the any ring subnet, a position of the any ring subnet in the first network queue, and a ring level of the any ring subnet, location information of at least one target ring network element in a ring network element directly connected to the start ring network element and a ring network element directly connected to the end ring network element; and determine the graph parameters based on a function relationship between the location information of the target ring network element corresponding to the any ring subnet and the corresponding third graph.

Optionally, when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the second determining module is configured to: determine, based on the location information of the start ring network element and the end ring network element in the any ring subnet, a third graph coordinate system corresponding to the any ring subnet; and determine the location information of each ring network element in the any ring subnet based on the sixth total quantity, the third graph coordinate system, and the graph parameters that correspond to the any ring subnet.

Optionally, when determining the location information of each ring network element in the any ring subnet based on the sixth total quantity, the third graph coordinate system, and the graph parameters that correspond to the any ring subnet, the second determining module is configured to: determine, based on the layout width, the sixth total quantity, are the graph parameters that correspond to the any ring subnet, and a distance between the start ring network element and the end ring network element in the any ring subnet, a target ring network element, from the plurality of ring network elements included in the any ring subnet, that is used as a vertex of the any ring subnet; and determine the location information of each ring network element based on the layout width corresponding to the any ring subnet, a position of the target ring network element in the plurality of ring network elements in the any ring subnet, the distance between the start ring network element and the end ring network element in the any ring subnet, and the third graph coordinate system and graph parameters that correspond to the any ring subnet.

Optionally, when determining, based on the layout width, the sixth total quantity, and the corresponding graph parameters that correspond to the any ring subnet, and the distance between the start ring network element and the end ring network element in the any ring subnet, a target ring network element, from the plurality of ring network elements included in the any ring subnet, that is used as the vertex of the any ring subnet, the second determining module is configured to: determine, based on the graph parameters and the layout width that correspond to the any ring subnet, and the distance between the start ring network element and the end ring network element in the any ring subnet, a first arc length and a second arc length of a third graph corresponding to the any ring subnet, where the first arc length and the second arc length are lengths of arcs located on two sides of a vertex of the third graph; and determine, based on the first arc length and the second arc length that correspond to the any ring subnet and the sixth total quantity corresponding to the any ring subnet, the target ring network element used as the vertex of the any ring subnet.

Optionally, when determining, based on the location information of the start ring network element and the end ring network element in the any ring subnet, the third graph coordinate system corresponding to the any ring subnet, the second determining module is configured to: determine a midpoint of the start ring network element and the end ring network element in the any ring subnet as a coordinate origin of the third graph coordinate system corresponding to the any ring subnet; determine a reference graph corresponding to the second network element group in which the any ring subnet is located, where the reference graph is a circle that uses a specified fixed length as a radius and the coordinate origin of the corresponding third graph coordinate system as a circle center; determine a target intersection point corresponding to the any ring subnet, where the target intersection point is an intersection point between the reference graph corresponding to the second network element group in which the any ring subnet is located and a third connection line of the any ring subnet, and a vertex of the any ring subnet and a specified point are located on the third connection line; determine a direction of a line connecting the coordinate origin of the corresponding third graph coordinate system and the target intersection point as the second direction of the corresponding third graph coordinate system; and determine a direction perpendicular to the second direction as the first direction of the corresponding third graph coordinate system.

Optionally, when determining, based on the location information of the start ring network element and the end ring network element in the any ring subnet, the third graph coordinate system corresponding to the any ring subnet, the second determining module is configured to: determine, based on the graph parameters corresponding to the any ring subnet, a first relative location, in the third graph, of a geometric center of the third graph corresponding to the any ring subnet; determine, based on the first relative location and the layout width that correspond to the any ring subnet, a second relative location that is of the geometric center corresponding to the any ring subnet and that is in a target second network element group in which the any ring subnet is located; determine, based on the second relative location corresponding to the any ring subnet and location information of a home point, location information of a geometric center corresponding to the any ring subnet, where the home point is a ring network element that exists in each of at least one ring subnet in the target second network element group; determine the location information of the geometric center corresponding to the any ring subnet as location information of the origin of the corresponding third graph coordinate system; determine a direction of a connection line connecting the geometric center corresponding to the any ring subnet and the corresponding home point as the first direction of the third graph coordinate system corresponding to the any ring subnet; and determine a direction perpendicular to the first direction as the second direction of the third graph coordinate system corresponding to the any ring subnet.

Optionally, when determining the graph parameters of the third graph corresponding to the ring network elements in the any ring subnet, the second determining module is configured to: estimate, based on the sixth total quantity corresponding to the any ring subnet, a first perimeter of the third graph corresponding to the any ring subnet; determine a second perimeter of the third graph according to a perimeter formula of the third graph corresponding to the any ring subnet; and obtain, based on the first perimeter and the second perimeter, the graph parameters corresponding to the any ring subnet.

Optionally, when obtaining, based on the first perimeter and the second perimeter, the graph parameters corresponding to the any ring subnet, the second determining module is configured to: obtain, based on the first perimeter and the second perimeter that correspond to the any ring subnet, a first sub-parameter in the graph parameters corresponding to the any ring subnet; and determine, based on the first sub-parameter corresponding to the any ring subnet, the layout width corresponding to the any ring subnet, and the distance between the start ring network element and the end ring network element in the any ring subnet, another sub-parameter in the graph parameters corresponding to the any ring subnet, to obtain the graph parameters corresponding to the any ring subnet.

Optionally, when classifying the at least one ring subnet into at least one second network element group, the second determining module is configured to: classify ring subnets having a same start ring network element and a same end ring network element into a same second network element group, to obtain at least one second network element group.

Optionally, when classifying the at least one ring subnet into at least one second network element group, the second determining module is configured to: classify ring subnets of a same ring level into a same second network element group, to obtain the at least one second network element group.

Optionally, the layout width of the any ring subnet is represented by a third included angle of the any ring subnet. When determining the layout width of the any ring subnet based on the fifth total quantity of ring subnets in each second network element group, the second determining module is configured to: determine a quotient obtained by dividing 180 degrees by the fifth total quantity corresponding to any second network element group as the third included angle occupied by each ring subnet in the any second network element group.

Optionally, the layout width of the any ring subnet is represented by a third included angle of the any ring subnet; and when determining the layout width of the any ring subnet based on the fifth total quantity of ring subnets in each second network element group, the second determining module is configured to: determine a fourth included angle formed by a first connection line and a second connection line, where the first connection line connects a specified point and a start ring network element in any second network element group, and the second connection line connects the specified point and an end ring network element in the any second network element group; and determine a quotient obtained by dividing the fourth included angle by a target total quantity as a third included angle formed by third connection lines of every two adjacent ring subnets in the any second network element group, where a vertex of the ring subnet and the specified point are located on the third connection line, and the target total quantity is equal to the fifth total quantity corresponding to the any second network element group minus 1.

Optionally, the layout width of the any ring subnet is represented by a third included angle of the any ring subnet; and when determining the layout width of the any ring subnet based on the fifth total quantity of ring subnets in each second network element group, the second determining module is configured to: determine the layout width of the any ring subnet based on the sixth total quantity corresponding to the any ring subnet.

Optionally, the second determining module is configured to: determine a first root network element from a plurality of tree network elements that are included in a tree subnet, where network elements in the tree subnet are connected in a tree shape, and the network elements belonging to the tree subnet is tree network elements; obtain a layout start location and a layout width of each tree network element; and determine location information of any other tree network element based on a layout start location and a layout width of the any other tree network element and location information of the first root network element, where the other tree network element is a tree network element other than the first root network element in the plurality of tree network elements.

Optionally, the second determining module is further configured to obtain a depth of each other network element.

Correspondingly, when determining the location information of any other tree network element based on a layout start location and a layout width of the any other tree network element and the location information of the first root network element, the second determining module is configured to: determine the location information of the any other tree network element based on a depth, the layout start location, and the layout width of the any other tree network element, and the location information of the first root network element.

Optionally, the layout start location of each tree network element is represented by a layout start angle. When obtaining the layout start location of each tree network element, the second determining module is configured to: determine, based on the location information of the first root network element, a straight line through which the first root network element and a specified point are connected as a target straight line; and determine an included angle formed by a target ray and a specified straight line as a layout start angle of the first root network element, where the target ray is a ray that is perpendicular to the target straight line and that extends in a direction away from the specified point; or determine that a layout start angle of the first root network element is −180 degrees.

Optionally, the layout start location of each tree network element is represented by a layout start angle; and when obtaining the layout start location of each tree network element, the second determining module is configured to: sequence, based on a connection relationship between the tree network elements, a plurality of sub-network elements connected to a same parent network element, to obtain a third network element queue; and determine a layout start angle of any other tree network element based on a layout start angle, a layout width, and a width of a parent network element connected to the any other tree network element, and a width of another tree network element that is in the third network element queue and that is before the any other tree network element.

Optionally, the layout width of each tree network element is represented by a fifth included angle. When obtaining the layout width of each tree network element, the second determining module is configured to: determine, that a fifth included angle of the first root network element is 180 degrees; and/or, determine a fifth included angle of the any other tree network element based on the connection relationship between the tree network elements, the width of the any other tree network element, and a fifth included angle and the width of the parent network element connected to the any other tree network element.

Optionally, the second determining module is further configured to: sequence second root network elements in all isolated tree subnets to obtain a fourth network element queue, where network elements in the isolated tree subnet are connected in a tree shape, the network elements belonging to the isolated tree subnet are isolated tree network elements, there is no connection path between the isolated tree network element and the core network element, and the core network element is a network element of the highest network grade in the plurality of network elements; and determine location information of any second root network element based on a specified radius, a sum of widths of all the second root network elements, and a sum of widths of other second root network elements that are in the fourth network element queue and that are before the any second root network element.

Optionally, the layout start location of each tree network element is represented by the layout start angle; and when obtaining the layout start location of each tree network element, the second determining module is configured to: determine a layout start location of the second root network element based on a width of another second root network element that is in the fourth network element queue and that is before the any second root network element.

Optionally, the layout width of each tree network element is represented by a fifth included angle; and when obtaining the layout width of each tree network element, the second determining module is configured to: obtain a width of each tree network element based on the connection relationship between the tree network elements; and determine the layout width of each tree network element based on the width of each tree network element.

Optionally, the plurality of other tree network elements connected to the same first root network element are arranged on a circle using the first root network element as a circle center and using the specified length as a radius.

Optionally, the second determining module is configured to: obtain location information of a second gravity center of an entire network comprising a plurality of tree subnets; obtain a width of each tree subnet; sequence the plurality of tree subnets based on location information of a third root network element in each tree subnet, to obtain a second network queue; determine the location information of the third root network element in any tree subnet based on the width of each tree subnet, the location information of the second gravity center, and a width of another tree subnet that is in the second network queue and that is before the any tree subnet; sequence, based on the connection relationship between the tree network elements, a plurality of sub-network elements connected to a same parent network element, to obtain a fifth network element queue; and determine location information of any other tree network element based on location information of a parent network element connected to the any other tree network element, a width of the any other tree network element, and location information and a width of another tree network element that is in the fifth network element queue and that is before the any other tree network element.

Optionally, the first determining module is configured to determine, as a core subnet, a network comprising core network elements that are connected, where the core network elements are the network elements of highest network grades.

Optionally, the first determining module is configured to: determine, as a ring subnet, a network comprising other network elements that are connected in a ring shape, where the other network elements are network elements other than the core network element in the network; and/or determine, as a tree subnet, a network comprising other network elements that are connected in a tree shape Optionally, network elements in the network topology are arranged from inside to outside in a descending order of network grades by using a network element that is of the highest network grade as a start point.

Optionally, network elements in the network topology are arranged from top to bottom in a descending order of network grades by using a network element that is of the highest network grade as a start point.

According to a third aspect, an example embodiment of this application provides a network topology determining apparatus, including a processor and a memory. When the processor executes a computer program stored in the memory, the network topology determining apparatus performs the network topology determining method in any implementation of the first aspect.

According to a fourth aspect, an example embodiment of this application provides a storage medium. The storage medium stores a computer program, and the computer program is used to indicate the network topology determining apparatus to perform the network topology determining method in any implementation of the first aspect.

Beneficial effects brought by the technical solutions provided in the example embodiments of this application are as follows:

According to the network topology determining method and apparatus provided in the embodiments of this application, a plurality of subnets are determined based on the connection relationship between the plurality of network elements and the network grade of each network element; the location information of each network element is determined in a descending order of network grades of the network elements in the network based on the connection relationship between the network elements in each subnet; and a network topology is established based on the connection relationship between the plurality of network elements and the location information of each network element. Compared with a related technology, in this application, the location information of the network element can be automatically obtained, and the network topology does not need to be manually adjusted. This effectively improves efficiency of obtaining the network topology. In addition, link crossings in the network topology can be effectively reduced, and an initial location of the network element does not need to be preset, so that an obtained network topology result is unique. Further, the obtained network topology can clearly present the relationship among the network structure, the network grades of the network elements, and the different subnets. In addition, during determining of the location information of the network element, all used graph are graphs with relatively good symmetry, so that the obtained network topology has comparatively good symmetry. In addition, in the process of calculating the location information of the network element, a calculation amount is simplified by using a definite integral, binary iteration, graph parameters solving, coordinate transformation, and the like. This can reduce time consumed in determining the location information of the network element, and resolve problems of non-convergence and low efficiency in a related algorithm.

DESCRIPTION OF EMBODIMENTS

Figure 1:
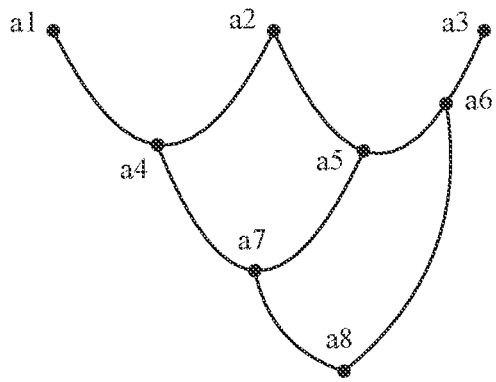
FIG. 1 is a schematic structural diagram of a ring subnet according to an example embodiment of this application.

To make the objectives, technical solutions, and advantages of this application clearer, the following further describes embodiments of this application in detail with reference to the accompanying drawings.

To facilitate understanding of a network topology determining method provided in the embodiments of this application, the following first explains terms used in this specification.

Network grade: Grading is performed on network elements in a network based on importance of the network elements in an entire topology. The network grade is used to indicate an importance degree of the network element in the network. A higher network grade indicates a higher importance degree of the network element in the network.

A ring subnet (also referred to as a ring): is a ring network in which one start ring network element arrives at an end ring network element after traversing one or more network elements over a link. A network element in the ring subnet is a ring network element, and ring network elements located at two endpoints of the ring network are a start ring network element and an end ring network element in the ring network. In the ring subnet, all network elements except the start ring network element and the end ring network element are connected network elements of the ring. In addition, both the start ring network element and the end ring network element may be referred to as home points of the corresponding ring subnet. In addition, when the ring subnet is a single-homed ring, because the start ring network element and the end ring network element in the ring subnet are the same, home points of the single-homed ring are the same.

A single-homed ring subnet (also referred to as a single-homed ring) is a ring subnet whose start ring network element and end ring network element are a same network element. A dual-homed ring subnet (also referred to as a dual-homed ring) is a ring subnet whose start ring network element and end ring network element are not a same network element. A same-grade ring subnet (also referred to as a same-grade ring) is a ring subnet whose start ring network element and end ring network element are of a same network grade. A multi-grade ring subnet (also referred to as a multi-grade ring) is a ring subnet whose start ring network element and end ring network element are of different network grades.

A tree subnet: is a network comprising network elements that are connected in a tree shape. The network elements belonging to the tree subnet are tree network elements.

A core network element: is a network element of a highest network grade in a plurality of network elements included in a network.

A secondary network element: is a secondary network element that is directly connected to a core network element and that is in the plurality of network elements included in the network.

An isolated network element (also referred to as an isolated tree network element in this specification): is a network element that does not have a connection path with the core network element.

Inter-ring link: One of two network elements located at two ends of the link is a ring network element, and the other is not.

Cluster: After secondary network elements are grouped based on connectivity between the secondary network elements, each remaining network element is grouped, based on distances of paths from each remaining network element to the secondary network elements, into a group in which a secondary network element corresponding to a closest path is located. A set formed by network elements and a link included in each group is referred to as a cluster. The remaining network element is a network element whose network grade is lower than the secondary network element.

Inter-cluster link: Network elements located at two ends of the link belong to different clusters.

Connected network elements of any network element: indicate the network elements connected to the any network element.

Ring level: A level of the ring subnet is equal to a larger value between a network grade of the start ring network element and a network grade of the end ring network element in the ring subnet plus 1. For example, FIG. 1 shows four ring subnets, which are respectively a ring subnet 1 including a ring network element a1, a ring network element a4, and a ring network element a2; a ring subnet 2 including the ring network element a2, a ring network element a5, a ring network element a6, and a ring network element a3; a ring subnet 3 including the ring network element a4, a ring network element a7, and the ring network element a5; and a ring subnet 4 including the ring network element a7, a ring network element a8, and the ring network element a6. Network grades of the ring network element a1, the ring network element a2, and the ring network element a3 are all 1; network grades of the ring network element a4, the ring network element a5, and the ring network element a6 are all 2; and a network grade of the ring network element a7 is 3. Therefore, it may be determined that ring levels of the ring subnets 1 and 2 are 1, a ring level of the ring subnet 3 is 2, and a ring level of the ring subnet 4 is 3.

In a related technology, a network topology of the network is usually obtained by using a force-directed layout algorithm. An implementation process includes: After a connection manner of various network elements in the network is obtained, an energy model of the entire network may be first established based on the connection manner by using Hooke's law, then the network element is moved iteratively, and when a minimum value of energy of the energy model is obtained, a location corresponding to the minimum value is determined as a location of the network element, so as to obtain the network topology of the network.

However, in the process of moving the network element based on the energy, it is difficult to determine an accurate location of the network element. Consequently, the algorithm does not converge, and the process of obtaining the network topology takes a relatively long time. In addition, because the location of the network element is determined in the iteration manner, during obtaining of the network topology, an iteration process needs to be terminated by specifying a quantity of iteration times. In addition, because an initial location of the network element needs to be specified during establishment of the energy model, an obtained topology structure is not definite, and the process of obtaining the topology structure is affected by the initial location. For example, when the specified initial location is relatively poor, an obtained network topology layout result is relatively poor. In other words, it is difficult to obtain a satisfactory result. In addition, because the network topology is a pure energy layout, there are many crossings in the network topology and a structure is chaotic. Consequently, a relationship among the network structure, a hierarchy, and different subnets cannot be clearly and completely presented, and a large quantity of manual adjustments are required, which causes relatively low efficiency of obtaining the network topology.

In view of this, this application provides the network topology determining method. According to the method, a plurality of subnets are determined based on a connection relationship between a plurality of network elements and a network grade of each network element; location information of each network element is determined in a descending order of network grades of the network elements in the network based on the connection relationship between the network elements in each subnet; and a network topology is established based on the connection relationship between the plurality of network elements and the location information of each network element. Compared with a related technology, in this application, the location information of the network element can be automatically obtained, and the network topology does not need to be manually adjusted. This effectively improves efficiency of obtaining the network topology. In addition, link crossings in the network topology can be effectively reduced, and an initial location of the network element does not need to be preset, so that an obtained network topology result is unique. Further, the obtained network topology can clearly present the relationship among the network structure, the network grades of the network elements, and the different subnets.

Figure 2:
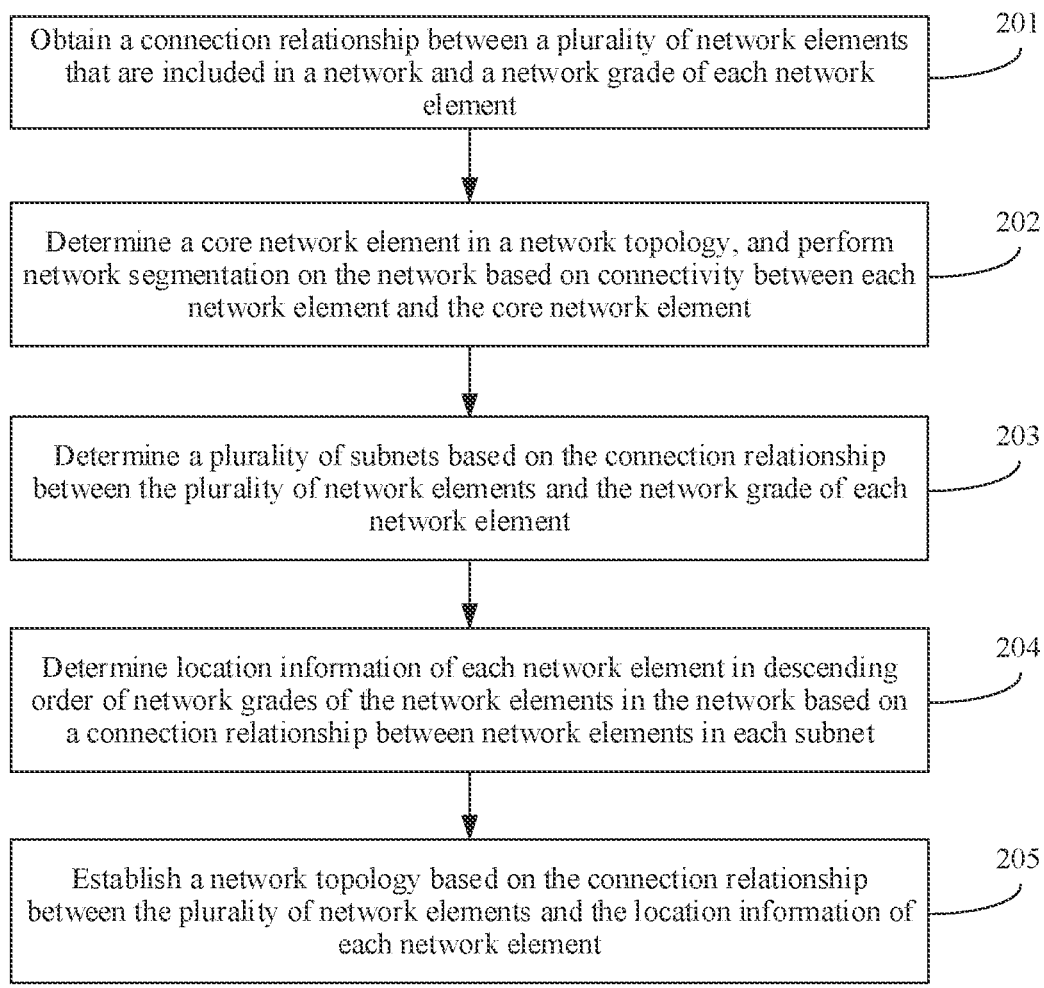
FIG. 2 is a flowchart of a network topology determining method according to an embodiment of this application.

FIG. 2 is a flowchart of a network topology determining method according to an embodiment of this application. As shown in FIG. 2, the method may include the following steps.

Step 201: Obtain a connection relationship between a plurality of network elements that are included in a network and a network grade of each network element.

The network grade is used to indicate an importance degree of the network element in the network.

The connection relationship between the network elements and the network grade of each network element are usually determined based on a network deployment requirement, and a network topology is obtained based on the connection relationship and the network grade of each network element. Therefore, during determining of the network topology, the connection relationship and the network grade of each network element need to be first obtained.

Step 202: Determine a core network element in the network topology, and perform network segmentation on the network based on connectivity between each network element and the core network element.

During segmentation of the network, a network element that has a connection link with the core network element may be determined as a non-isolated network element. The non-isolated network element generally includes at least one of a secondary network element, a ring network element, and a tree network element. A subnet comprising non-isolated network elements is a non-isolated subnet. A network element, in the network, that has no connection link with the core network element may be determined as an isolated network element, and a subnet comprising the isolated network element is an isolated subnet.

Step 203: Determine a plurality of subnets based on the connection relationship between the plurality of network elements and the network grade of each network element.

The network topology generally includes the core network element and another network element. The another network element may include at least one of the secondary network element, the ring network element, the tree network element, and the isolated network element. Correspondingly, an implementation process of step 203 may include: determining, as a core subnet, a network comprising core network elements that are connected. In addition, the implementation process of step 203 may further include: determining a network comprising other network elements that are connected in a ring shape as a ring subnet, where the other network elements are network elements other than the core network element in the network; and/or determining, as a tree subnet, a network comprising other network elements that are connected in a tree shape. In addition, in this embodiment of this application, because network elements in the isolated subnet are connected in a tree shape in terms of a layout, the isolated subnet may also be referred to as an isolated tree subnet, and a network element in the isolated tree subnet may be referred to as an isolated tree network element.

In addition, after the tree subnet is determined, the implementation process of step 203 may further include: obtaining a depth of each network element in the tree subnet, and dividing the tree subnet into a short tree subnet and a long tree subnet based on the depth of each network element in the tree subnet. In this way, long tree subnets and short tree subnets can be laid out according to different layout models to reduce crossings in tree subnets. The depth of each network element in the tree subnet is equal to a total quantity of network elements on a shortest path from the network element to a root network element in the tree subnet.

Optionally, the implementation of division into long and short trees may include: in the tree subnet, determining a network element whose network element depth is greater than a specified depth threshold as a long tree network element in the long tree subnet; determining a network element whose network element depth is less than or equal to the specified depth threshold as a short tree network element in the short tree subnet; determining a subnet comprising long tree network elements as the long tree subnet; and determining a subnet comprising short tree network elements as the short tree subnet.

Figure 3:
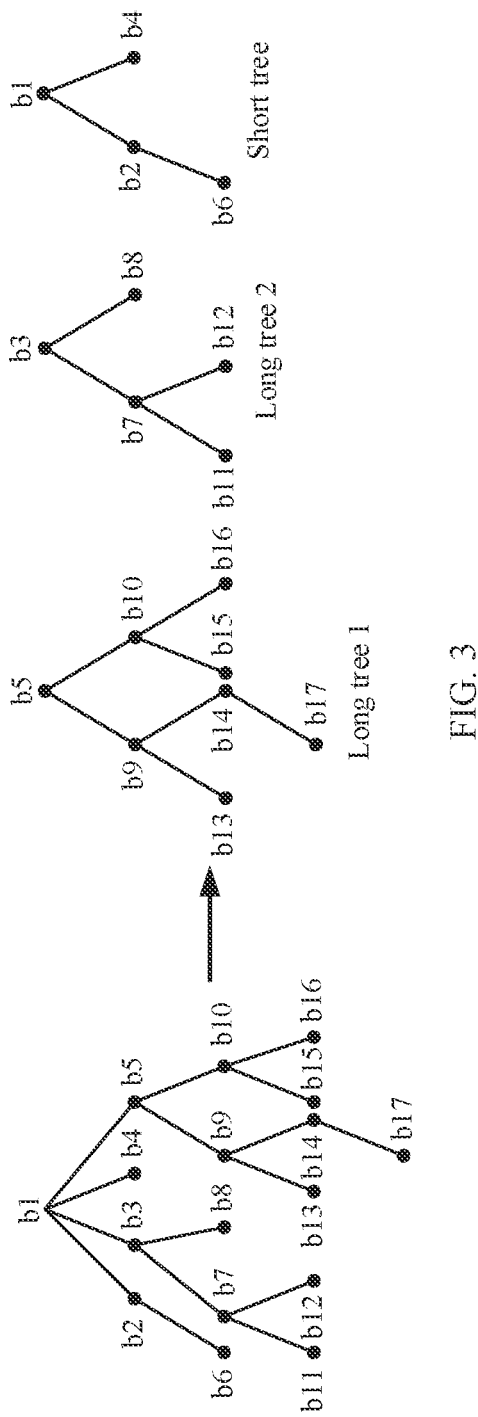
FIG. 3 is a schematic structural diagram of a tree subnet according to an embodiment of this application.

For example, it is assumed that the specified depth threshold is 2, and a schematic structural diagram of a tree subnet is shown in FIG. 3. In the tree subnet, a tree network element b1 is a first root network element, and a depth of the tree network element b1 is 1. Depths of a sub-network element b2, a sub-network element b3, a sub-network element b4, and a sub-network element b5 of the tree network element b1 are all 2. Depths of a sub-network element b6 of the tree network element b2, sub-network elements b7 and b8 of the tree network element b3, and sub-network elements b9 and b10 of the tree network element b5 are all 3. Depths of sub-network elements b11 and b12 of the tree network element b7, sub-network elements b13 and b14 of the tree network element b9, and sub-network elements b15 and b16 of the tree network element b10 are all 4. A depth of a sub-network element b17 of the tree network element b14 is 5. After the tree subnet is divided into long and short trees based on the specified depth threshold, a long tree 1 obtained after the division includes: the tree network element b5, the tree network element b9, the tree network element b10, the tree network element b13, the tree network element b14, the tree network element b15, the tree network element b16, and the tree network element b17. A long tree 2 obtained after the division includes: the tree network element b3, the tree network element b7, the tree network element b8, the tree network element b11, and the tree network element b12. A short tree includes: the tree network element b1, the tree network element b2, the tree network element b4, and the tree network element b6.

Step 204: Determine location information of each network element in a descending order of network grades of the network elements in the network based on a connection relationship between network elements in each subnet.

Optionally, the network elements in the network topology may be arranged in at least the following two manners.

In a first layout mode, network elements in the network topology are arranged from inside to outside in a descending order of the network grades by using a network element that is of the highest network grade as a start point. In this case, an obtained network topology may be referred to as a mesh topology. In other words, the network elements in the network topology may be arranged in a centrifugal hierarchical layout mode. When the network elements in the network topology are arranged in a centrifugal hierarchical manner, a plurality of network elements in the obtained network topology are more evenly arranged, so that a layout of the network topology is more aesthetic. In addition, when network construction is performed based on the network topology, interference between the network elements can be reduced.

In addition, in the first layout mode, the core network element may be arranged on a boundary of a first graph. The first graph may be a closed graph such as a circle, an ellipse, or a regular polygon whose geometric center is located at a specified point. The secondary network element may be arranged on a boundary of at least one second graph. When the at least one second graph is a second graph, the second graph may include a circle, an ellipse, or a regular polygon whose geometric center is located at a specified point. When the at least one second graph is a plurality of second graphs, an overall graph formed by the plurality of second graphs may be a graph including concentric circles, concentric ellipses, or concentric regular polygons whose geometric center is located at a specified point. In addition, the second graph is located outside the first graph. Ring network elements in the ring subnet may be arranged on a boundary of a third graph. The third graph may include an ellipse or a curve formed by two parabolic equations that share a same minimum point.

Figure 4:
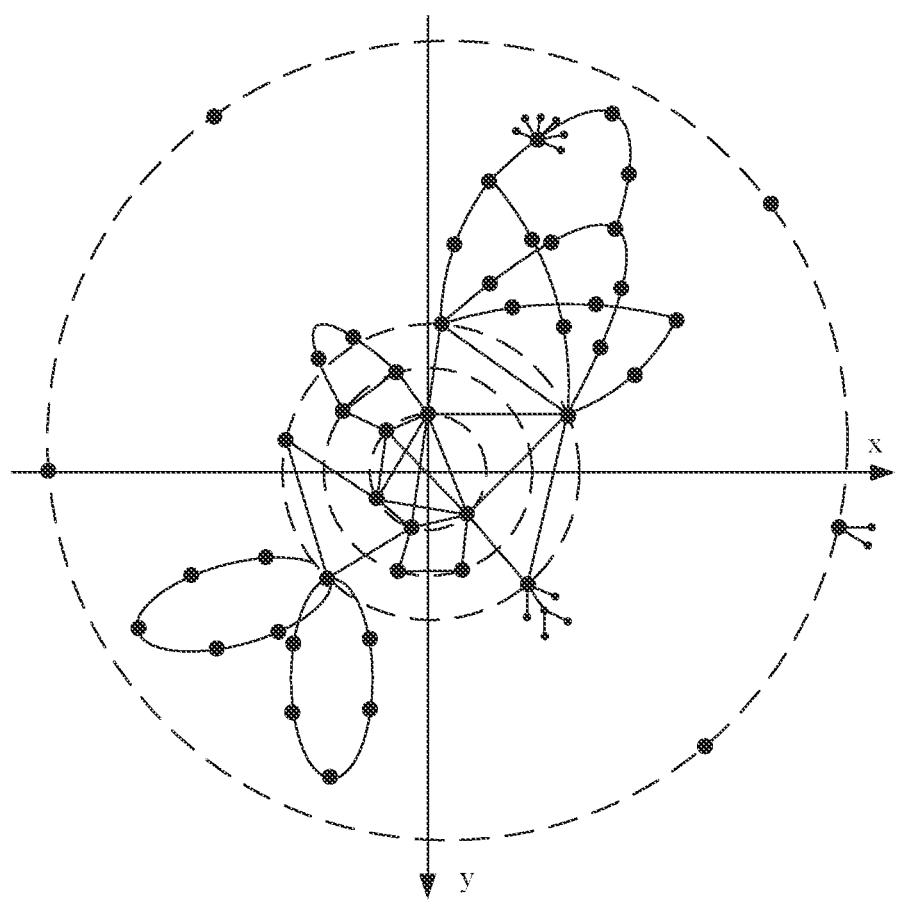
FIG. 4 is a schematic diagram of a centrifugal hierarchical layout according to an embodiment of this application.

For example, FIG. 4 is a schematic diagram of a centrifugal hierarchical layout. A black dot in FIG. 4 is a network element. A solid line between two network elements in FIG. 4 indicates that there is a connection relationship between the two network elements. A network element closer to a geometric center of a network topology shown in FIG. 4 is of a higher network grade. Therefore, it can be learned that network elements in FIG. 4 are arranged from inside to outside in a descending order of network grades by using a core network element that is of the highest network grade as a start point.

Figure 5:
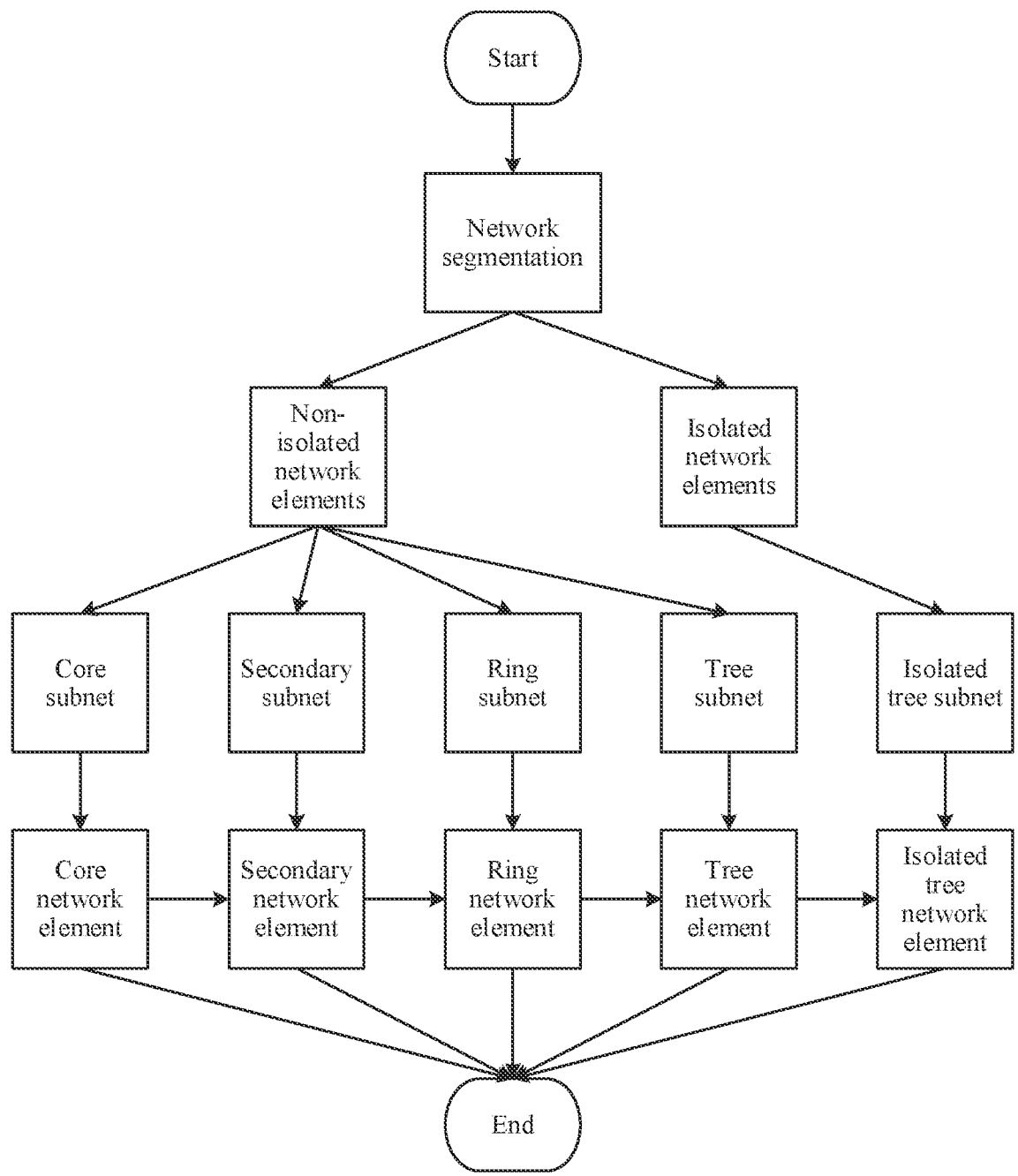
FIG. 5 is a schematic diagram of a procedure sequence of performing step 204 according to an embodiment of this application.

When the network topology is obtained through arrangement in the first layout mode, for a procedure execution sequence of step 204, refer to FIG. 5. After network segmentation is performed on the network, the core subnet, a secondary subnet, the ring subnet, and the tree subnet may be separately determined from non-isolated subnets obtained after the segmentation. Then, location information of the core network element is determined in the core subnet. Location information of the secondary network element is determined in the secondary subnet based on the location information of the core network element. Location information of the ring network element is determined in the ring subnet based on the location information of the core network element and/or the location information of the secondary network element. Then, location information of the tree network element is determined in the tree subnet based on the location information of the core network element, the location information of the secondary network element, and/or the location information of the ring network element. In addition, in the isolated tree subnet, the location information of the isolated tree network element is determined in the isolated tree subnet based on the location information of the core network element, the location information of the secondary network element, the location information of the ring network element, and/or the location information of the tree network element.

In a second layout mode, network elements in the network topology are arranged from top to bottom in a descending order of the network grades by using a network element that is of the highest network grade as a start point. In this case, an obtained network topology may be referred to as a tree topology. When the network elements in the network topology are arranged from top to bottom in a descending order of the network grades, a topology hierarchy of the network elements in the obtained network topology is clearer, and a relationship among a network structure, the network grades of the network elements, and different subnets can be clearly presented.

In addition, in the second layout mode, the core network element may be arranged on a boundary of a first graph. The first graph may be a closed graph such as a circle, an ellipse, or a regular polygon. Ring network elements in the ring subnet may be arranged on a boundary of a third graph. The third graph may include a graph such as a single parabolic line.

Figure 6:
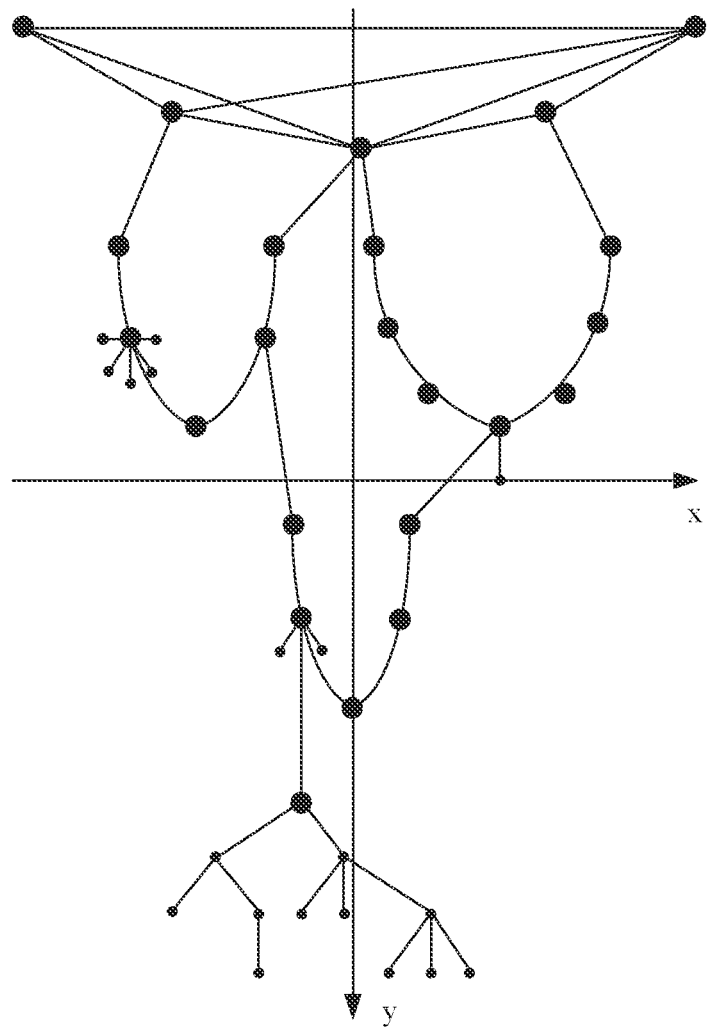
FIG. 6 is a schematic diagram of arrangement from top to bottom in a descending order of network grades according to an embodiment of this application.

For example, FIG. 6 is a schematic diagram in which network elements are arranged from top to bottom in a descending order of network grades. A black dot in FIG. 6 is a network element. A solid line between two network elements in FIG. 6 indicates that there is a connection relationship between the two network elements. A network element closer to the top of a network topology shown in FIG. 6 is of a higher network grade. Therefore, it can be learned that network elements in FIG. 6 are arranged from top to bottom in a descending order of the network grades by using a network element that is of the highest network grade as a start point.

Figure 7:
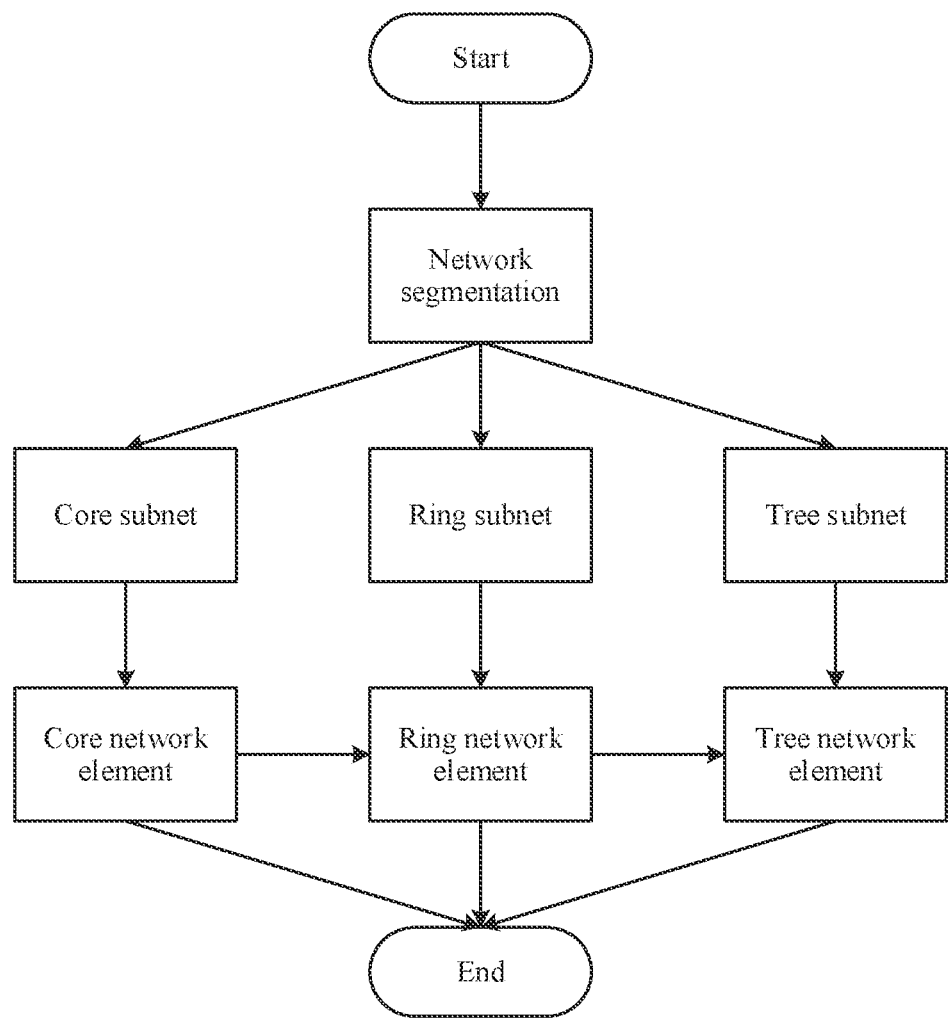
FIG. 7 is a schematic diagram of another procedure sequence of performing step 204 according to an embodiment of this application.

When the network topology is obtained through arrangement in the second layout mode, for a procedure execution sequence of step 204, refer to FIG. 7. After network segmentation is performed on the network, the core subnet, the ring subnet, and the tree subnet may be separately determined from non-isolated subnets obtained after the segmentation. Then, location information of the core network element is determined in the core subnet. Location information of the ring network element is determined in the ring subnet based on the location information of the core network element. Location information of the tree network element is determined in the tree subnet based on the location information of the core network element and/or the location information of the ring network element.

In addition, during execution of step 204, when types of network elements are different, implementations of step 204 are different. The following separately describes the implementations of step 204 for different types of network elements.

Figure 8:
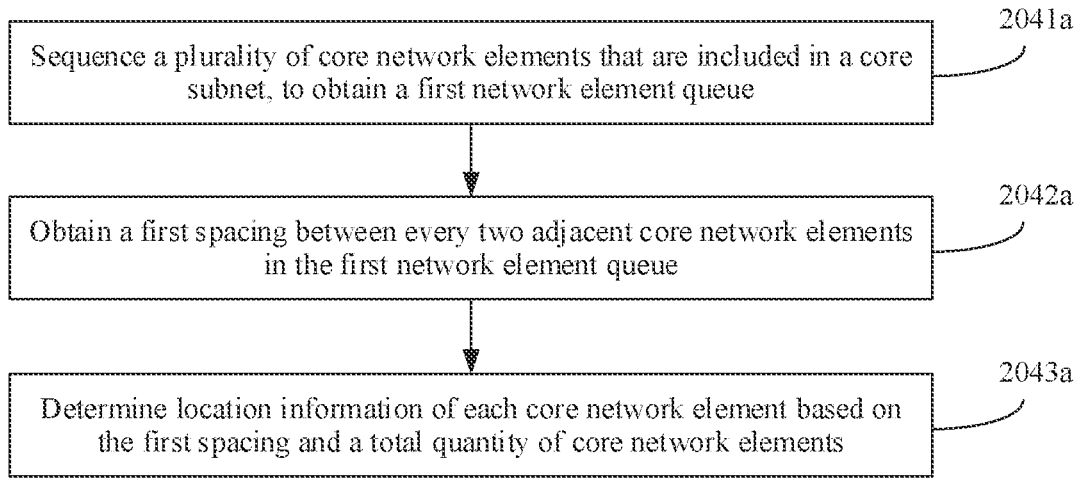
FIG. 8 is a flowchart of a method for determining location information of a core network element according to an embodiment of this application.

When a network element whose location information is to be determined is a core network element, as shown in FIG. 8, an implementation process of step 204 may include the following steps.

Step 2041*a*: Sequence a plurality of core network elements that are included in the core subnet, to obtain a first network element queue.

In a possible implementation, lengths of links of various core network elements may be obtained, and the plurality of core network elements may be sequenced based on the lengths of the links.

For example, in a network in which the core network elements are located, sizes of ring subnets that use the core network elements as start ring network elements and/or end ring network elements may be determined, and the plurality of core network elements are sequenced in a descending order of quantities of ring network elements included in the ring subnets. In addition, when no corresponding ring subnet exists in a core subnet, the core subnet is arranged at the tail of the first network element queue obtained after sequencing performed based on the quantity of ring network elements in the ring subnet.

When no ring subnet exists in the network in which all the core network elements are located, lengths of longest links including each core subnet are determined, and the plurality of core network elements are sequenced in a descending order of the longest links corresponding to the core subnet. In addition, when no corresponding longest link exists in a core subnet, the core subnet is sequentially arranged at the tail of the first network element queue obtained after sequencing performed based on lengths of longest links.

Step 2042*a*: Obtain a first spacing between every two adjacent core network elements in the first network element queue.

Optionally, the first spacing may be a specified value determined based on an actual requirement. When the network topology is obtained through arrangement in the second layout mode, the first spacing between every two core network elements in the network topology may be determined based on an actual requirement.

Figure 9:
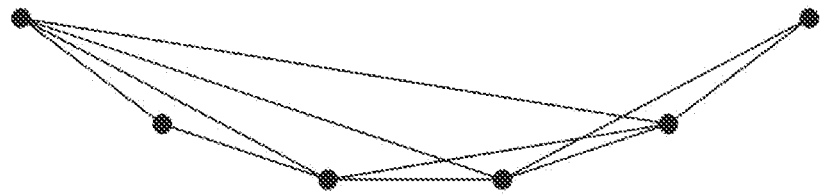
FIG. 9 is a schematic diagram of an arc model according to an embodiment of this application.

For example, in the second layout mode, the plurality of core network elements may be arranged on an arc whose central angle is less than 180 degrees. In other words, the plurality of core network elements are arranged according to an arc model shown in FIG. 9. In this case, the first spacing may be represented by a first included angle formed by lines connecting a specified point and two adjacent core network elements, and the first included angle may be equal to a specified included angle constant of the core network element layout.

Alternatively, the first spacing may be determined based on a first total quantity of connected network elements between two core network elements. Optionally, when the first spacing is represented by the first included angle formed by lines connecting a specified point and every two adjacent core network elements, an implementation process of determining the first spacing based on a first total quantity of connected network elements between two core network elements may include: determining a first total quantity proportion of the first total quantity in a second total quantity, and determining a product of the first total quantity proportion and 360 degrees as the first included angle. The second total quantity is a total quantity of connected network elements of all the core network elements.

Figure 10:
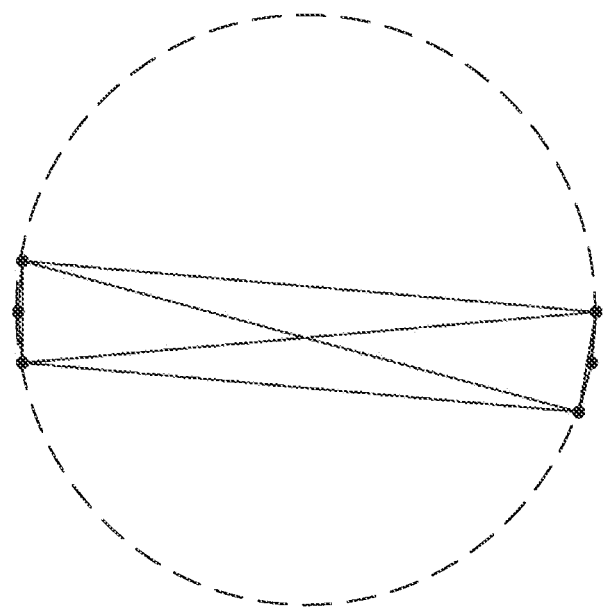
FIG. 10 is a schematic diagram of core network elements arranged on a circle according to an embodiment of this application.

For example, when the network topology is obtained through arrangement in the first layout mode, the plurality of core network elements may be arranged on a circle shown in FIG. 10. In this case, a first included angle $\theta_{ij}$ formed by lines connecting a specified point and a core network element i and a core network element j, the first total quantity $N_{ij}$, and the second total quantity $\Sigma N_{ij}$ may satisfy the following formula:

$$\theta_{ij} = \frac{2 \times \pi \times N_{ij}}{\sum N_{ij}}, j = i + 1$$

Step 2043a: Determine location information of each core network element based on the first spacing and a total quantity of core network elements.

Optionally, when the plurality of core network elements are arranged on the boundary of the first graph, an implementation process of step 2043a may include:

Step 2043a1: Determine a first fixed-length parameter of the first graph based on the total quantity of core network elements.

The first fixed-length parameter is used to indicate a geometric feature satisfied by points on the first graph.

In a possible implementation of step 2043a1, when the first graph is a circle and the network topology is arranged in the first mode, the first fixed-length parameter is a radius of the circle. The radius R and the total quantity $I_1$ of core network elements may satisfy the following formula:

$$R = \frac{k_1 \times I_1}{2 \times \pi},$$

where $k_1$ represents a radius rate constant of the core network element layout.

In another possible implementation of step 2043a1, when the first graph is a circle and the network topology is arranged in the second mode, the first fixed-length parameter is the radius of the circle. The radius R, the total quantity $I_1$ of core network elements, and the first included angle $\theta_{ij}$ formed by lines connecting the specified point and every two adjacent core network elements may satisfy the following formula:

$$R = \frac{(I_1 - 1) \times k_1}{\theta_{ij}},$$

where $k_1$ represents a radius rate constant of the core network element layout. In addition, in the second layout mode, the first included angle is a specified value.

Step 2043a2: Sequentially determine location information of all core network elements in the first network element queue in order of positions in the first network element queue, where the determining operation is performed based on the first fixed-length parameter and the first spacing.

Corresponding to the possible implementation of step 2043a1, when the first graph is a circle using the specified point as a circle center, location coordinates (xt,yt) of a $t^{th}$ core network element in the first network element queue, the radius R of the circle, and the first included angle $\theta_{ij}$ corresponding to the core network element i and the core network element j may satisfy the following formula:

$$\begin{cases} x_t = R \times \cos \sum \theta_{ij} = \frac{k_1 \times I_1}{2 \times \pi} \times \cos \sum \theta_{ij} \\ y_t = R \times \sin \sum \theta_{ij} = \frac{k_1 \times I_1}{2 \times \pi} \times \sin \sum \theta_{ij} \end{cases}, j = i+1, 1 \le i \le t-1$$

The location coordinates (xt,yt) are coordinates in a coordinate system shown in FIG. 4, and the specified point is an origin of the coordinate system. $k_1$ represents the radius rate constant of the core network element layout. $I_1$ represents the total quantity of core network elements.

Corresponding to the another possible implementation of step 2043a1, when the first graph is the circle using the specified point as a circle center, the location coordinates (xt,yt) of the $t^{th}$ network element in the first network element queue, an angle constant θ2 between the radius R of the first circle and the core network element layout may satisfy the following formula:

$$\begin{cases} x_t = R \times \cos\left(1.5 \times \pi - 0.5 \times \theta_2 + \frac{(t-1) \times \theta_2}{I_1 - 1}\right) = \frac{(I_1 - 1) \times k_1}{\theta_2} \times \cos\left(1.5 \times \pi - 0.5 \times \theta_2 + \frac{(t-1) \times \theta_2}{I_1 - 1}\right) \\ y_t = R \times \sin\left(1.5 \times \pi - 0.5 \times \theta_2 + \frac{(t-1) \times \theta_2}{I_1 - 1}\right) = \frac{(I_1 - 1) \times k_1}{\theta_2} \times \sin\left(1.5 \times \pi - 0.5 \times \theta_2 + \frac{(t-1) \times \theta_2}{I_1 - 1}\right) \end{cases}$$

The location coordinates (xt,yt) are coordinates in a coordinate system shown in FIG. 6, and the specified point is an origin of the coordinate system. $k_1$ represents the radius rate constant of the core network element layout. $I_1$ represents the total quantity of core network elements.

The core network element is arranged on the first graph, and the first spacing between the two core network elements is determined based on the first total quantity of connected network elements between the two core network elements. This ensures that no crossing exists among all connected network elements of a same core network element.

Figure 11:
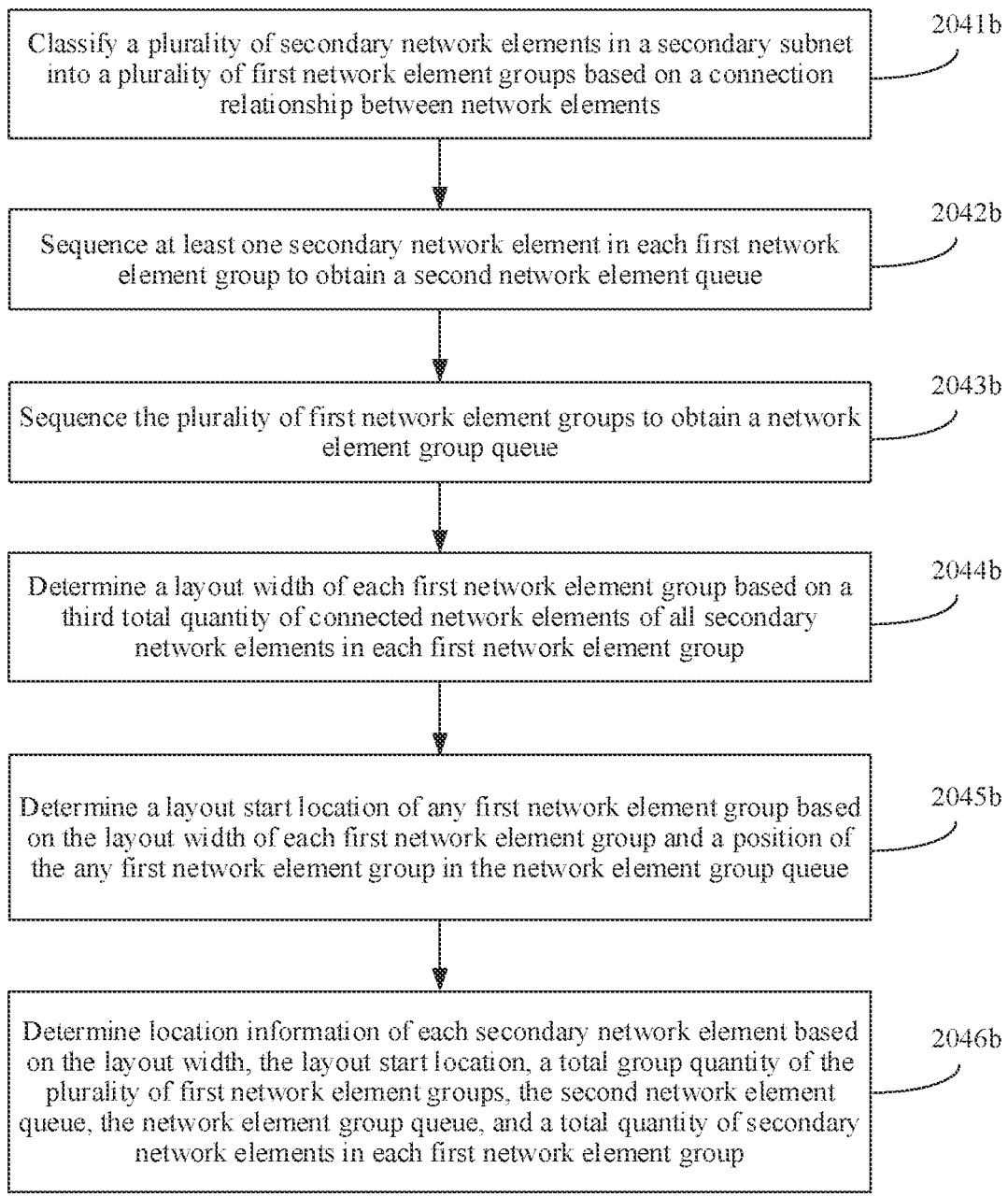
FIG. 11 is a flowchart of a method for determining location information of a secondary network element according to an embodiment of this application.

When a network element whose location information is to be determined is a secondary network element, as shown in FIG. 11, an implementation process of step 204 may include the following steps.

Step 2041b: Classify a plurality of secondary network elements in the secondary subnet into a plurality of first network element groups based on the connection relationship between the network elements.

Optionally, in the secondary network elements and links thereof, classification may be performed based on network connectivity. For example, secondary network elements that are directly connected may be grouped into a same first network element group, and secondary network elements that are not directly connected may be grouped into different first network element groups.

Step 2042b: Sequence at least one secondary network element in each first network element group to obtain a second network element queue.

Optionally, sequencing may be performed in a descending order of link lengths. For an implementation process, refer to the implementation process in step 2041a.

Step 2043b: Sequence the plurality of first network element groups to obtain a network element group queue.

Optionally, an implementation process of step 2043b may include the following steps.

Step 2043b1: Perform initial sequencing on the plurality of first network element groups in a descending order of third total quantities corresponding to the first network element groups, to obtain an initial network element group queue.

The third total quantity is a total quantity of connected network elements of all secondary network elements in the first network element group.

Step 2043b2: Re-sequence the initial network element group queue in a descending order of target distances corresponding to the first network element groups, to obtain a network element group queue.

The target distance is a distance from a location of the first network element group in the initial network element group queue to a central location of the initial network element group queue.

For example, after the initial sequencing is performed on the plurality of first network element groups in a descending order of the third total quantities corresponding to the first network element groups, a sequence of network element group 1, network element group 2, . . . , network element group I2-1, and network element group I2 in the initial network element group queue is 1, 2, 3, . . . , and I2. After the initial network element group queue is re-sequenced in a descending order of the target distances corresponding to the first network element groups, a sequence of the network element group 1, the network element group 2, . . . , the network element group I2-1, and the network element group I2 in the network element group queue is 1, I2, 2, I2-1, 3, . . . . In this way, in the network element group queue, for the plurality of first network element groups, network element groups with largest and smallest sequence numbers are alternately sequenced, so that the network topology determined based on the network element group queue is more even, and network grades between network elements are clearer.

Step 2044b: Determine a layout width of each first network element group based on the third total quantity of connected network elements of all secondary network elements in each first network element group.

Optionally, when the layout width of the first network element group is represented by a second included angle formed by lines connecting the specified point and two secondary network elements on an outermost side of the first network element group, an implementation process of step 2044b may include the following steps.

Step 2044b1: Determine a second total quantity proportion of the third total quantity corresponding to any first network element group in a fourth total quantity.

The fourth total quantity is a total quantity of connected network elements of all the secondary network elements in the plurality of first network element groups.

Step 2044b2: Determine the second included angle of the any first network element group based on the second total quantity proportion corresponding to the any first network element group.

Optionally, the second included angle may be considered as an angle occupied by each first network element group. A second included angle $\theta_i$, a third total quantity $N_i$, a fourth total quantity $\Sigma N_i$, and the total quantity $I_1$ of core network elements in an $i^{th}$ first network element group satisfy the following formula:

$$\theta_i = \frac{(2 \times \pi - I_1 \times \alpha) \times N_i}{\sum N_i},$$

where $\alpha$ represents an inter-group angle difference constant, that is, a represents an angle difference constant between every two adjacent first network element groups, and $$\frac{N_i}{\sum N_i}$$

represents the second total quantity proportion.

Step 2045b: Determine a layout start location of any first network element group based on the layout width of each first network element group and a position of the any first network element group in the network element group queue.

Optionally, when the layout start location of each first network element group is represented by a layout start angle, a layout start angle of the any first network element group is obtained based on the position of the any first network element group in the network element group queue and a layout width of another first network element group that is in the network element group queue and that is before the any first network element group. The layout start angle may be considered as a start layout angle of the any first network element group.

For example, a layout start angle $\beta_t$ of a $t^{th}$ first network element group in the network element group queue and the layout width $\theta_i$ of the another first network element group that is in the network element group queue and that is before the any first network element group satisfy the following formula:

$$\beta_t = (t-1) \times \alpha + \sum_{i=1}^{t-1} \theta_i, \text{ where}$$

where

α represents the angle difference constant between every two adjacent first network element groups.

Step 2046b: Determine location information of each secondary network element based on the layout width, the layout start location, a total group quantity of the plurality of first network element groups, the second network element queue, the network element group queue, and a total quantity of secondary network elements in each first network element group.

Figure 12:
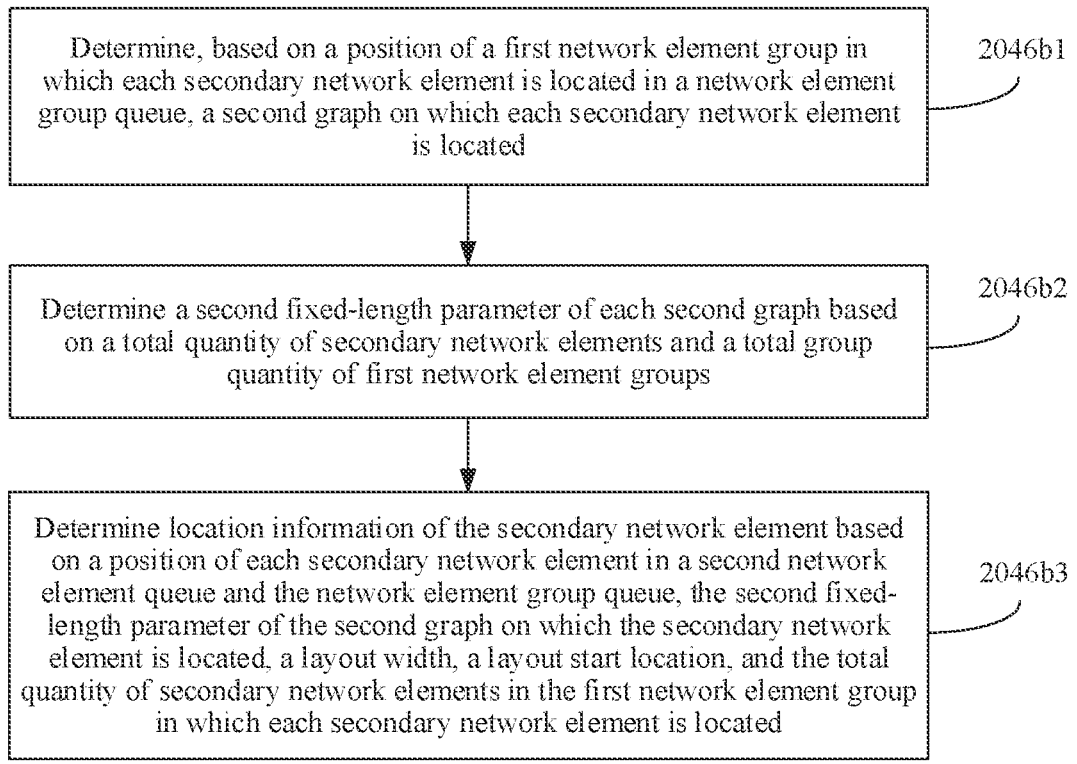
FIG. 12 is a flowchart of a method for determining location information of a secondary network element when a plurality of secondary network elements are arranged on a boundary of at least one second graph according to an embodiment of this application.

Optionally, as shown in FIG. 12, when a plurality of secondary network elements are arranged on a boundary of at least one second graph, an implementation process of step 2046b may include the following steps.

Step 2046b1: Determine, based on a position of the first network element group in which each secondary network element is located in the network element group queue, a second graph on which each secondary network element is located.

When a plurality of secondary network elements are arranged on a boundary of at least one second graph, before the location information of each secondary network element is determined, a second graph on which each secondary network element is located in the at least one second graph needs to be first determined, so as to determine the location information of the secondary network element based on graph parameters of the corresponding second graph.

Optionally, it is assumed that a plurality of secondary network elements are arranged on a plurality of second graphs, and the plurality of second graphs may be sequentially arranged from inside to outside. The plurality of first network element groups in the network element group queue are sequenced with large and small network element groups alternated. Therefore, an implementation of step 2046b1 may include: successively determining, based on a sequence of the first network element group in the network element group queue and a manner of cyclically arranging, from inside to outside, second graphs on which the first network element groups are located, the second graph on which each first network element group is located. Correspondingly, the second graph on which the first network element group is located is the second graph on which the secondary network element in the first network element group is located.

Figure 13:
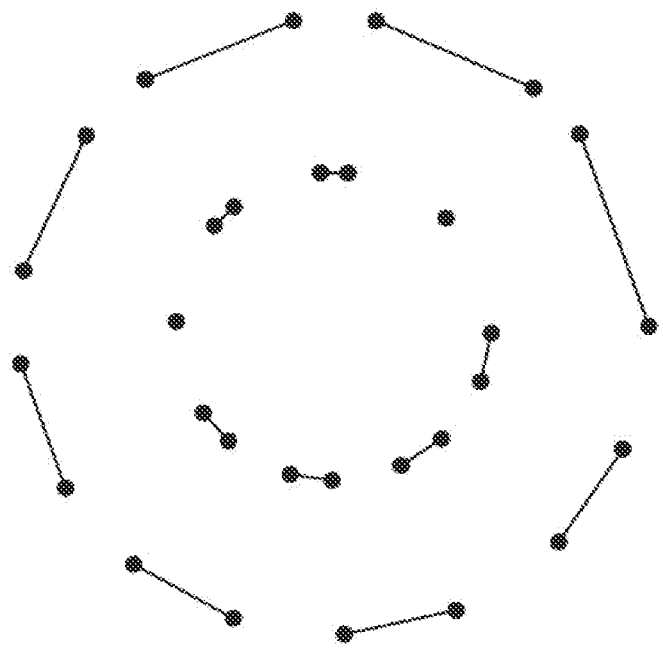
FIG. 13 is a schematic diagram of double circles according to an embodiment of this application.

For example, it is assumed that a plurality of secondary network elements are arranged on two second graphs, and an overall graph formed by the two second graphs is a graph including concentric circles (also referred to as double circles, and for a schematic diagram of the concentric circles, refer to FIG. 13). When a circle on which the first network element group is located is determined, it may be determined that a first network element group with an odd sequence number in the network element group queue is located on the inner circle. In other words, a secondary network element in the first network element group with an odd sequence number is located on the inner circle. Correspondingly, a first network element group with an even sequence number is located on the outer circle. In other words, a secondary network element in the first network element group with an even sequence number is located on the outer circle.

Step 2046b2: Determine a second fixed-length parameter of each second graph based on the total quantity of secondary network elements and the total group quantity of the first network element groups.

The second fixed-length parameter is used to indicate a geometric feature satisfied by points on the corresponding second graph. For example, when the second graph is a circle, the second fixed-length parameter is a radius of the circle.

Optionally, when the plurality of second graphs have a same geometric center, and the second graphs are rotational symmetry graphs of each other, it is assumed that a second fixed-length parameter of an innermost second graph located in the at least one second graph is Q1. A second fixed-length parameter Q2 of a second graph other than the innermost second graph in the plurality of second graphs and the second fixed-length parameter Q1 of the innermost second graph should satisfy the formula: Q2=N×Q1, where a is a ratio of a perimeter of the second graph other than the innermost graph to a perimeter of the innermost second graph.

For example, when a plurality of secondary network elements are arranged on two second graphs, and an overall graph formed by the two second graphs is a graph including concentric circles, an implementation process of step 2046b2 may include: separately determining radii of the two circles. A radius of the outer circle is N times a radius of the inner circle.

For example, when a ratio of a perimeter of the inner circle to a perimeter of the outer circle is 1:2, a radius $r_t$ of a $t^{th}$ circle in the network element group queue, a total quantity M of secondary network elements, and a total quantity I3 of first network element groups may satisfy the following formula:

$$r_t = \begin{cases} \dfrac{2 \times k_2 \times M}{2 \times \pi - I_3 \times \alpha}, & t \in \text{ even number} \\ \dfrac{k_2 \times M}{2 \times \pi - I_3 \times \alpha}, & t \in \text{ odd number} \end{cases},$$

where $k_2$ represents a radius rate constant of the secondary network element layout, and a represents the angle difference constant between every two adjacent first network element groups.

Step 2046b3: Determine the location information of the secondary network element based on a position of each secondary network element in the second network element queue, the second fixed-length parameter of the second graph on which the secondary network element is located, the layout width, the layout start location, and the total quantity of secondary network elements in the first network element group in which each secondary network element is located.

Optionally, the second fixed-length parameter $r_i$ of the second graph on which the secondary network element is located, the layout width $\theta_i$, the layout start location $\beta_i$, a total quantity $M_i$ of secondary network elements in an $i^{th}$ group, and coordinates $(x_{ij}, y_{ij})$ of a $j^{th}$ secondary network element in the $i^{th}$ first network element group in the network element group queue may satisfy the following formula:

$$\begin{cases} x_{ij} = r_i \times \cos\left(\beta_i + \dfrac{(j-1) \times \theta_i}{M_i}\right) \\ y_{ij} = r_i \times \sin\left(\beta_i + \dfrac{(j-1) \times \theta_i}{M_i}\right) \end{cases}$$

The secondary network elements are arranged on the second graph, and the layout width of each first network element group is determined based on the third total quantity of connected network elements of all the secondary network elements in each first network element group. This ensures that no crossing exists among all the connected network elements in each first network element group.

Figure 14:
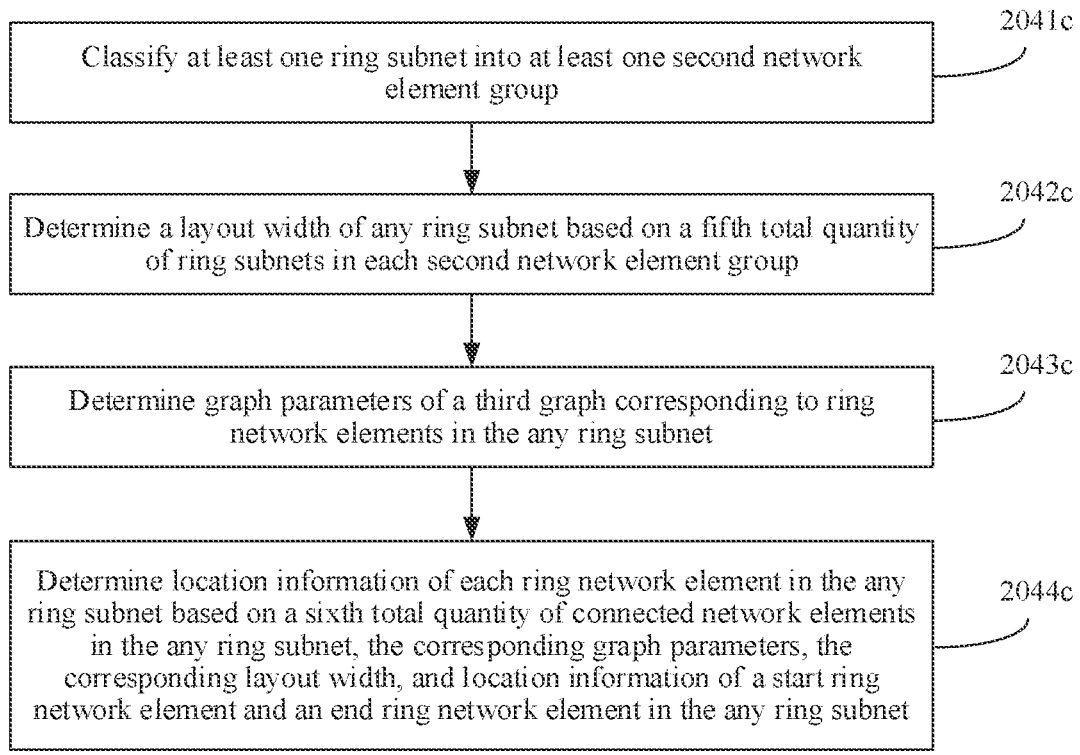
FIG. 14 is a flowchart of a method for determining location information of a ring network element according to an embodiment of this application.

When a network element whose location information is to be determined is a ring network element, as shown in FIG. 14, an implementation process of step 204 may include the following steps.

Step 2041c: Classify at least one ring subnet into at least one second network element group.

When ring network elements are arranged in different layout modes, implementations of step 2041c are different. The following uses the following two possible implementations as examples for description.

When the ring network elements in the ring subnet are arranged in the first layout mode, the implementation of step 2041c may include: classifying ring subnets having a same start ring network element and a same end ring network element into a same second network element group, to obtain at least one second network element group.

When the ring network elements in the ring subnet are arranged in the second layout mode, the implementation of step 2041c may include: classifying ring subnets of a same ring level into a same second network element group, to obtain the at least one second network element group.

Step 2042c: Determine a layout width of any ring subnet based on a fifth total quantity of ring subnets in each second network element group.

The layout width of any ring subnet may be represented by a third included angle of the any ring subnet. When the ring network elements are arranged in different layout modes, implementations of step 2042c are different. The following uses the following three possible implementations as examples for description.

Figure 15:
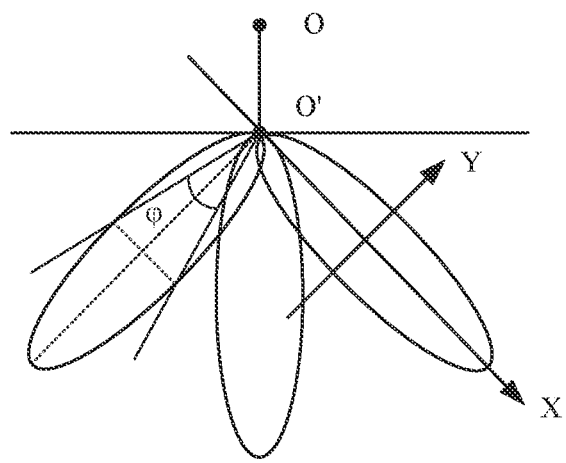
FIG. 15 is a schematic diagram of a third included angle according to an embodiment of this application.

In a first possible implementation, when the ring network elements in the ring subnet are arranged in the first layout mode, and the ring network elements are arranged on a boundary of an ellipse, a quotient obtained by dividing 180 degrees by the fifth total quantity corresponding to any second network element group may be determined as the third included angle occupied by each ring subnet in the any second network element group. The third included angle may be considered as an included angle formed by lines connecting a home point and two endpoints of a minor axis of the ellipse. For example, referring to FIG. 15, the third included angle is an included angle φ formed by lines connecting a home point O' and two endpoints of a minor axis of the ellipse.

In a second possible implementation, when the ring network elements in the ring subnet are arranged in the first layout mode, and the ring network elements are arranged on a boundary of a curve formed by two parabolic equations that share a same minimum point, a fourth included angle formed by a first connection line and a second connection line may be determined. In addition, a quotient obtained by dividing the fourth included angle by a target total quantity is determined as a third included angle formed by third connection lines of every two adjacent ring subnets in the any second network element group.

In other words, when both the fourth included angle and the target total quantity are available, the third included angle formed by third connection lines of every two adjacent ring subnets may be determined. The third connection line is a connection line jointly determined by using a vertex of the ring subnet and the specified point, and the specified point is a known point. Therefore, after the third included angle is determined, it may be determined that a vertex of the curve, formed by two parabolic equations that share a same minimum point, corresponding to each ring subnet is in the third connection line.

The target total quantity is equal to the fifth total quantity corresponding to the any second network element group minus 1. The first connection line connects a specified point and a start ring network element in any second network element group, and the second connection line connects the specified point and an end ring network element in the any second network element group.

Figure 16:
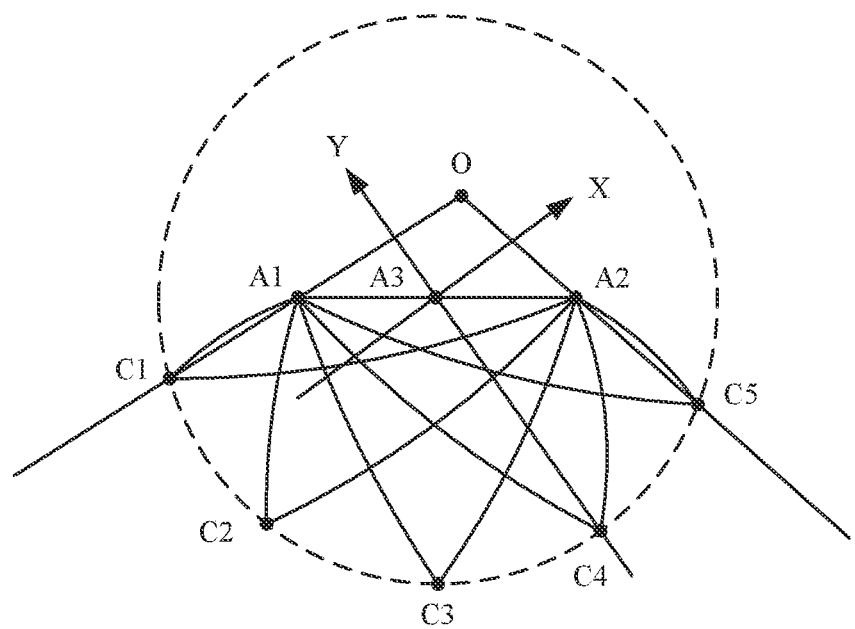
FIG. 16 is a schematic diagram of arranging five ring subnets on a boundary of a curve formed by two parabolic equations that share a same minimum point according to an embodiment of this application.

For example, for a schematic diagram in which five ring subnets in the second network element group are arranged on boundaries of curves each formed by two parabolic equations that share a same minimum point, refer to FIG. 16. A target total quantity is equal to 5−1=4. A line connecting a start ring network element A1 and a specified point O is a first connection line OA1. A line connecting an end ring network element A2 and the specified point O is a second connection line OA2. An included angle between the first connection line OA1 and the second connection line OA2 is a fourth included angle. A third connection line determined by using a vertex C1 of a ring subnet 1 and the specified point O coincides with the first connection line. The third connection line corresponding to the ring subnet 1 is the first connection line OA1. Similarly, because the third connection line determined by using a vertex C5 of a ring subnet 5 and the specified point O coincides with the second connection line, the third connection line corresponding to the ring subnet 1 is the second connection line OA2. A connection line determined by using a vertex C2 of a ring subnet 2 and the specified point O is a third connection line OC2. A connection line determined by using a vertex C3 of a ring subnet 3 and the specified point O is a third connection line OC3. A connection line determined by using a vertex C4 of a ring subnet 4 and the specified point O is a third connection line OC4. It can be learned from FIG. 16 that, it is equivalent that the five third connection lines corresponding to the five ring subnets quadrisect the fourth included angle, and an angle obtained after quadrisection is the third included angle corresponding to every two adjacent ring subnets.

In a third possible implementation, when the ring network elements in the ring subnet are arranged in the second layout mode, the layout width of the any ring subnet may be determined based on a sixth total quantity corresponding to the any ring subnet.

For example, when the ring subnets are arranged on a parabolic line, and spacings between every two adjacent ring network elements in the ring subnet are equal, the layout width of the any ring subnet may be determined based on a constant term of the parabola and a sum of the spacings between all the ring network elements in the any ring subnet.

For example, the layout width of the any ring subnet may be determined based on the sum of the spacings and the constant term and by using a principle of the Pythagorean theorem. In other words, a layout width $w_{ij}$ of a $j^{th}$ ring subnet in an $i^{th}$ second network element group, a quantity $M_{ij}$ of connected network elements of the $j^{th}$ ring subnet in the $i^{th}$ second network element group, an ideal distance constant D between adjacent ring network elements, and a constant term b of a parabola satisfy the following formula:

$$w_{ij}=\sqrt{(M_{ij}-1)^2 \times D^2 - 4 \times b^2}$$

Step 2043c: Determine graph parameters of a third graph corresponding to ring network elements in the any ring subnet.

The ring network elements that are included in the any ring subnet are arranged on a boundary of the corresponding third graph, and the graph parameters of the third graph are used to indicate a geometric feature satisfied by points on the corresponding third graph. Optionally, the third graph may include a graph such as an ellipse, a curve formed by two parabolic equations that share a same minimum point, or a parabola (also referred to as a single parabola). When the third graph is an ellipse, the graph parameters are ellipse parameters. When the third graph is a curve formed by two parabolic equations that share a same minimum point, the graph parameters are parameters of the curve formed by two parabolic equations that share a same minimum point. When the third graph is a single parabola, the graph parameters are single parabolic parameters.

Figure 17:
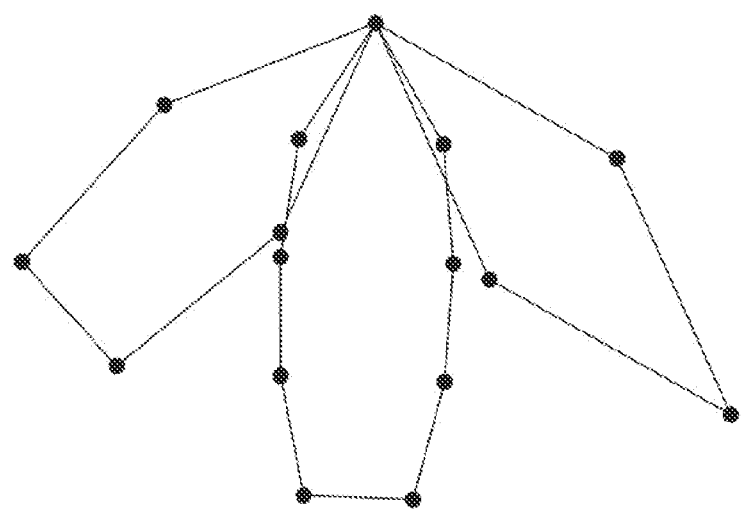
FIG. 17 is a schematic diagram of arranging ring network elements in a plurality of ring subnets on boundaries of a plurality of ellipses according to an embodiment of this application.
Figure 18:
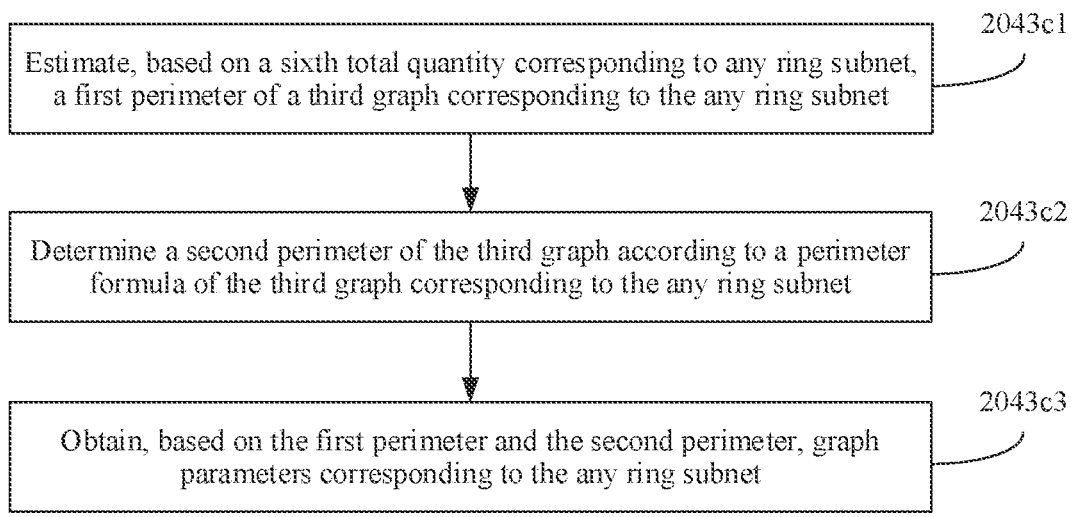
FIG. 18 is a flowchart of a method for determining graph parameters of a third graph corresponding to a ring network element in any ring subnet according to an embodiment of this application.

In a possible implementation of step 2043c, when the ring subnet is a single-homed ring, the ring subnet may be arranged on a boundary of a graph such as an ellipse. For example, for a schematic diagram in which ring network elements of a plurality of ring subnets having a same home point are arranged on boundaries of a plurality of ellipses, refer to FIG. 17 again. In this case, as shown in FIG. 18, an implementation process of step 2043c may include the following steps.

Step 2043c1: Estimate, based on the sixth total quantity corresponding to the any ring subnet, a first perimeter of the third graph corresponding to the any ring subnet.

Optionally, the first perimeter of the third graph corresponding to the ring subnet may be estimated based on a sixth total quantity I4 of connected network elements of the ring subnet and a distance constant between two adjacent ring network elements in the ring subnet. For example, the sixth total quantity I4 of connected network elements of the $i^{th}$ ring subnet in the second network element group, the distance constant D between two adjacent ring network elements in the ring subnet, and a first perimeter L1 may satisfy the following formula:

$$L1=(\max\, I_4+1) \times D$$

Step 2043c2: Determine a second perimeter of the third graph according to a perimeter formula of the third graph corresponding to the any ring subnet.

A standard equation for an ellipse is:

$$\frac{x^2}{a^2} + \frac{y^2}{b^2} = 1, \, a/b = k_3,$$

where a and b are elliptical parameters, and $k_3$ is a control parameter for an ellipse.

According to the standard equation for an ellipse, a perimeter formula satisfied by a second perimeter L2 of the ellipse, and the elliptical parameters a and b may be obtained as follows:

$$L2=\pi \times (1.5 \times (a+b) - \sqrt{a \times b})$$

Step 2043c3: Obtain, based on the first perimeter and the second perimeter, the graph parameters corresponding to the any ring subnet.

Because the first perimeter and the second perimeter are perimeters that are of a same ellipse and that are determined from different angles, the first perimeter and the second perimeter are supposed to be equal, and both include the elliptical parameters a and b. Therefore, assuming that the first perimeter and the second perimeter are equal, the elliptical parameters of the ellipse may be obtained as follows based on a proportional relationship between a and b:

$$\begin{cases} b = \dfrac{(\max\, N_i + 1) \times D}{\pi \times (1.5k - \sqrt{k} + 1.5)} \\ a = k \times b \end{cases}$$

Figure 19:
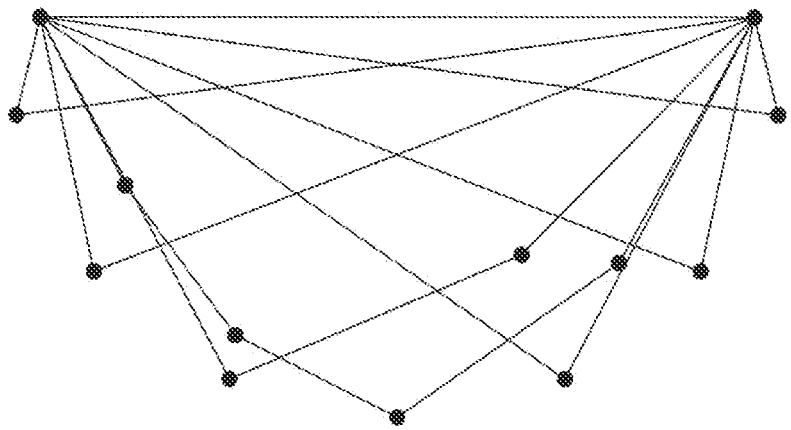
FIG. 19 is a schematic diagram of arranging ring network elements in a plurality of ring subnets on a boundary of a plurality of curves each formed by two parabolic equations that share a same minimum point according to an embodiment of this application.
Figure 20:
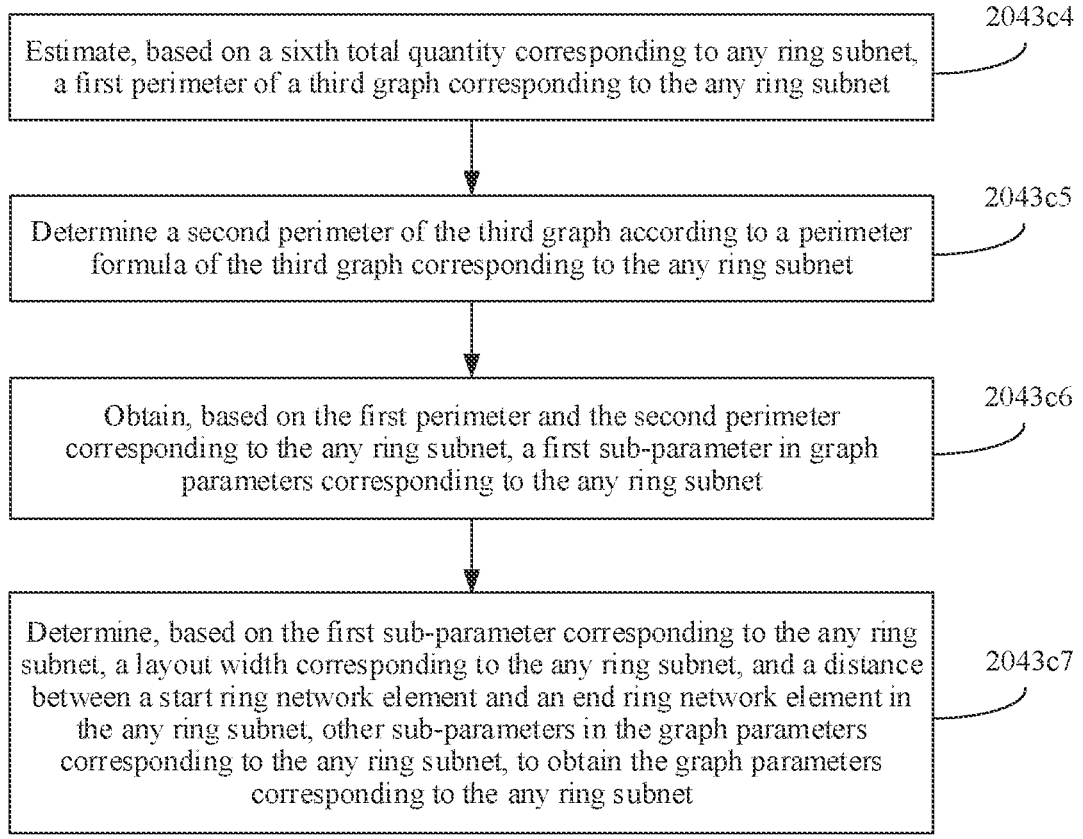
FIG. 20 is a flowchart of another method for determining graph parameters of a third graph corresponding to a ring network element in any ring subnet according to an embodiment of this application.

In another possible implementation of step 2043c, when the ring subnet is a dual-homed ring subnet, the ring subnet may be arranged on a boundary of the curve formed by two parabolic equations that share a same minimum point. For example, for a schematic diagram in which ring network elements of a plurality of ring subnets having a same home point are arranged on boundaries of a plurality of curves each formed by two parabolic equations that share a same minimum point, refer to FIG. 19. In this case, as shown in FIG. 20, the implementation process of step 2043c may include the following steps.

Step 2043c4: Estimate, based on the sixth total quantity corresponding to the any ring subnet, the first perimeter of the third graph corresponding to the any ring subnet.

For an implementation process of step 2043c4, refer to the implementation process of step 2043c1. Therefore, it can be learned that the sixth total quantity 14 of connected network elements of the $i^{th}$ ring subnet in the second network element group, the distance constant D between two adjacent ring network elements in the ring subnet, and the first perimeter L1 may satisfy the following formula:

$$L1=(\max\, I_4+1) \times D$$

Step 2043c5: Determine the second perimeter of the third graph according to the perimeter formula of the third graph corresponding to the any ring subnet.

A standard equation for a curve formed by two parabolic equations that share a same minimum point is:

$$y = \begin{cases} a_1 \times x^2 - b, \, x < 0 \\ a_2 \times x^2 - b, \, x \geq 0 \end{cases},$$

where a1, a2, and b are all parameters of the curve formed by two parabolic equations that share a same minimum point.

Because a graphic property satisfied by the curve formed by two parabolic equations that share a same minimum point is similar to a graphic property satisfied by the single parabola, the second perimeter of the curve formed by two parabolic equations that share a same minimum point may be estimated according to a perimeter formula of the single parabola. Assuming that the parameters a1 and a2 of the curve formed by two parabolic equations that share a same minimum point are equal, the following parabola arc length equation L(b) of the second perimeter for the curve formed by two parabolic equations that share a same minimum point may be obtained as follows:

$$L(b) = \int_{-d/2}^{d/2} \sqrt{1 + 4\left(\frac{4 \times b}{d^2}\right)^2 \times x} \, dx =$$

$$\frac{d}{2}\sqrt{1 + \left(\frac{4 \times b}{d}\right)^2} + \frac{d^2}{16 \times b} \ln \frac{\sqrt{1 + \left(\frac{4 \times b}{d}\right)^2} + \frac{4 \times b}{d}}{\sqrt{1 + \left(\frac{4 \times b}{d}\right)^2} - \frac{4 \times b}{d}},$$

where d represents a distance between two home points of any ring subnet, namely, a distance between a start ring network element and an end ring network element in the any ring subnet.

Step 2043c6: Obtain, based on the first perimeter and the second perimeter corresponding to the any ring subnet, a first sub-parameter in the graph parameters corresponding to the any ring subnet.

The parabola arc length equation L(b) is monotonically increasing in the interval (0,+∞), and the first perimeter L1 is a constant. Therefore, after the first perimeter and the second perimeter of the curve formed by two parabolic equations that share a same minimum point are obtained, the parameter b may be solved in a dichotomy iteration manner, that is, the parameter b is the first sub-parameter of the parameters of the curve formed by two parabolic equations that share a same minimum point.

Step 2043c7: Determine, based on the first sub-parameter corresponding to the any ring subnet, the layout width corresponding to the any ring subnet, and the distance between the start ring network element and the end ring network element in the any ring subnet, other sub-parameters in the graph parameters corresponding to the any ring subnet, to obtain the graph parameters corresponding to the any ring subnet.

Figure 21:
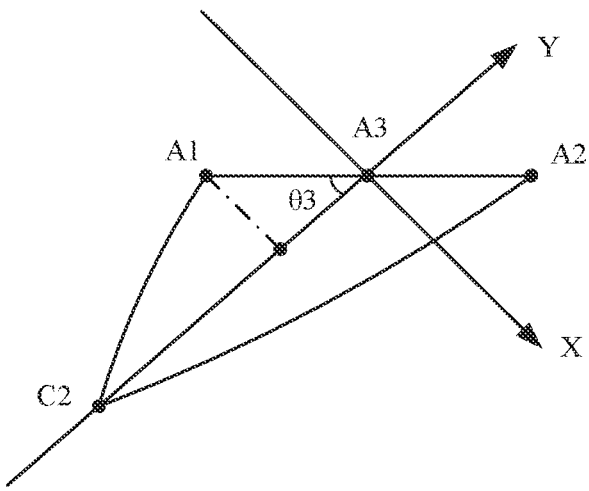
FIG. 21 is a partial schematic diagram of FIG. 16 according to an embodiment of this application.

Optionally, other sub-parameters a1 and a2, the first sub-parameter b, and the distance d (namely, the distance d between two home points) between the start ring network element and the end ring network element in the any ring subnet in the curve formed by two parabolic equations that share a same minimum point may satisfy the following formula:

$$\begin{cases} a_1 = \dfrac{4 \times b - 2 \times d \times \cos\theta_3}{(d \times \sin\theta_3)^2} \\ a_2 = \dfrac{4 \times b + 2 \times d \times \cos\theta_3}{(d \times \sin\theta_3)^2} \end{cases}$$

θ3 is an included angle occurring after counterclockwise turning a left end of a line of two home points of the ring subnet to the third connection line of the ring subnet. For example, FIG. 21 is a partial schematic diagram of FIG. 16. Referring to FIG. 21, the connection line determined by using the vertex C2 of the ring subnet 2 and the specified point O is the third connection line OC2, and an included angle occurring after counterclockwise turning a left end of a line A1A2 of two home points to the third connection line OC2 is θ3. A process of determining the included angle θ3 includes: after the third included angle corresponding to the any ring subnet is determined, determining a ring subnet that is in the second network element group in which the any ring subnet is located and that is arranged on the left side of the any ring subnet, and a third included angle corresponding to the ring subnet located on the left side of the any ring subnet; and determining, as the included angle θ3, a sum of the third included angle corresponding to the any ring subnet and the third included angle corresponding to the ring subnet on the left side of the any ring subnet.

Figure 22:
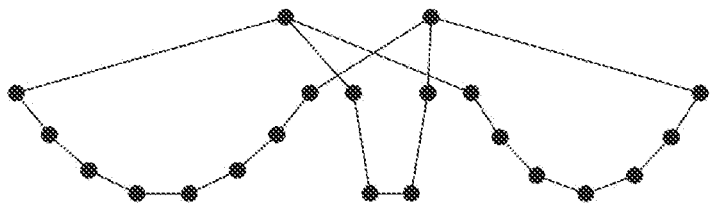
FIG. 22 is a schematic diagram of arranging ring network elements in a plurality of ring subnets on boundaries of a plurality of single parabolic lines according to an embodiment of this application.
Figure 23:
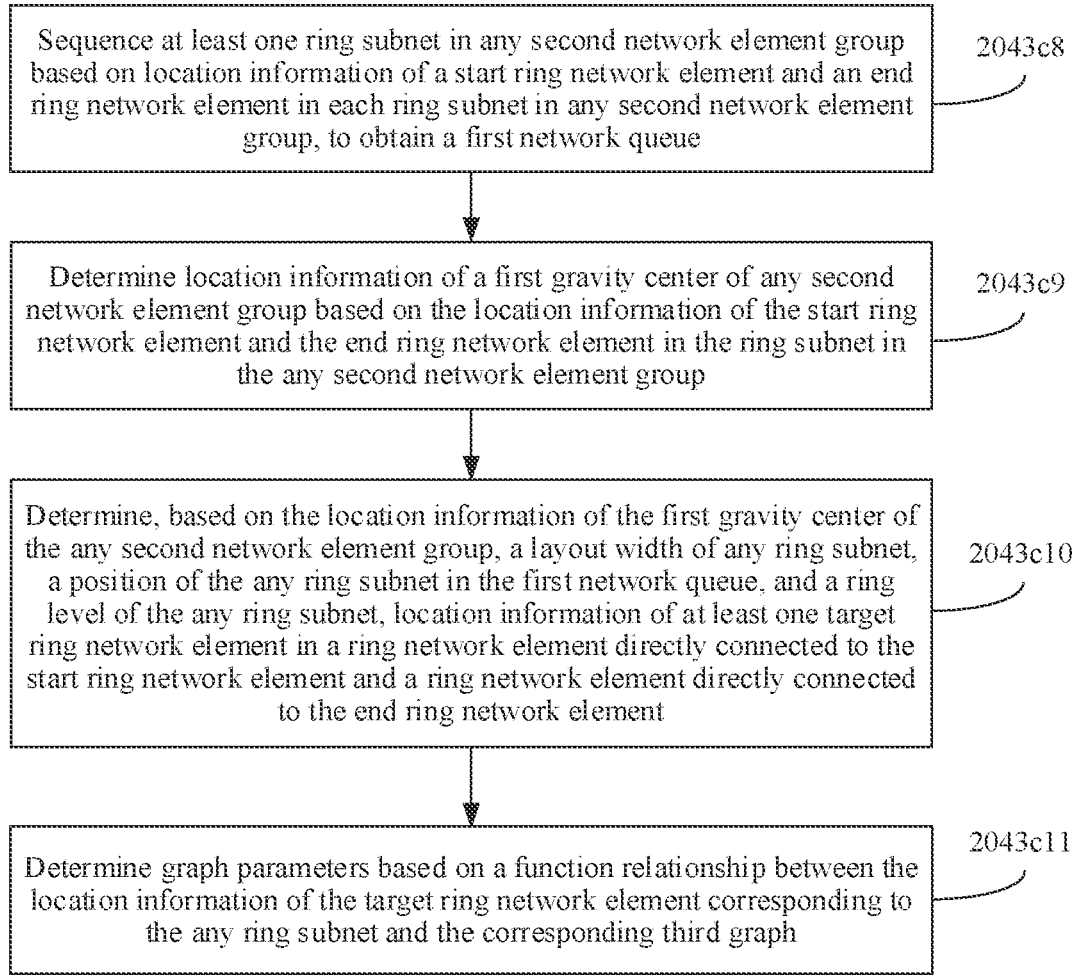
FIG. 23 is a flowchart of still another method for determining graph parameters of a third graph corresponding to a ring network element in any ring subnet according to an embodiment of this application.

In still another possible implementation of step 2043c, when the ring subnet is a dual-homed ring subnet, the ring subnet may be arranged on a boundary of a single parabolic line. For example, for a schematic diagram in which ring network elements of a plurality of ring subnets having a same home point are arranged on boundaries of a plurality of parabolic lines, refer to FIG. 22. In this case, as shown in FIG. 23, the implementation process of step 2043c may include the following steps.

Step 2043c8: Sequence at least one ring subnet in any second network element group based on location information of a start ring network element and an end ring network element in each ring subnet in the any second network element group, to obtain a first network queue.

Optionally, an average value of coordinates of a start ring network element and an end ring network element in each ring subnet in a coordinate direction may be calculated based on the location information of the start ring network element and the end ring network element in each ring subnet. Then, the at least one ring subnet in the any second network element group is sequenced in ascending order of average values of coordinates, to obtain the first network queue.

In addition, in the second layout mode, the network elements are arranged from top to bottom in a descending order of network grades, that is, a layout direction is parallel to a y-coordinate direction. Therefore, in a process of performing step 2043c8, at least one ring subnet may be sequenced based on an average value of x coordinates of the ring network elements.

Step 2043c9: Determine location information of a first gravity center of any second network element group based on the location information of the start ring network element and the end ring network element in the ring subnet in the any second network element group.

In the second layout mode, the network elements are arranged from top to bottom in a descending order of network grades, that is, a layout direction is parallel to a y-coordinate direction. Therefore, an implementation process of step 2043c9 may include: determining location information of the first gravity center of any second network element group in the x-coordinate direction. Correspondingly, the first gravity center of any second network element group may be understood as a gravity center of the any second network element group in the x-coordinate direction. The location information of the first gravity center of the any second network element group in the x-coordinate direction is equal to a quotient obtained by dividing a sum of coordinates of start ring network elements and end ring network elements in all ring subnets in the group in the x-coordinate direction by the fifth total quantity corresponding to the any second network element group.

Step 2043c10: Determine, based on the location information of the first gravity center of the any second network element group, the layout width of the any ring subnet, a position of the any ring subnet in the first network queue, and a ring level of the any ring subnet, location information of at least one target ring network element in a ring network element directly connected to the start ring network element and a ring network element directly connected to the end ring network element.

During determining of the single parabolic parameter of the single parabola, location information of a ring network element in the ring subnet may be first determined based on the location information of the start ring network element and the end ring network elements, and then the location information of the ring network element is substituted into the standard equation for the single parabola, to obtain the single parabolic parameter. The ring network element whose location information is to be calculated in the ring subnet may be any ring network element in a new ring subnet that is formed by ring network elements other than the start ring network element and the end ring network element in the ring subnet.

After the location information of the first gravity center of any second network element group is determined, a layout location of the any second network element group may be determined. During determining of the location information of the ring network element in the ring subnet of the second network element group, location information of the ring network element in the ring subnet in the x-coordinate direction may be determined based on the layout location and information such as the layout width of each ring subnet and the position of the ring subnet in the first network queue, and then location information of the ring network element in the ring subnet in the y-coordinate direction is determined based on information such as the ring level of the ring subnet.

Optionally, for ease of calculation, the ring network element whose location information is to be calculated may be a start ring network element and an end ring network element in the new ring subnet. For example, in the second layout mode, for the $t^{th}$ ring subnet in the first network queue corresponding to the $i^{th}$ second network element group, location information $(x^s_{it}, y^s_{it})$ of the start ring network element in the new ring subnet corresponding to the $t^{th}$ ring subnet, the layout width $w_{ij}$ of each ring subnet in the first network queue, location information $z_i$ of the first gravity center of the second network element group in the x-coordinate direction, and a ring level $k_4$ of the ring subnet satisfy the following formula:

$$\begin{cases} x^s_{it} = \sum_{j=1}^{t-1} w_{ij} + (t-1) \times d_{rw} - \frac{1}{2} \times \sum_{j=1}^{J} w_{ij} + z_i \\ y^s_{it} = y_{min1} - k_4 \times d_{rh} - (k_4 - 1) \times b \end{cases},$$

where $y_{min1}$ represents a minimum value of the y coordinate of the core network element, $d_{rw}$ represents a spacing constant of the ring subnet in the x-coordinate direction, and $d_{rh}$ represents a spacing constant, in the y-coordinate direction, of the second network element group in which the ring subnet is located.

Location information $(x^e_{it}, y^e_{it})$ of the end ring network element in the new ring subnet and a layout width $w_{it}$ of the new ring subnet satisfy the following formula:

$$\begin{cases} x^e_{it} = x^s_{it} + w_{it} \\ y^e_{it} = y^s_{it} \end{cases}$$

For an implementation process of obtaining the layout width of the new ring subnet, refer to the implementation process of obtaining the layout width of any ring subnet in step 2042c.

Step 2043c11: Determine the graph parameters based on a function relationship between the location information of the target ring network element corresponding to the any ring subnet and the corresponding third graph.

A standard equation for a single parabola is:

$y = ax^2 - b$, where b is a constant.

Ring network elements in the new ring subnet are all arranged on the single parabola, location information of all the ring network elements in the new ring subnet should satisfy the standard equation. Therefore, location information that is already available and that is of ring network elements in the new ring subnet may be substituted into the standard equation, to obtain a single parabolic parameter a. Either location information $(x^s, y^s)$ of the location information $(x^s_{it}, y^s_{it})$ of the start ring network element and the location information $(x^e_{it}, y^e_{it})$ of the end ring network element in the new ring subnet is substituted into the standard equation, and the following may be obtained:

$$a = \frac{b + y^s}{(x^s)^2}$$

Step 2044c: Determine location information of each ring network element in the any ring subnet based on a sixth total quantity of connected network elements in the any ring subnet, the corresponding graph parameters, the corresponding layout width, and location information of a start ring network element and an end ring network element in the any ring subnet.

Figure 24:
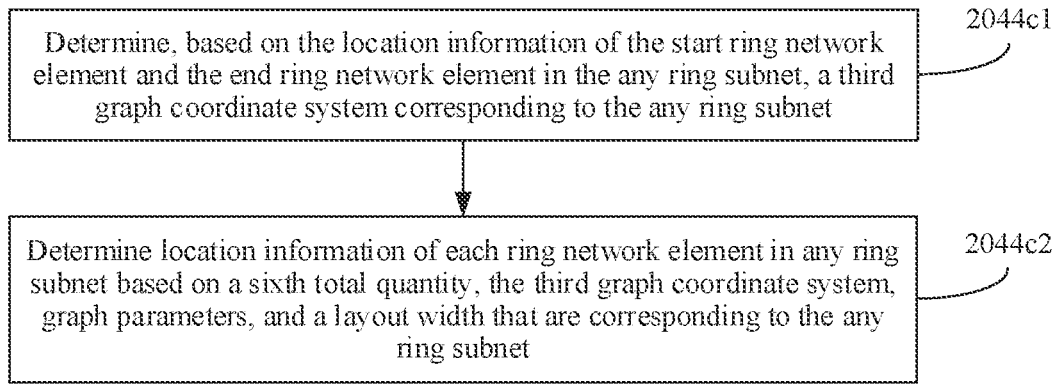
FIG. 24 is a flowchart of a method for determining location information of each ring network element in any ring subnet according to an embodiment of this application.

When the ring network elements in the ring subnet are arranged in the first layout mode, as shown in FIG. 24, an implementation of step 2044c may include the following steps.

Step 2044c1: Determine, based on the location information of the start ring network element and the end ring network element in the any ring subnet, a third graph coordinate system corresponding to the any ring subnet.

When shapes of third graphs on which the ring network elements are arranged are different, implementations of step 2044c1 are also different. The following separately describes the implementations by using an example in which the third graphs are an ellipse and a curve formed by two parabolic equations that share a same minimum point.

Figure 25:
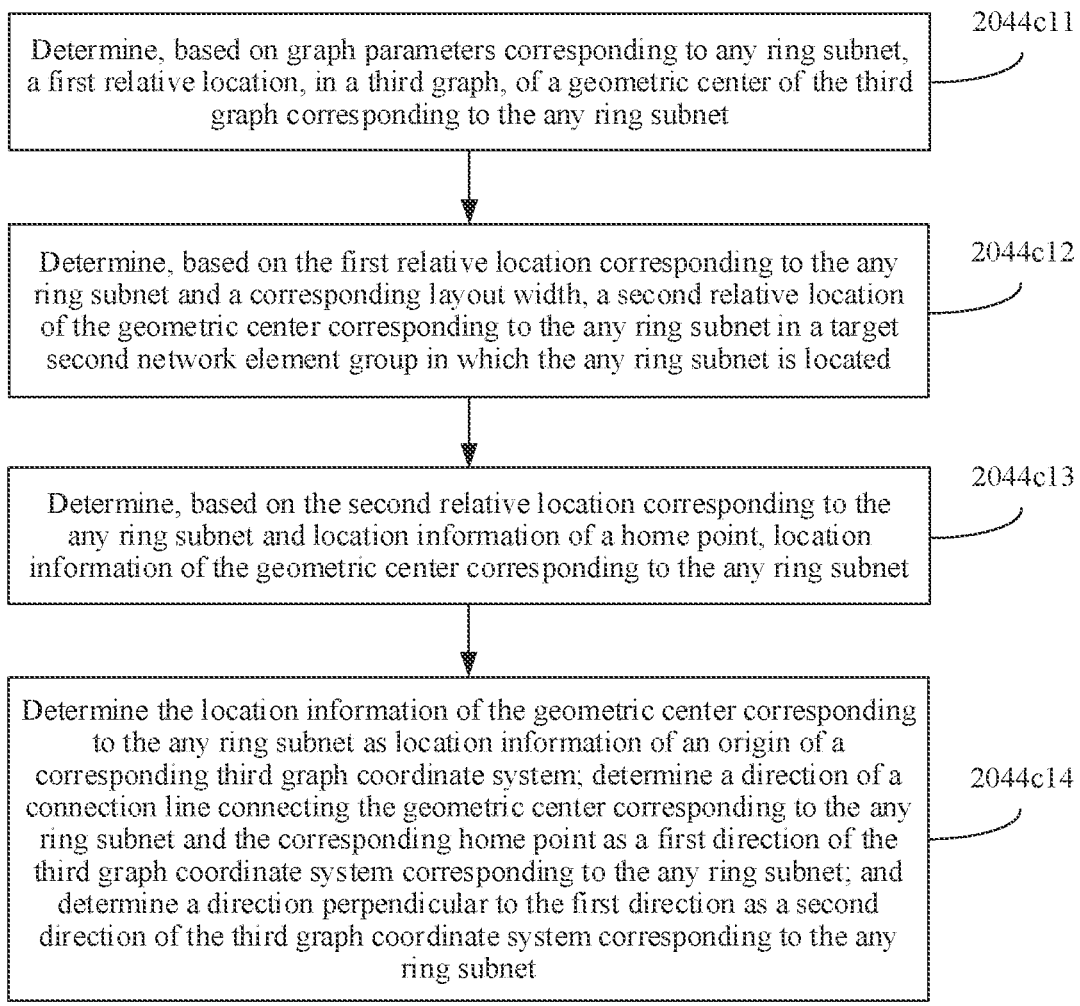
FIG. 25 is a flowchart of a method for determining a third graph coordinate system corresponding to any ring subnet according to an embodiment of this application.

When the third graph is an ellipse, as shown in FIG. 25, an implementation process of step 2044c1 may include the following steps.

Step 2044c11: Determine, based on the graph parameters corresponding to the any ring subnet, a first relative location, in the third graph, of a geometric center of the third graph corresponding to the any ring subnet.

The elliptical parameters a and b of the ellipse respectively correspond to a major axis and a minor axis of the ellipse. Therefore, after the elliptical parameters a and b are obtained, a shape of the ellipse may be determined. Correspondingly, the first relative location of the geometric center of the ellipse in the ellipse can be determined. The first relative location may be considered as a relative location of the geometric center relative to a fixed point of the ellipse.

Step 2044c12: Determine, based on the first relative location corresponding to the any ring subnet and the corresponding layout width, a second relative location of the geometric center corresponding to the any ring subnet in a target second network element group in which the any ring subnet is located.

After determining the first relative location, in the ellipse, of the geometric center of the ellipse on which the any ring subnet is arranged and layout widths corresponding to all the ring subnets in the target second network element group in which the any ring subnet is located, an area occupied by an ellipse corresponding to each ring subnet may be determined. In other words, a size of the ellipse corresponding to each ring subnet may be determined. Correspondingly, a second relative location of the any ring subnet in the target second network element group may be determined based on a position of the any ring subnet in the first network queue corresponding to the target second network element group, and the size of the ellipse corresponding to each ring subnet. The second relative location may be considered as a relative location of the geometric center of the ring subnet relative to a home point in the target second network element group.

Step 2044c13: Determine, based on the second relative location corresponding to the any ring subnet and location information of the home point, location information of the geometric center corresponding to the any ring subnet.

The location information of the home point is used to indicate a specific layout location of the target second network element group. After the second relative location of the any ring subnet in the target second network element group is determined, because the second relative location may be considered as a relative location of the geometric center of the ring subnet relative to the home point in the target second network element group, the location information of the geometric center may be determined based on the location information of the home point.

Step 2044c14: Determine the location information of the geometric center corresponding to the any ring subnet as location information of an origin of the corresponding third graph coordinate system; determine a direction of a connection line connecting the geometric center corresponding to the any ring subnet and the corresponding home point as a first direction of the third graph coordinate system corresponding to the any ring subnet; and determine a direction perpendicular to the first direction as a second direction of the third graph coordinate system corresponding to the any ring subnet.

The third graph coordinate system corresponding to each ring subnet is a coordinate system established for the ring subnet. Therefore, the geometric center corresponding to the ring subnet may be determined as the origin of the third graph coordinate system. The direction of the connection line connecting the geometric center and the corresponding home point is determined as the first direction of the third graph coordinate system in which the corresponding ring subnet is located. The direction perpendicular to the first direction is determined as the second direction of the third graph coordinate system in which the corresponding ring subnet is located. For example, referring to FIG. 16, the first direction may be the x-coordinate direction. After the x-coordinate direction of the third graph coordinate system is determined, the y-coordinate direction may be determined according to a right-handed coordinate system principle.

Figure 26:
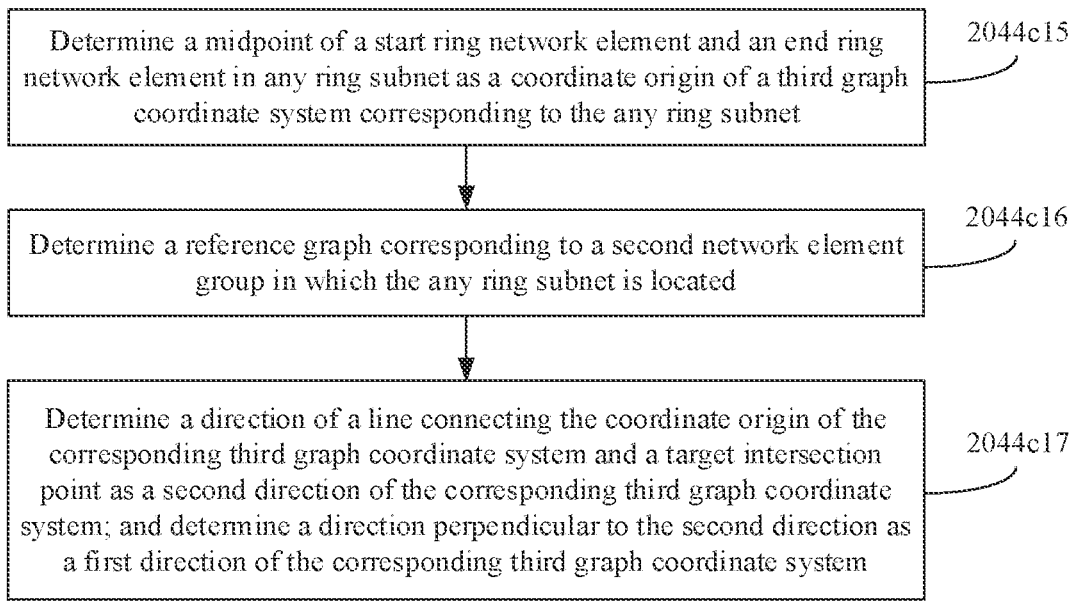
FIG. 26 is a flowchart of another method for determining a third graph coordinate system corresponding to any ring subnet according to an embodiment of this application.

When the third graph is a curve formed by two parabolic equations that share a same minimum point, as shown in FIG. 26, the implementation process of step 2044c1 may include the following steps.

Step 2044c15: Determine a midpoint of the start ring network element and the end ring network element in the any ring subnet as the coordinate origin of the third graph coordinate system corresponding to the any ring subnet.

Step 2044c16: Determine a reference graph corresponding to the second network element group in which the any ring subnet is located.

When the third graph is a curve formed by two parabolic equations that share a same minimum point, vertexes of a plurality of ring subnets in each second network element group may be arranged on a boundary of the reference graph. To ensure hierarchy clarity and aesthetics of the obtained network topology, the reference graph may be a circle that uses a specified fixed length as a radius and the coordinate origin of the corresponding third graph coordinate system as a circle center. The specified fixed length may be equal to a constant term of a standard equation for a curve, formed by two parabolic equations that share a same minimum point, on which the ring subnet is arranged.

After the layout width of the ring subnet is determined, it may be determined that a vertex of a curve, formed by two parabolic equations that share a same minimum point, corresponding to each ring subnet is in the corresponding third connection line. In addition, a vertex of the curve, formed by two parabolic equations that share a same minimum point, corresponding to each ring subnet is arranged on a boundary of the reference graph. Therefore, a location of an intersection point between the third connection line corresponding to the ring subnet and the reference graph may be determined as a location of the vertex of the curve, formed by two parabolic equations that share a same minimum point, corresponding to the ring subnet.

Step 2044c17: Determine a direction of a line connecting the coordinate origin of the corresponding third graph coordinate system and the target intersection point as the second direction of the corresponding third graph coordinate system; and determine a direction perpendicular to the second direction as the first direction of the corresponding third graph coordinate system.

For example, referring to FIG. 16, a circle shown by dashed lines is the reference graph corresponding to the second network element group, and an origin of the reference graph is a midpoint A3 of the start ring network element A1 and the end ring network element A2. Correspondingly, the coordinate origin of the third graph coordinate system corresponding to the ring subnet 4 is also located at the midpoint A3 of the start ring network element and the end ring network element in the ring subnet 4. It can be learned from FIG. 16 that there is a target intersection point between the third connection line OC4 corresponding to the ring subnet 4 and the reference graph. Therefore, it may be determined that a vertex of a curve, formed by two parabolic equations that share a same minimum point, corresponding to the ring subnet 4 is located at the target intersection point. In addition, a direction of a y coordinate of the third graph coordinate system corresponding to the ring subnet 4 may point to the origin of the third graph coordinate system along the target intersection point. In addition, an x-coordinate direction of the third graph coordinate system may be determined according to the right-handed coordinate system principle.

Step 2044c2: Determine location information of each ring network element in any ring subnet based on the sixth total quantity, the third graph coordinate system, the graph parameters, and the layout width that correspond to the any ring subnet.

When shapes of third graphs on which the ring network elements are arranged are different, implementations of step 2044c2 are also different. The following separately describes the implementations by using an example in which the third graphs are an ellipse and a curve formed by two parabolic equations that share a same minimum point.

When the third graph is an ellipse, the location information of each ring network element in the any ring subnet may be determined based on the sixth total quantity corresponding to each ring subnet, the corresponding third graph coordinate system, the corresponding graph parameters, and the corresponding layout width. In addition, during determining of the location information of the ring network element in each ring subnet, the location information of the corresponding ring network element may be determined based on an approximate layout location of a ring network element whose location information is to be determined and according to the following two principles:

If the ring network element is located on the left side of a minor axis of the ellipse, a sixth total quantity 14, the third graph coordinate system, the elliptical graph parameters a and b that correspond to the any ring subnet, and location information $(x_i, y_i)$ of each ring network element i in the any ring subnet may satisfy the following formula:

$$\begin{cases} x_i = -a + \dfrac{4 \times (i+1) \times a}{I_4 + 1} \\ y_i = -b \times \sqrt{1 - \dfrac{x_i^2}{a^2}} \end{cases}, 0 < \dfrac{i+1}{I_4+1} \leq 0.5$$

If the ring network element is located on the right side of the minor axis of the ellipse, the sixth total quantity $I_4$, the third graph coordinate system, the elliptical graph parameters a and b that correspond to the any ring subnet, and the location information $(x_i, y_i)$ of each ring network element i in the any ring subnet may satisfy the following formula:

$$\begin{cases} x_i = 3 \times a - \dfrac{4 \times (i+1) \times a}{I_4 + 1} \\ y_i = -b \times \sqrt{1 - \dfrac{x_i^2}{a^2}} \end{cases}, 0.5 < \dfrac{i+1}{I_4+1} \leq 1$$

Figure 27:
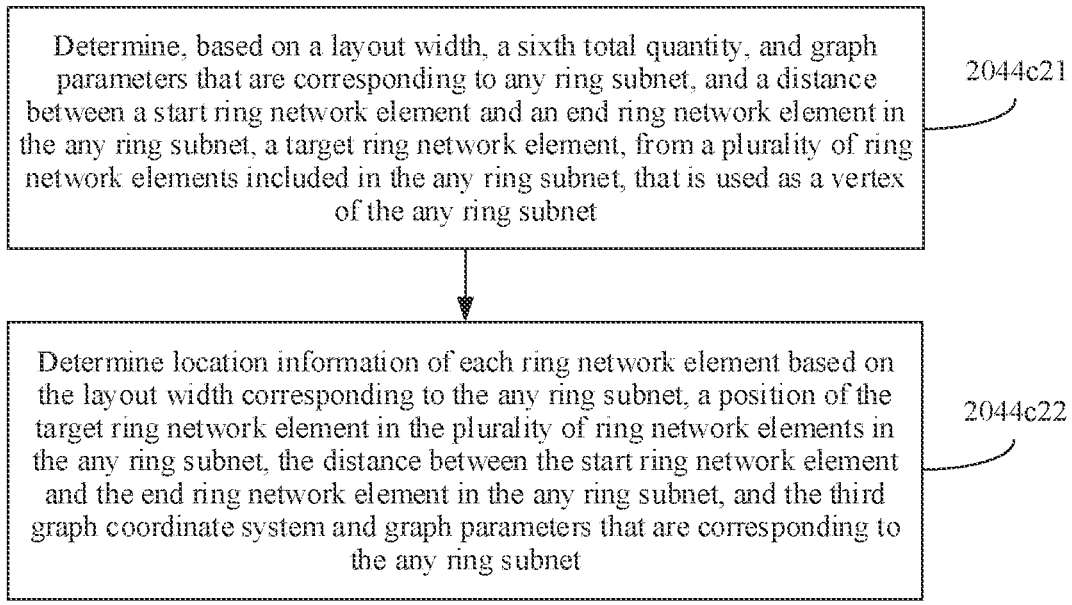
FIG. 27 is a flowchart of another method for determining location information of each ring network element in any ring subnet according to an embodiment of this application.

When the third graph is a curve formed by two parabolic equations that share a same minimum point, as shown in FIG. 27, an implementation process of step 2044c2 may include the following steps.

Step 2044c21: Determine, based on the layout width, the sixth total quantity, and the graph parameters that correspond to the any ring subnet, and a distance between the start ring network element and the end ring network element in the any ring subnet, a target ring network element, from a plurality of ring network elements included in the any ring subnet, that is used as a vertex of the any ring subnet.

Figure 28:
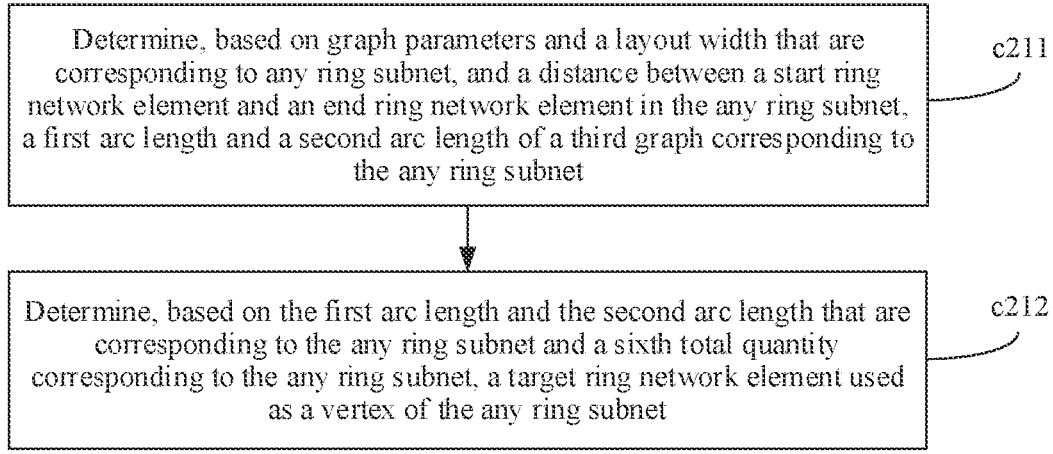
FIG. 28 is a flowchart of a method for determining a target ring network element used as a vertex of any ring subnet according to an embodiment of this application.

Optionally, as shown in FIG. 28, an implementation process of step 2044c21 may include the following steps.

Step c211: Determine, based on the graph parameters and the layout width that correspond to the any ring subnet, and the distance between the start ring network element and the end ring network element in the any ring subnet, a first arc length and a second arc length of the third graph corresponding to the any ring subnet.

The first arc length is a length of an arc located on the left side of a vertex of the third graph, and the second arc length is a length of an arc located on the right side of the vertex of the third graph. Formulas for calculating the first arc length $L_1$ and the second arc length $L_r$ may be as follows:

$$\begin{cases} L_1 = \displaystyle\int_{\frac{d \times \cos\theta_4}{2}}^{0} \sqrt{1 + 4 \times a_1^2 \times x} \\ L_r = \displaystyle\int_{0}^{\frac{d \times \cos\theta_4}{2}} \sqrt{1 + 4 \times a_2^2 \times x} \end{cases},$$

where

θ4 represents the layout width of the curve formed by two parabolic equations that share a same minimum point, d represents the distance between the start ring network element and the end ring network element in the any ring subnet, and a1 and a2 respectively represent graph parameters of the curve formed by two parabolic equations that share a same minimum point.

Step c212: Determine, based on the first arc length and the second arc length that correspond to the any ring subnet and the sixth total quantity corresponding to the any ring subnet, the target ring network element used as the vertex of the any ring subnet.

Optionally, the target ring network element used as the vertex of the any ring subnet may be determined, from a plurality of connected network elements included in the any ring subnet, based on a ratio of the first arc length to an arc length of the curve formed by two parabolic equations that share a same minimum point.

For example, a position t of the target ring network element in the plurality of connected network elements, the sixth total quantity $I_4$ of the plurality of connected network elements, the first arc length $L_l$, and the second arc length $L_r$ may satisfy the following formula:

$$t = \text{round}\left(\dfrac{I_4 \times L_1}{L_1 + L_r} + 1\right),$$

where round represents a round-off function.

After the position t is determined, counting may start from the start ring network element to the end ring network element based on a connection relationship between ring network elements in the any ring subnet, and a ring network element on a count of t is determined as the target ring network element used as the vertex of the any ring subnet.

Step 2044c22: Determine the location information of each ring network element based on the layout width corresponding to the any ring subnet, a position of the target ring network element in the plurality of ring network elements in the any ring subnet, the distance between the start ring network element and the end ring network element in the any ring subnet, and the third graph coordinate system and graph parameters that correspond to the any ring subnet.

Optionally, for an $i^{th}$ ring network element in the any ring subnet, an x coordinate of the ring network element should satisfy the following equation. In addition, because the equation includes monotonic functions that are monotonic in respective intervals, after the layout width corresponding to the any ring subnet and the distance between the start ring network element and the end ring network element in the any ring subnet are determined, the layout width and the distance may be substituted into the equation, and an x coordinate of each ring network element is solved in a dichotomy iteration manner. Then, the x coordinate is substituted into the standard equation for a curve formed by two parabolic equations that share a same minimum point, to obtain a y coordinate corresponding to the x coordinate and further obtain the location information of each ring network element. The equation is as follows:

$$\begin{cases} \dfrac{L_1 \times i}{t} = \displaystyle\int_{-\frac{d \times \cos\theta_5}{2}}^{x} \sqrt{1 + 4 \times a_1^2 \times x}, & i \le t \\ \dfrac{L_r \times (i - t)}{I - t} = \displaystyle\int_{0}^{x} \sqrt{1 + 4 \times a_2^2 \times x}, & i > t \end{cases},$$

where

θ5 represents the layout width corresponding to the any ring subnet, d represents the distance between the start ring network element and the end ring network element in the any ring subnet, t represents a position of a target ring network element in the plurality of connected network elements in the any ring subnet, $a_1$ and $a_2$ are graph parameters of the curve formed by two parabolic equations that share a same minimum point, $I_4$ represents the sixth total quantity of connected network elements of the plurality of network elements in the any ring subnet, $L_1$ represents the first arc length of the curve, formed by two parabolic equations that share a same minimum point, corresponding to the any ring subnet, and $L_r$ represents the second arc length of the curve, formed by two parabolic equations that share a same minimum point, corresponding to the any ring subnet.

It should be noted that, when the ring network elements are arranged in the first layout mode, because a location relationship of each ring network element is determined based on a third graph coordinate system corresponding to each ring subnet, after location information of each ring network element in the third graph coordinate system is obtained, the location information of the ring network element in the third graph coordinate system further needs to be converted into the global coordinate system based on the corresponding third graph coordinate system and a global coordinate system corresponding to the network topology, to obtain the location information under same reference criterion. Optionally, during coordinate conversion, coordinates (x,y) of a ring network element before the conversion and coordinates (x',y') after the conversion may satisfy the following formula:

$$\begin{cases} x' = x \times \cos\eta - y \times \sin\eta + d_x \\ y' = x \times \sin\eta + y \times \cos\eta + d_y \end{cases},$$

where

η represents a coordinate system rotation angle of the third image coordinate system relative to the global coordinate system, $d_x$ represents an offset in an x-axis direction of the third image coordinate system relative to the global coordinate system, and $d_y$ represents an offset in a y-axis direction of the third image coordinate system relative to the global coordinate system.

Figure 29:
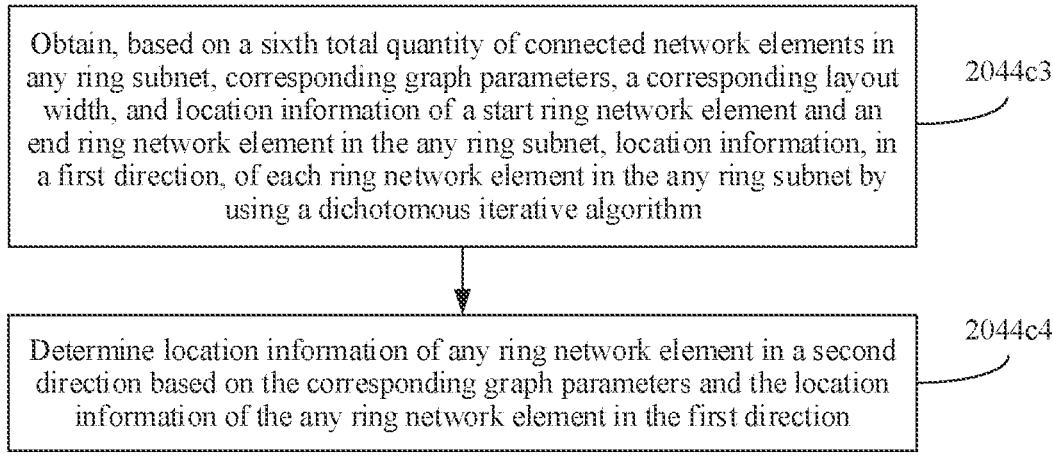
FIG. 29 is a flowchart of still another method for determining location information of each ring network element in any ring subnet according to an embodiment of this application.

When the ring network elements in the ring subnet are arranged in the second layout mode, as shown in FIG. 29, the implementation of step 2044c may include the following steps.

Step 2044c3: Obtain, based on the sixth total quantity of connected network elements in the any ring subnet, the corresponding graph parameter, the corresponding layout width, and the location information of the start ring network element and the end ring network element in the any ring subnet, location information, in the first direction, of each ring network element in the any ring subnet by using a dichotomous iterative algorithm.

Optionally, for the $i^{th}$ ring network element in the any ring subnet, the x coordinate of the ring network element should satisfy the following equation. In addition, because the equation is a monotonic function in an interval [−w/2, w/2], after the sixth total quantity of connected network elements in the any ring subnet, the corresponding graph parameters, and the corresponding layout width are determined, the layout width and the distance may be substituted into the equation, to solve, within a range limited by the location information of the start ring network element and the end ring network element in the any ring subnet, the location information, in the first direction, of each ring network element in the any ring subnet in a dichotomy iterative manner.

Optionally, the x coordinate of the ring network element should satisfy the following equation:

$$\dfrac{i \displaystyle\int_{-\frac{w}{2}}^{\frac{w}{2}} \sqrt{1 + 4 \times a^2 \times x}}{I_4 + 1} = \int_{-\frac{w}{2}}^{x} \sqrt{1 + 4 \times a^2 \times x},$$

where $I_4$ represents the sixth total quantity of connected network elements in the any ring subnet, a is a graph parameter of the any ring subnet, and w represents the layout width of the any ring subnet.

Step 2044c4: Determine location information of any ring network element in the second direction based on the corresponding graph parameters and the location information of the any ring network element in the first direction.

After the location information, in the first direction, of each ring network element in the any ring subnet is determined, the location information of the ring network element in the first direction may be substituted into a standard equation for the third graph corresponding to the ring subnet, to obtain the location information of the ring network element in the second direction by solving the equation.

It should be noted that the foregoing is a description of calculating location information of a ring network element in a ring subnet. However, a network usually includes a plurality of ring subnets. In the process of calculating location information of ring network elements in the plurality of ring subnets, location information of a next ring network element is generally determined through traversal and iteration. In addition, in a traversal and iteration process, a network element corresponding to a shortest path of a current network element is determined as a next ring network element whose location information needs to be calculated. However, when a network structure is relatively complex, performance of the iteration calculation manner is relatively low, causing relatively low efficiency in calculating location information of a network element in the network. To improve efficiency in calculating the location information of the network element in the network, the network may be first divided into several clusters based on network connectivity and according to a shortest path principle, and location information of ring network elements in ring subnets belonging to a same cluster is preferentially calculated. Then, location information of ring network elements in ring subnets in different clusters is calculated.

Figure 30:
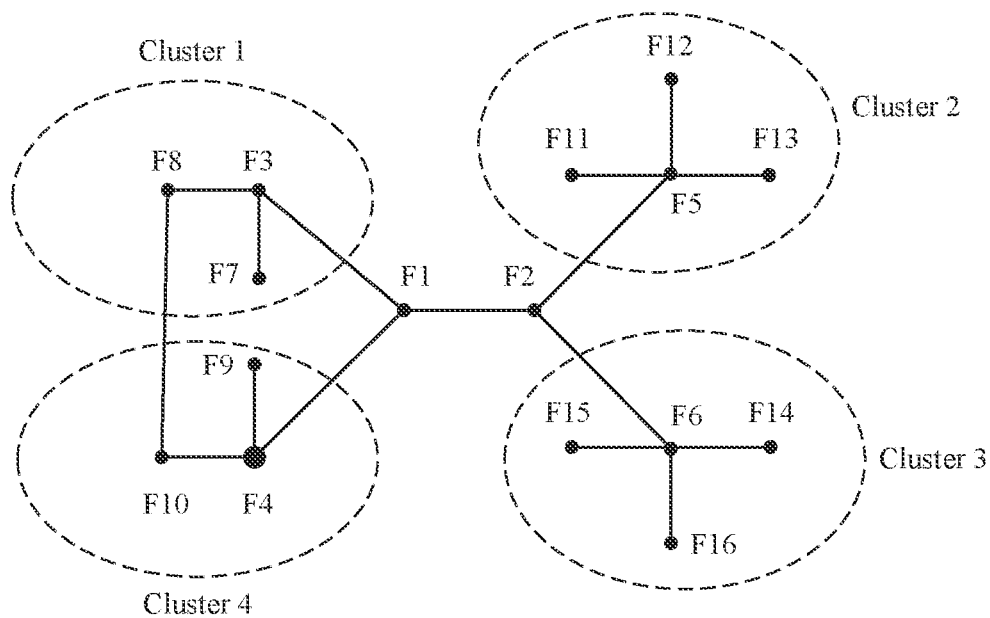
FIG. 30 is a schematic diagram of clustering of network elements according to an example embodiment of this application.

An implementation process of network clustering may include: classifying secondary network elements that are directly connected into a same group, and then classifying, based on a distance from each other network element to the secondary network element, each other network element into a group in which a secondary network element corresponding to a closest path is located. After the classification, network elements and links in each group form a cluster. In addition, if paths from another network element to secondary network elements in different groups are equal, the another network element may be classified into any group. In addition, the core network element may be used as a public network element and belongs to each cluster. For example, as shown in FIG. 30, a network element F1 and a network element F2 are core network elements; a network element F4, a network element F3, a network element F5, and a network element F6 are secondary network elements; and network elements F7 to F16 are lower-level network elements. According to the foregoing network clustering rule, the network may be divided into four clusters: a cluster 1, a cluster 2, a cluster 3, and a cluster 4, as shown in FIG. 30. Network elements located in a same dashed circle belong to a same cluster.

In a process of calculating location information of ring network elements in ring subnets belonging to a same cluster, an inter-ring link may be combined into the ring subnet according to the following policy, and in a process of calculating location information of ring network elements in ring subnets in different clusters, the inter-cluster link may be combined into the ring subnet according to the following policy. In this way, in a calculation process for the ring subnet, each ring network element is traversed based on a connection relationship between the ring network elements, to improve traversal efficiency, and further improve efficiency of calculating location information of the ring network element.

Optionally, the process of combined the inter-ring link into the ring subnet may include: using any inter-ring link as an initiation point, and searching for a path from any network element on the link to another network element other than a network element on the link. When a path from any network element to a ring network element in the cluster is a shortest path in paths from the any network element to other network elements, it may be determined that the link and all network elements on the shortest path form a minimum ring structure. In this case, a network element on the minimum ring structure may be determined as a ring network element newly added to the ring subnet, that is, the process of combining the inter-ring link into the ring subnet is completed. When the path from any network element to a ring network element in the cluster is not a shortest path in the paths from the any network element to other network elements, other inter-ring links are continued to be traversed until all inter-ring links in the cluster are traversed. In addition, in the traversal process, traversal may be performed in a descending order of network grades. In addition, in the process of calculating the shortest path, a same-layer ring subnet and a dual-homed ring subnet are first considered, and then a single-homed ring subnet and a multi-layer ring subnet may be considered, to reduce link crossings in the network and make the ring structure clearer.

Optionally, the process of combining the inter-cluster link into the ring subnet may include: first finding a network element, in the inter-cluster link, that is not a ring network element, and calculating a shortest path from the network element to a ring network element in any cluster. Network elements on the shortest path and the inter-cluster link may form a multi-layer ring. In this case, the network elements on the shortest path may be updated to new ring network elements in a ring on which the ring network element is located, that is, the process of combining the inter-cluster link into a ring subnet is completed. In addition, a ring to which the new ring network element is connected in a corresponding cluster is calculated according to a principle of calculating ring network elements in a cluster. Then, other inter-cluster links are traversed until all the inter-cluster links are traversed.

When a network element whose location information is to be determined is a tree network element, because there is no connection relationship between each tree subnet and another tree subnet, the network is divided into tree subnets and location information of each tree network element is obtained. This can effectively reduce crossings between network element links in the obtained network topology.

In addition, for different types of tree subnets, implementations of step 204 are different. The following respectively describes the implementations of step 204 for different types of tree subnets.

Figure 31:
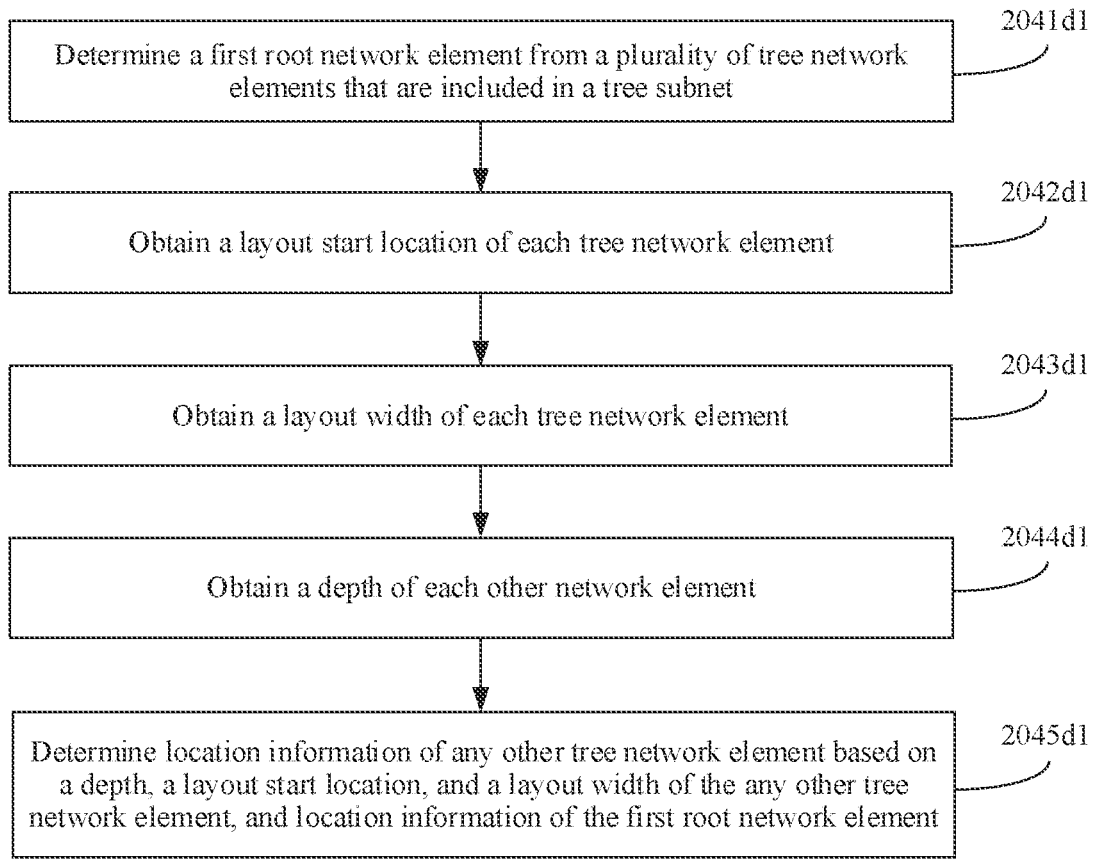
FIG. 31 is a flowchart of determining location information of a tree network element according to an example embodiment of this application.

When the network topology is obtained through arrangement in the first layout mode and the tree network element is a non-isolated network element, or when the tree subnet is a short tree subnet, the implementation process of step 204 may include the following steps, as shown in FIG. 31.

Step 2041d1: Determine a first root network element from a plurality of tree network elements that are included in a tree subnet.

In a tree subnet, a network element of the highest network grade is the first root network element in the tree subnet. In addition, each tree subnet generally has only one first root network element. Therefore, when step 2041d1 is performed, a tree network element of the highest network grade in the tree subnet may be determined as the first root network element in the tree subnet.

Step 2042d1: Obtain a layout start location of each tree network element.

Figure 32:
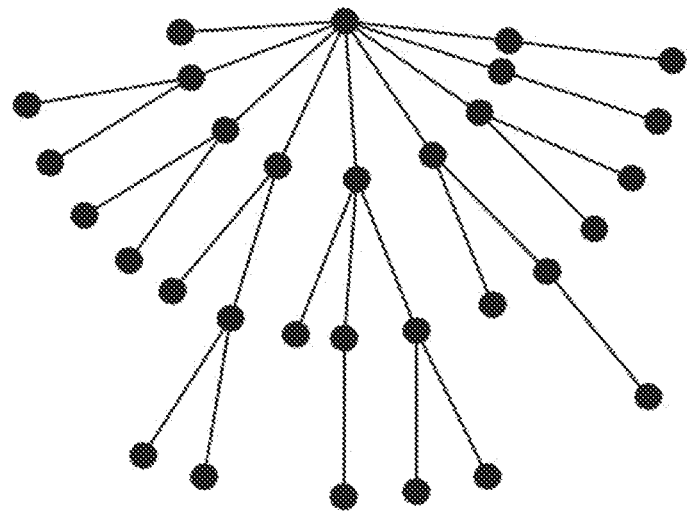
FIG. 32 is a schematic diagram of arranging tree network elements in a tree subnet on an arc tree model according to an example embodiment of this application.

In this implementation, a plurality of other tree network elements connected to a same first root network element are arranged on a circle using the first root network element as a circle center and using a specified length as a radius. In other words, in a tree subnet, tree network elements at a same depth may be arranged on an arc, with a specified radius, that uses the first root network element as a circle center, and tree network elements at different depths may be separately arranged on arcs, with different radii, that use the first root network element as circle centers. In addition, a larger depth of a tree network element indicates a larger radius of an arc corresponding to the tree network element. In this case, it may be considered that tree network elements in each tree subnet are arranged on an arc tree model. For a schematic diagram of the arc tree model, refer to FIG. 32, in which black dots represent tree network elements, and a solid line between every two tree network elements is used to indicate that there is a connection relationship between the two tree network elements. In FIG. 32, tree network elements at a same depth are arranged on arcs of a same circle, and tree network elements at different depths are arranged on arcs of circles of a same circle center but with different radii. In addition, a larger depth of a tree network element indicates a larger radius of an arc corresponding to the tree network element. The other tree network elements are tree network elements other than the root network element in the tree subnet.

A layout start location of each tree network element may be represented by a layout start angle. For different types of tree network elements, an implementation of obtaining the layout start angle may include the following:

When a tree subnet to which the first root network element belongs is a short tree subnet, a layout start angle of the first root network element may be −180 degrees.

Figure 33:
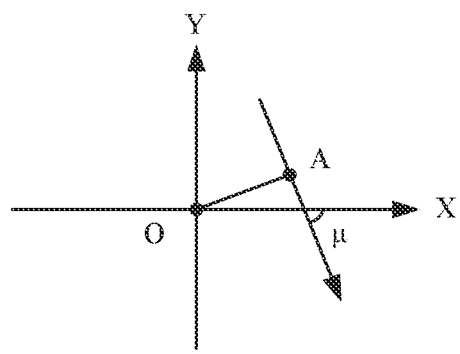
FIG. 33 is a schematic diagram of a principle of obtaining a layout start angle of a first root network element according to an example embodiment of this application.

When the first root network element is a non-isolated network element in the first layout mode, as shown in FIG. 33, a straight line connecting a first root network element A and a specified point O may be determined as a target straight line based on location information of the first root network element A and the specified point O, and an included angle between a target ray OZ and the specified straight line is determined as a layout start angle µ of the first root network element A. The target ray OZ is a ray that is perpendicular to the target straight line and extends in a direction away from the specified point. The specified straight line may be a straight line in the x coordinate direction in the global coordinate system.

When a tree subnet to which the other tree network elements belong is a short tree subnet, or the other tree network elements are non-isolated network elements in the first layout mode, a plurality of sub-network elements connected to a same parent network element may be sequenced based on a connection relationship between the tree network elements, to obtain a third network element queue. A layout start angle of any other tree network element is determined based on a layout start angle, a layout width, and a width of a parent network element connected to the any other tree network element, and a width of another tree network element that is in the third network element queue and that is located before the any other tree network element. The other tree network element is a tree network element other than the first root network element in the plurality of tree network elements.

For example, a layout start angle $\alpha^f$, a layout width $\theta^f$, and a width $w^f$ of a parent network element connected to a $t^{th}$ other tree network element in the third network element queue, a width $w^c_i$ of another tree network element i that is in the third network element queue and that is before any other tree network element, and the layout start angle $a^c_t$ of the any other tree network element can meet the following formula:

$$a^c t = \alpha^f + \sum_{i=1}^{t-1} \frac{w^c_i \times \theta^f}{w^f}$$

Figure 34:
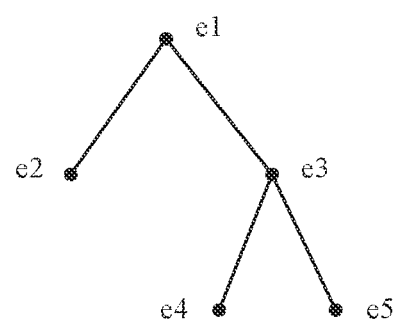
FIG. 34 is a schematic diagram of a width of a tree network element in a tree subnet according to an example embodiment of this application.

A width of each tree network element is equal to a sum of widths of sub-network elements in the tree network element, and a width of a tree network element without sub-network elements is 1. For example, as shown in FIG. 34, the tree subnet includes: a tree network element e1, a tree network element e2, a tree network element e3, a tree network element e4, and a tree network element e5. The tree network element e4 and the tree network element e5 are sub-network elements of the tree network element e3, and the tree network element e2 and the tree network element e3 are sub-network elements of the tree network element e1. The tree network element e2, the tree network element e4, and the tree network element e5 do not have sub-network elements, and therefore it can be determined that widths of the tree network element e2, the tree network element e4, and the tree network element e5 are all 1. A width of the tree network element e3 is a sum of the width of the tree network element e4 and the width of the tree network element e5, that is, the width of the tree network element e3 is 2. A width of the tree network element e1 is a sum of the width of the tree network element e2 and the width of the tree network element e3, that is, the width of the tree network element e1 is 3.

Step 2043d1: Obtain a layout width of each tree network element.

The layout width of each tree network element may be represented by a fifth included angle.

When the tree network element is the first root network element, the fifth included angle of the first root network element is 180 degrees.

When the tree network element is the other tree network element, the fifth included angle of the any other tree network element may be determined based on the connection relationship between the tree network elements, the width of the any other tree network element, and a fifth included angle and the width of the parent network element connected to the any other tree network element. For example, the fifth included angle $\theta^c_t$ of the any other tree network element t, the width $w^c_t$ of the any other tree network element, and the fifth included angle $\theta^f$ and the width $w^f$ of the parent network element connected to the any other tree network element may satisfy the following formula:

$$\theta^c_t = \frac{w^c_t \times \theta^f}{w^f}$$

The tree network elements are arranged in an arc tree, and the width of the tree network element is allocated based on the width of the tree network element. This ensures that no crossing exists among all tree network elements under a same root network element.

Step 2044d1: Obtain a depth of each other network element.

The depth of each network element in the tree subnet is equal to a total quantity of network elements on a shortest path from the network element to a root network element in the tree subnet. Therefore, during execution of step 2044d1, for any other network element, a shortest path from the any other network element to a root network element in a tree subnet in which the any other network element is located may be first determined, and a total quantity of network elements included on the shortest path is counted, where the total quantity is a depth of the any other ring network element.

Step 2045d1: Determine location information of the any other tree network element based on the depth, the layout start location, and the layout width of the any other tree network element, and location information of the first root network element.

Optionally, the depth p, the layout start location a, the layout width θ6, the location information ($x_0$, $y_0$) of the first root network element, and the location information (x,y) of the any other network element may satisfy the following formula:

$$\begin{cases} x = p \times h \times \cos\left(\alpha + \dfrac{\theta_6}{2}\right) + x_0 \\ y = p \times h \times \sin\left(\alpha + \dfrac{\theta_6}{2}\right) + y_0 \end{cases},$$

where h represents a height constant of each layer of the tree.

Figure 35:
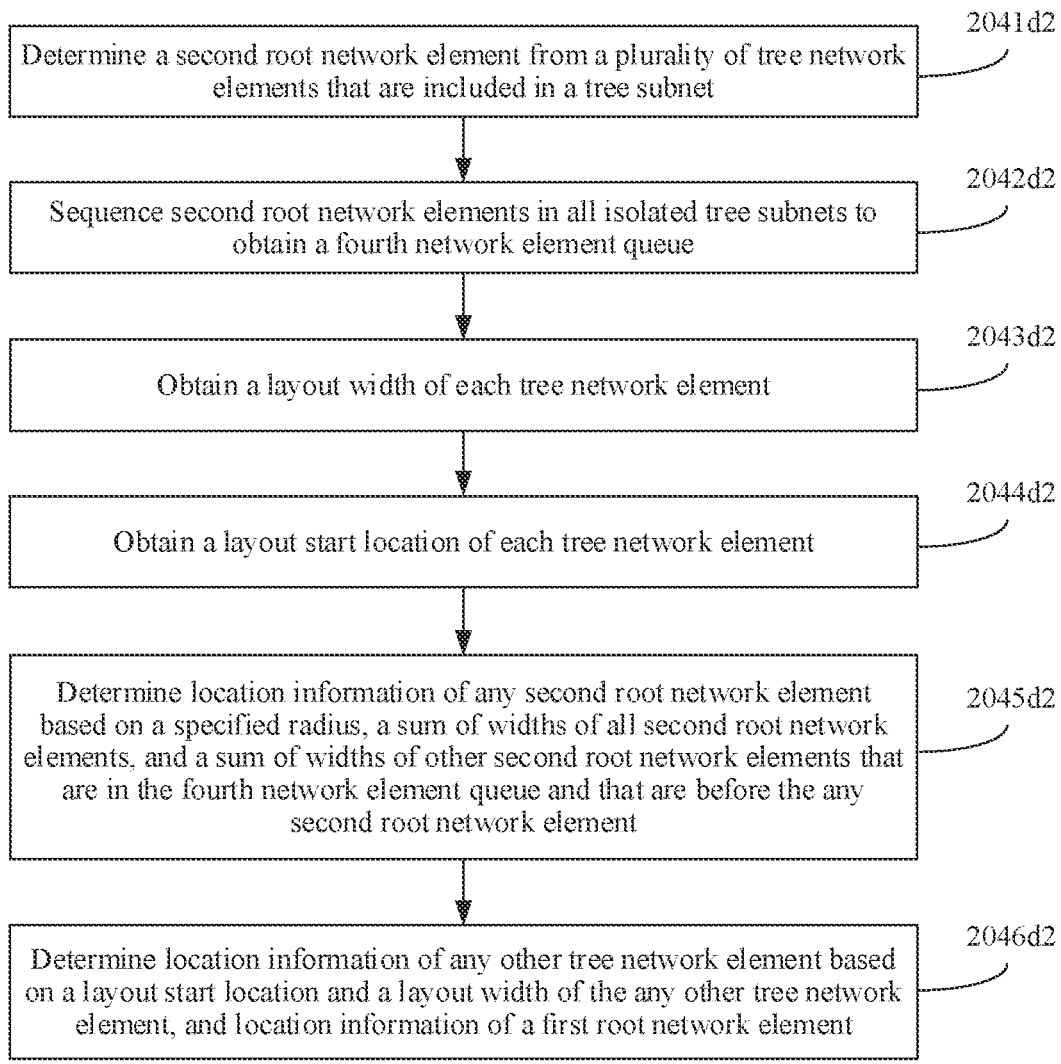
FIG. 35 is another flowchart of determining location information of a tree network element according to an example embodiment of this application.

When a network element whose location information is to be determined is an isolated network element. The isolated network elements may be connected in a tree shape. The following describes an implementation process of step 204 by using an example in which all isolated network elements are tree network elements in a tree subnet. As shown in FIG. 35, the implementation process of step 204 may include the following steps.

Step 2041d2: Determine a second root network element from the plurality of tree network elements that are included in the tree subnet.

For an implementation process of step 2041d2, correspondingly refer to the implementation process of step 2041d1.

Step 2042d2: Sequence second root network elements in all isolated tree subnets to obtain a fourth network element queue.

Because there is no connection path between the second root network element and the core network element in the isolated tree subnet, initial sequencing may be randomly performed on the plurality of second root network elements in the network, and a result obtained after the initial sequencing is adjusted based on depths of the plurality of second root network elements, to obtain the fourth network element queue. For example, the process of adjusting the result obtained after the initial sequencing may be performed according to a principle of separating second root network elements, at a great depth, corresponding to the plurality of isolated tree subnets. The depth of the isolated tree subnet may be equal to a depth of a tree network element at a maximum depth in the isolated tree subnet.

Step 2043d2: Obtain a layout width of each tree network element.

Optionally, the layout width of each tree network element may be represented by a fifth included angle. In this case, a width of each tree network element may be obtained based on a connection relationship between the tree network elements, and the layout width of each tree network element is determined based on the width of each tree network element.

Optionally, there is a correspondence between the width of the tree network element and an included angle. When the fifth included angle corresponding to the tree network element is determined based on the width of the tree network element, the correspondence may be queried based on the width of the tree network element, and an included angle corresponding to the width is determined as the width of the tree network element. For example, assuming that the correspondence between a width and an included angle is that the width is proportional to the included angle, and an included angle threshold corresponding to a width obtained after measurement is 1 is ω degrees, a layout width w of a tree network element whose width is m is equal to m×ω.

Step 2044d2: Obtain a layout start location of each tree network element.

Figure 36:
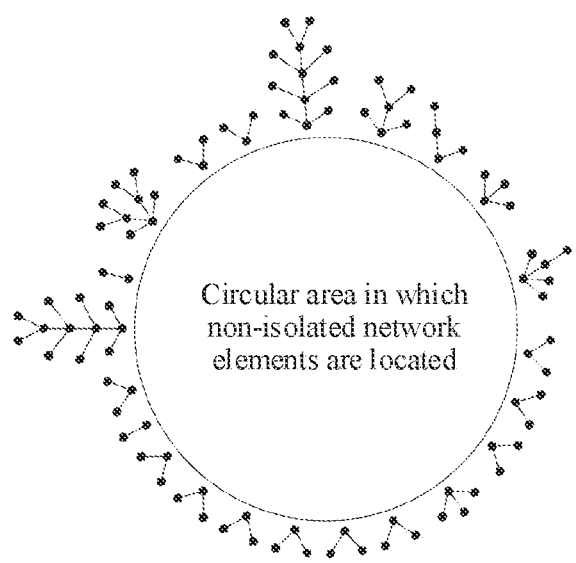
FIG. 36 is a schematic diagram of arranging an isolated network element outside a circular area in which a non-isolated network element is located according to an example embodiment of this application.

Optionally, the isolated network element may be arranged outside a layout area of the non-isolated network element. For example, as shown in FIG. 36, black dots represent isolated network elements, and a solid line between every two isolated network elements is used to indicate that there is a connection relationship between the two isolated network elements. When the non-isolated network elements are arranged in the first layout mode, the isolated network element may be arranged outside a circular area in which the non-isolated network elements are located. Isolated network elements that are in a connection relationship can be deployed in a tree subnet.

In this case, the layout start location of each tree network element may be represented by a layout start angle, and the layout start angle may be represented by a central angle of the circular area. Correspondingly, during determining of a layout start angle of any second root network element, the layout start location of the second root network element may be determined based on a width of another second root network element that is in the fourth network element queue and that is before the any second root network element. For example, it may be assumed that a layout start angle of the first second root network element in the fourth network element queue is 0. In this case, a layout start angle βt of a $t^{th}$ second root network element in the fourth network element queue, and a width $w_i$ of an $i^{th}$ root network element in the fourth network element queue may meet the following formula:

$$\beta_t = (t-1) \times \alpha + \sum_{i=1}^{t-1} w_i,$$

where

α is an angle difference constant between every two adjacent second root network elements.

Step 2045d2: Determine location information of any second root network element based on a specified radius, a sum of widths of all the second root network elements, and a sum of widths of other second root network elements that are in the fourth network element queue and that are located before the any second root network element.

Optionally, the specified radius, namely, a radius Rr, may be a maximum value of distances from the non-isolated network element to the origin. In this way, all isolated network elements may be arranged outside non-isolated network elements, so that no interference exists between the isolated network element and the non-isolated network element.

In addition, location information $(x_t, y_t)$ of the $t^{th}$ second root network element in the fourth network element queue, the specified radius Rr, the sum Σw of widths of all the second root network elements in the fourth network element queue, and a sum $$\sum_{i=1}^{t-1} w_i$$

of widths of other second root network elements that are in the fourth network element queue and that are before the $t^{th}$ second root network element may meet the following formula:

$$\begin{cases} x_t = R_r \times \cos\left(\dfrac{2\pi \times \sum_{i=1}^{t-1} w_i}{\sum w}\right) \\ y_t = R_r \times \sin\left(\dfrac{2\pi \times \sum_{i=1}^{t-1} w_i}{\sum w}\right) \end{cases}$$

Step 2046*d*2: Determine the location information of the any other tree network element based on the layout start location and the layout width of the any other tree network element, and the location information of the first root network element.

For an implementation process of step 2046*d*2, refer to the implementation process of step 2045*d*1.

Figure 37:
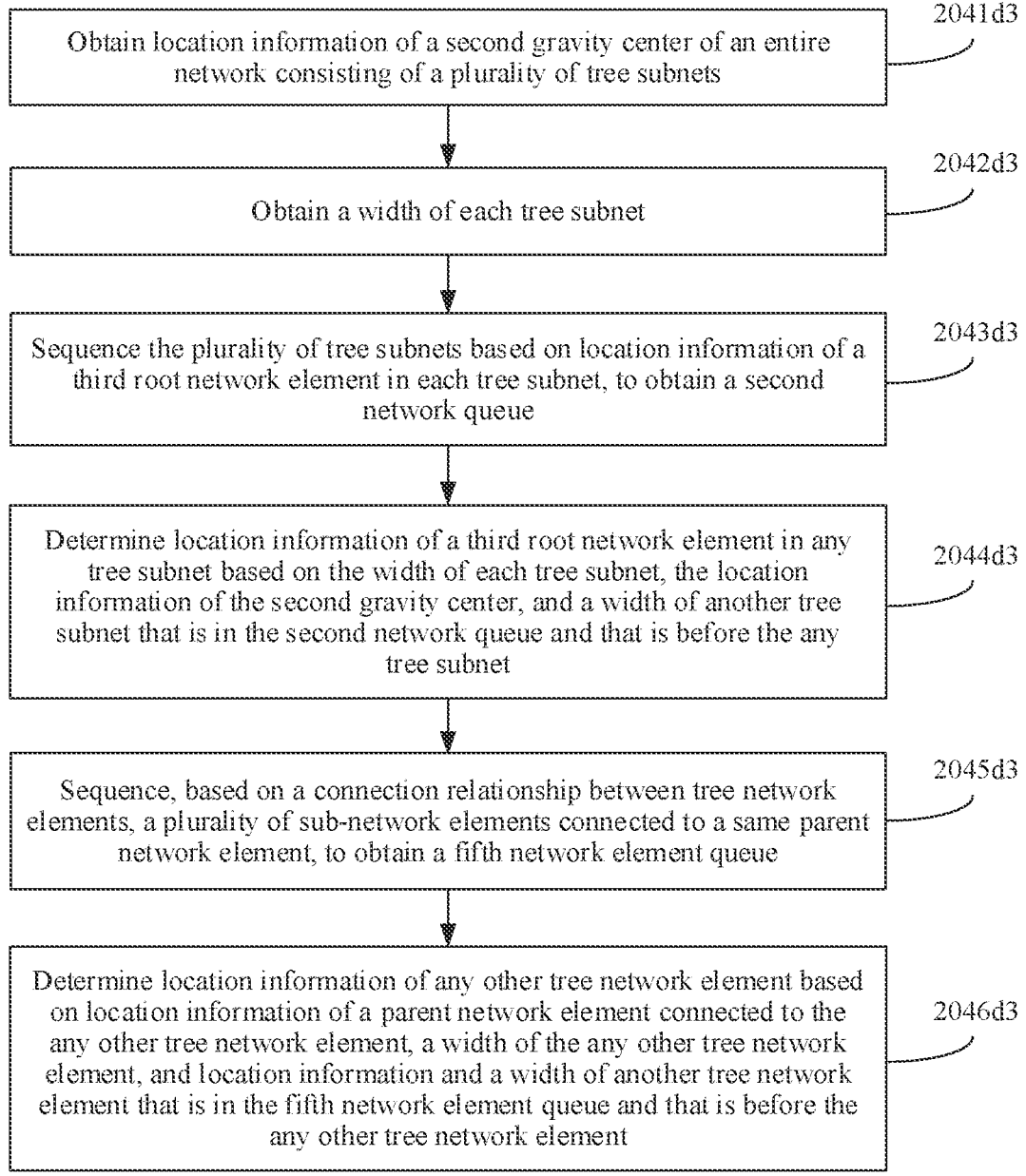
FIG. 37 is still another flowchart of determining location information of a tree network element according to an example embodiment of this application.

When the tree subnet is a long tree subnet, referring to FIG. 37, the implementation process of step 204 may include the following steps.

Step 2041*d*3: Obtain location information of a second gravity center of an entire network comprising a plurality of tree subnets.

In the second layout mode, the network elements are arranged from top to bottom in a descending order of network grades, that is, a layout direction is parallel to a y-coordinate direction. Therefore, an implementation process of step 2041*d*3 may include: determining location information of the second gravity center of the entire network in the x-coordinate direction. Correspondingly, the second gravity center of the entire network may be understood as a gravity center of the entire network in the x-coordinate direction. The location information of the second gravity center of the entire network in the x-coordinate direction is equal to a quotient obtained after dividing a sum of coordinates, in the x-coordinate direction, of original root network elements in all tree subnets in the entire network by a quantity of long trees.

Step 2042*d*3: Obtain a width of each tree subnet.

The width of the tree subnet may be equal to a width of a root network element in the tree subnet.

Step 2043*d*3: Sequence the plurality of tree subnets based on location information of a third root network element in each tree subnet, to obtain a second network queue.

The third root network element may be a root network element in the tree subnet. During execution of step 2043*d*3, the plurality of tree subnets may be sequenced in ascending order of x values of third root network elements in tree subnets to which the plurality of tree subnets belong, to obtain the second network queue.

Step 2044*d*3: Determine location information of a third root network element in any tree subnet based on the width of each tree subnet, the location information of the second gravity center, and a width of another tree subnet that is in the second network queue and that is located before the any tree subnet.

Figure 38:
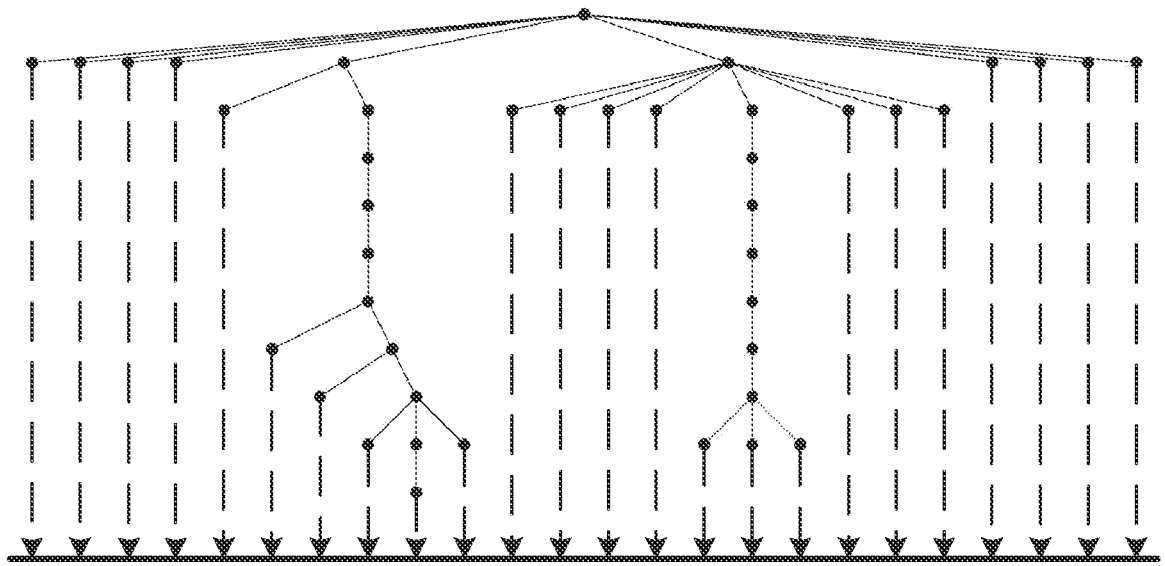
FIG. 38 is a schematic structural diagram of a straight-line tree model according to an example embodiment of this application.

Optionally, a layout mode of tree network elements in the tree subnet may meet the following: tree network elements at a same depth may be arranged on a same horizontal line, and points, on a same horizontal plane, obtained after projection of all the tree network elements are arranged at an equal spacing. In other words, the tree network elements in the tree subnet may be arranged on a straight-line tree model. For example, FIG. 38 is a schematic structural diagram of a straight line tree model according to an embodiment of this application. Black dots in FIG. 38 represent network elements, and a solid line between the network elements represent that there is a connection relationship between the network elements. As shown in FIG. 38, tree network elements at a same depth may be arranged on a same horizontal line, and points, on a same horizontal plane, obtained after projection of all the tree network elements are arranged at an equal spacing (that is, a spacing between every two adjacent arrows in FIG. 38 is equal). Vertical spacings between tree network elements at two adjacent depths are the same, and a width occupied by each tree network element is proportional to a quantity of the tree network element.

When the tree network elements are arranged on the straight-tree model, because a divergence direction of the tree is vertical and downward, network elements at each layer of the tree subnet are arranged on a horizontal line. A horizontal width occupied by a tree network element may be allocated based on a width of the tree network element. This ensures that no crossing exists among all tree network elements under a same root network element.

Correspondingly, in this layout mode, location information $(x_j, y_j)$ of a $j^{th}$ third root network element in the second network queue, the width $w_i$ of each tree subnet, and the location information z of the second gravity center in the x-coordinate direction may satisfy the following formula:

$$\begin{cases} x_j = \sum_{i=1}^{j-1} k_5 \times w_i + (j-1) \times d_{rw} + \dfrac{k_5 \times w_j}{2} - \dfrac{1}{2}\sum_{i=1}^{I_5} k_5 \times w_i + z \\ y_j = y_{min2} - d_{th} \end{cases},$$

where $k_5$ represents a multiple constant for a long tree, $d_{rw}$ represents a spacing constant between tree subnets in the x-coordinate direction, $d_{th}$ represents a spacing constant between a long tree network element and another network element in the y-coordinate direction, $y_{min2}$ represents a minimum value of a non-long tree network element in the y-coordinate direction, and $I_5$ represents a total quantity of tree subnets in the second network queue.

Step 2045*d*3: Sequence, based on the connection relationship between the tree network elements, a plurality of sub-network elements connected to a same parent network element, to obtain a fifth network element queue.

Optionally, the plurality of sub-network elements connected to a same parent network element, initial sequencing may be randomly performed on the plurality of sub-network elements, and a result obtained after the initial sequencing is adjusted based on widths of the plurality of sub-network elements, to obtain the fifth network element queue. For example, a process of adjusting the result obtained after the initial sequencing may be performed according to a principle of separating a plurality of sub-network elements with a large width.

Step 2046*d*3: Determine location information of any other tree network element based on location information of a parent network element connected to the any other tree network element, a width of the any other tree network element, and location information and a width of another tree network element that is in the fifth network element queue and that is located before the any other tree network element.

Optionally, the location information $(x^f, y^f)$ of the parent network element connected to the any other tree network element, the width $w_t$ of the any other tree network element, the width $w_i$ of the another tree network element that is in the fifth network element queue and that is before the any other tree network element, location information $x^c_{t-1}$ of another network element that is in the fifth network element queue and that is before the any other tree network element in the x-coordinate direction, and location information ($x^c_t$, $y^c_t$) of a $t^{th}$ other network element in the fifth network element queue may meet the following formula:

$$\begin{cases} x^c_t = x^c_{t-1} + \dfrac{k \times w_t}{2} + x^f - \dfrac{1}{2}\sum_{i=1}^{I_6} k \times w_i, \\ y^c_t = y^f - h \end{cases}$$

where $k_5$ represents a multiple constant for a width of a long tree, h represents a height constant of each layer of the tree, and $I_6$ is a total quantity of other tree network elements in the fifth network element queue. When t=1, $x^c_{t-1}$=0.

Step 205: Establish a network topology based on the connection relationship between the plurality of network elements and the location information of each network element.

After the location information of each network element in the network is obtained, the network topology may be visualized based on the location information and the connection relationship between the network elements in the network, which plays an important role in representation and analysis of network networking information. For example, the network topology that is visualized can be used as a critical reference for network resource management, evaluation and analysis, planning and design, rectification, and routine maintenance.

Figure 39:
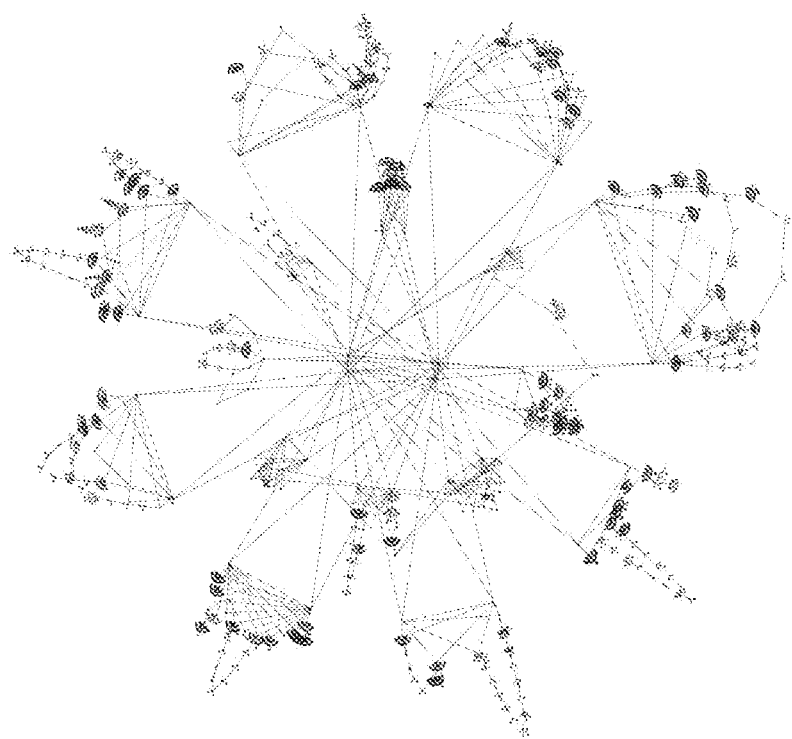
FIG. 39 is a schematic diagram of a network topology according to an example embodiment of this application.

For example, when a plurality of network elements in the network are arranged in the first layout mode, for a schematic diagram of a network topology obtained according to the network topology determining method provided in this embodiment of this application, refer to FIG. 39. As shown in FIG. 39, network elements in the network topology are arranged from inside to outside by using a geometric center of the topology shown in the diagram as a start point. Core network elements in the network topology are arranged on a circle using the geometric center as a circle center, and secondary network elements are arranged on concentric circles that use the geometric center as a center and that include two circles. Some ring network elements are arranged on a curve formed by two parabolic equations that share a same minimum point, and other ring network elements are arranged on an ellipse. Tree network elements are arranged on an arc tree model, and isolated network elements are arranged outside a circular area in which non-isolated network elements are located.

Figure 40:
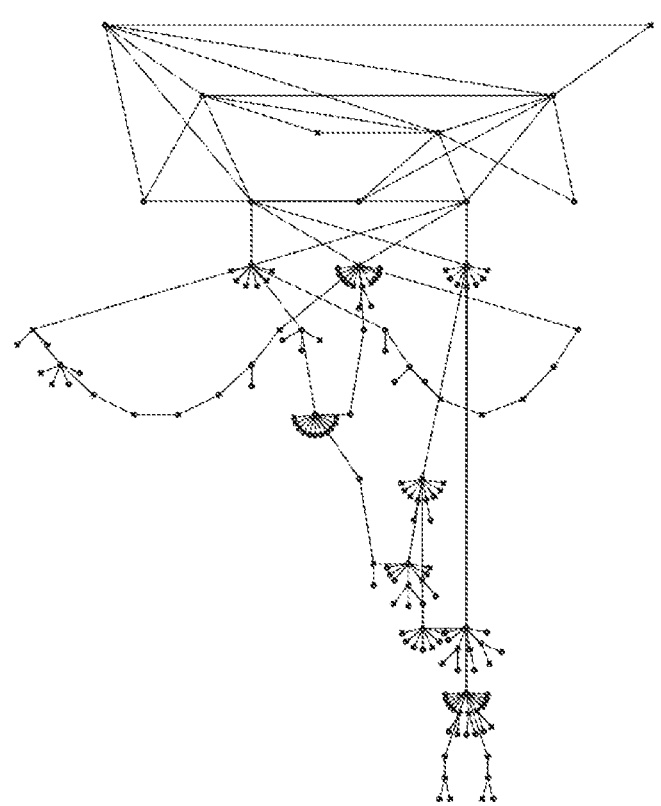
FIG. 40 is a schematic diagram of another network topology according to an example embodiment of this application.

When a plurality of network elements in the network are arranged in the second layout mode, for a schematic diagram of a network topology obtained according to the network topology determining method provided in this embodiment of this application, refer to FIG. 40. As shown in FIG. 40, network elements (as shown by black points) in the network topology are arranged from top to bottom. Core network elements in the network topology are arranged on an arc, and ring network elements are arranged on a single parabola. Tree network elements in a short tree subnet are arranged on an arc tree model, and tree network elements in a long tree subnet are arranged on a straight-line tree model.

It can be learned from both FIG. 39 and FIG. 40 that there is a relatively small quantity of link crossings in the network topology, the network topology has comparatively good symmetry, and the network topology can clearly present a relationship among a network structure, network grades of network elements, and different subnets.

In conclusion, this application provides the network topology determining method. According to the method, a plurality of subnets are determined based on the connection relationship between a plurality of network elements and the network grade of each network element; the location information of each network element is determined in a descending order of network grades of the network elements in the network based on the connection relationship between the network elements in each subnet; and the network topology is established based on the connection relationship between the plurality of network elements and the location information of each network element. Compared with a related technology, in this application, the location information of the network element can be automatically obtained, and the network topology does not need to be manually adjusted. This effectively improves efficiency of obtaining the network topology. In addition, link crossings in the network topology can be effectively reduced, and an initial location of the network element does not need to be preset, so that an obtained network topology result is unique. Further, the obtained network topology can clearly present the relationship among the network structure, the network grades of the network elements, and the different subnets. In addition, during determining of the location information of the network element, all used graphs are graphs with relatively good symmetry, so that the obtained network topology has comparatively good symmetry. In addition, in the process of calculating the location information of the network element, a calculation amount is simplified by using a definite integral, binary iteration, graph parameters solving, coordinate transformation, and the like. This can reduce time consumed in determining the location information of the network element, and resolve problems of non-convergence and low efficiency in a related algorithm.

It should be noted that a sequence of steps in the network topology determining method provided in the embodiments of this application may be properly adjusted, and steps may be correspondingly added or deleted based on a situation. All modified methods that may be readily figured out by any person skilled in the art without departing from the technical scope disclosed in the present application shall fall within the claimed protection scope. Therefore, details are not described.

The following is an apparatus embodiment of this application, and the apparatus embodiment may be configured to perform the method embodiment of this application. For details that are not disclosed in the apparatus embodiments of this application, refer to the method embodiments of this application.

Figure 41:
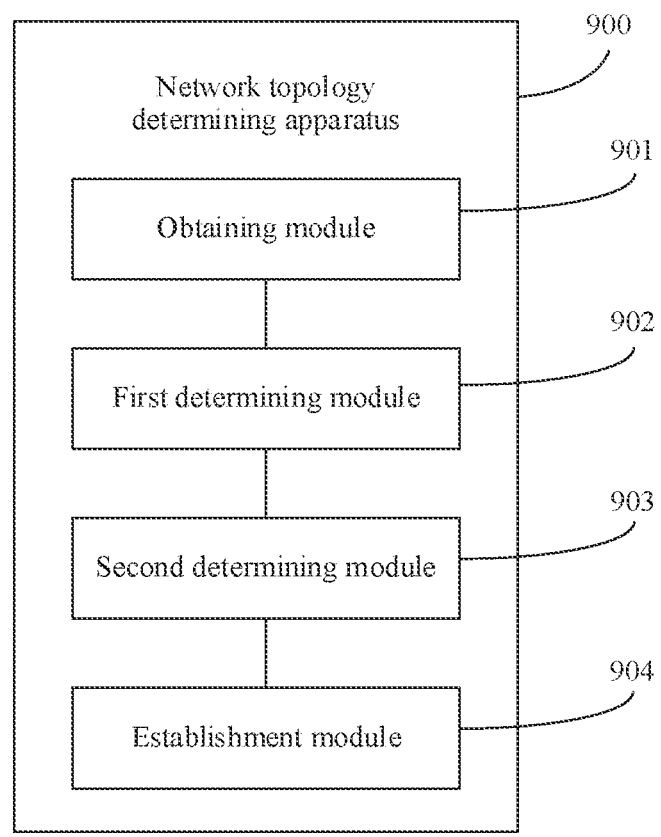
FIG. 41 is a schematic structural diagram of a network topology determining apparatus according to an example embodiment of this application.

FIG. 41 is a block diagram of a network topology determining apparatus 900 according to an example embodiment of this application. As shown in FIG. 41, the apparatus 900 may include:

an obtaining module 901, configured to obtain a connection relationship between a plurality of network elements that are included in a network and a network grade of each network element, where the network grade is used to indicate an importance degree of the network element in the network;

a first determining module 902, configured to determine a plurality of subnets based on the connection relationship between the plurality of network elements and the network grade of each network element;

a second determining module 903, configured to determine location information of each network element in a descending order of network grades of the network elements in the network based on a connection relationship between network elements in each subnet; and an establishment module 904, configured to establish a network topology based on the connection relationship between the plurality of network elements and the location information of each network element.

Optionally, the second determining module 903 is configured to:

sequence a plurality of core network elements that are included in a core subnet, to obtain a first network element queue, where the core network elements are network elements of highest network grades in the plurality of network elements;

obtain a first spacing between every two adjacent core network elements in the first network element queue; and determine location information of each core network element based on the first spacing and a total quantity of core network elements.

Optionally, the plurality of core network elements are arranged on a boundary of a first graph; and when determining the location information of each core network element based on the first spacing and the total quantity of core network elements, the second determining module 903 is configured to:

determine a first fixed-length parameter of the first graph based on the total quantity of core network elements, where the first fixed-length parameter is used to indicate a geometric feature satisfied by points on the first graph; and sequentially determine location information of all core network elements in the first network element queue in order of positions in the first network element queue, where the determining operation is performed based on the first fixed-length parameter and the first spacing.

Optionally, the first graph includes a circle, an ellipse, or a regular polygon.

Optionally, when obtaining the first spacing between every two adjacent core network elements in the first network element queue, the second determining module 903 is configured to: determine the first spacing based on a first total quantity of connected network elements between the two core network elements.

Optionally, the first spacing is represented by a first included angle formed by lines connecting a specified point and the two core network elements; and when determining the first spacing based on the first total quantity of connected network elements between the two core network elements, the second determining module 903 is configured to:

determine a first total quantity proportion of the first total quantity in a second total quantity, where the second total quantity is a total quantity of connected network elements of all the core network elements; and determine a product of the first total quantity proportion and 360 degrees as the first included angle.

Optionally, the second determining module 903 is configured to:

classify a plurality of secondary network elements in a secondary subnet into a plurality of first network element groups based on the connection relationship between the network elements, where the secondary network elements are network elements directly connected to core network elements in the plurality of network elements, and the core network elements are network elements of highest network grades in the plurality of network elements;

sequence at least one secondary network element in each first network element group to obtain a second network element queue;

sequence the plurality of first network element groups to obtain a network element group queue;

determine a layout width of each first network element group based on a third total quantity of connected network elements of all secondary network elements in each first network element group;

determine a layout start location of any first network element group based on the layout width of each first network element group and a position of the any first network element group in the network element group queue; and determine location information of each secondary network element based on the layout width, the layout start location, a total group quantity of the plurality of first network element groups, the second network element queue, the network element group queue, and a total quantity of secondary network elements in each first network element group.

Optionally, the plurality of secondary network elements are arranged on a boundary of at least one second graph; and when determining the location information of each secondary network element based on the layout width, the layout start location, the total group quantity of the plurality of first network element groups, the second network element queue, the network element group queue, and the total quantity of secondary network elements in each first network element group, the second determining module 903 is configured to:

determining, based on a position of the first network element group in which each secondary network element is located in the network element group queue, a second graph on which each secondary network element is located;

determine a second fixed-length parameter of each second graph based on the total quantity of secondary network elements and the total group quantity of the first network element groups, where the second fixed-length parameter is used to indicate a geometric feature satisfied by points on the corresponding second graph; and determine the location information of the secondary network element based on a position of each secondary network element in the second network element queue, the second fixed-length parameter corresponding to the secondary network element, the layout width, the layout start location, and the total quantity of secondary network elements in the first network element group in which each secondary network element is located.

Optionally, each second graph is located outside the first graph corresponding to the core network element.

When the at least one second graph is one second graph, the second graph is a circle, an ellipse, or a regular polygon.

When the at least one second graph is a plurality of second graphs, an overall graph formed by the plurality of second graphs is a graph including concentric circles, a graph including concentric ellipses, or a graph including concentric regular polygons.

Optionally, when sequencing the plurality of first network element groups to obtain the network element group queue, the second determining module 903 is configured to:

perform initial sequencing on the plurality of first network element groups in a descending order of third total quantities corresponding to the first network element groups, to obtain an initial network element group queue; and re-sequence the initial network element group queue in a descending order of target distances corresponding to the first network element groups, to obtain a network element group queue, where the target distance is a distance from a location of the first network element group in the initial network element group queue to a central location of the initial network element group queue.

Optionally, the layout width of each first network element group is represented by a second included angle formed by lines connecting a specified point and two secondary network elements on an outermost side of the first network element group. When determining the layout width of each first network element group based on the third total quantity of connected network elements of all secondary network elements in each first network element group, the second determining module 903 is configured to:

determine a second total quantity proportion of the third total quantity corresponding to any first network element group in a fourth total quantity, where the fourth total quantity is a total quantity of connected network elements of all the secondary network elements in the plurality of first network element groups; and determining the second included angle of the any first network element group based on the second total quantity proportion corresponding to the any first network element group.

Optionally, the layout start location of each first network element group is represented by a layout start angle, and the layout start angle is an offset angle, relative to specified 0 degrees, of a line connecting the layout start location and a specified point. When determining the layout start location of any first network element group based on the layout width of each first network element group and the position of the any first network element group in the network element group queue, the second determining module 903 is configured to:

obtain a layout start angle of the any first network element group based on the position of the any first network element group in the network element group queue and a layout width of another first network element group that is in the network element group queue and that is located before the any first network element group.

Optionally, the second determining module 903 is configured to:

classify at least one ring subnet into at least one second network element group, where network elements in the ring subnet are connected in a ring shape, and the network elements belonging to the ring subnet are ring network elements;

determine a layout width of any ring subnet based on a fifth total quantity of ring subnets in each second network element group;

determine graph parameters of a third graph corresponding to ring network elements in the any ring subnet, where the ring network elements that are included in the any ring subnet are arranged on a boundary of the corresponding third graph, and the graph parameters are used to indicate a geometric feature satisfied by points on the corresponding third graph; and determine location information of each ring network element in the any ring subnet based on a sixth total quantity of connected network elements in the any ring subnet, the corresponding graph parameter, the corresponding layout width, and location information of a start ring network element and an end ring network element in the any ring subnet.

Optionally, when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the second determining module 903 is configured to:

obtain, based on the sixth total quantity of connected network elements in the any ring subnet, the corresponding graph parameters, the corresponding layout width, and the location information of the start ring network element and the end ring network element in the any ring subnet, location information, in a first direction, of each ring network element in the any ring subnet by using a dichotomous iterative algorithm; and determine location information, in a second direction, of any ring network element based on the corresponding graph parameters and the location information of the any ring network element in the first direction.

Optionally, the second determining module 903 is further configured to:

sequence at least one ring subnet in any second network element group based on location information of a start ring network element and an end ring network element in each ring subnet in the any second network element group, to obtain a first network queue.

Correspondingly, when determining the graph parameters of the third graph corresponding to the ring network elements in the any ring subnet, the second determining module 903 is configured to:

determine location information of a first gravity center of any second network element group based on the location information of the start ring network element and the end ring network element in the ring subnet in the any second network element group;

determine, based on the location information of the first gravity center of the any second network element group, the layout width of the any ring subnet, a position of the any ring subnet in the first network queue, and a ring level of the any ring subnet, location information of at least one target ring network element in a ring network element directly connected to the start ring network element and a ring network element directly connected to the end ring network element; and determine the graph parameters based on a function relationship between the location information of the target ring network element corresponding to the any ring subnet and the corresponding third graph.

Optionally, when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the second determining module 903 is configured to:

determine, based on the location information of the start ring network element and the end ring network element in the any ring subnet, a third graph coordinate system corresponding to the any ring subnet; and determine the location information of each ring network element in the any ring subnet based on the sixth total quantity, the third graph coordinate system, and the graph parameters that correspond to the any ring subnet.

Optionally, when determining the location information of each ring network element in the any ring subnet based on the sixth total quantity, the third graph coordinate system, and the graph parameters that correspond to the any ring subnet, the second determining module 903 is configured to:

determine, based on the layout width, the sixth total quantity, and the graph parameters that correspond to the any ring subnet, and a distance between the start ring network element and the end ring network element in the any ring subnet, a target ring network element, from the plurality of ring network elements included in the any ring subnet, that is used as a vertex of the any ring subnet; and determine the location information of each ring network element based on the layout width corresponding to the any ring subnet, a position of the target ring network element in the plurality of ring network elements in the any ring subnet, the distance between the start ring network element and the end ring network element in the any ring subnet, and the third graph coordinate system and graph parameters that correspond to the any ring subnet.

Optionally, when determining, based on the layout width, the sixth total quantity, and the graph parameters that correspond to the any ring subnet, and the distance between the start ring network element and the end ring network element in the any ring subnet, the target ring network element, from the plurality of ring network elements included in the any ring subnet, that is used as a vertex of the any ring subnet, the second determining module 903 is configured to:

determine, based on the graph parameters and the layout width that correspond to the any ring subnet, and the distance between the start ring network element and the end ring network element in the any ring subnet, a first arc length and a second arc length of a third graph corresponding to the any ring subnet, where the first arc length and the second arc length are lengths of arcs located on two sides of a vertex of the third graph; and determine, based on the first arc length and the second arc length that correspond to the any ring subnet and the sixth total quantity corresponding to the any ring subnet, the target ring network element used as the vertex of the any ring subnet.

Optionally, when determining, based on the location information of the start ring network element and the end ring network element in the any ring subnet, the third graph coordinate system corresponding to the any ring subnet, the second determining module 903 is configured to:

determine a midpoint of the start ring network element and the end ring network element in the any ring subnet as a coordinate origin of the third graph coordinate system corresponding to the any ring subnet;

determine a reference graph corresponding to the second network element group in which the any ring subnet is located, where the reference graph is a circle that uses a specified fixed length as a radius and the coordinate origin of the corresponding third graph coordinate system as a circle center;

determine a target intersection point corresponding to the any ring subnet, where the target intersection point is an intersection point between the reference graph corresponding to the second network element group in which the any ring subnet is located and a third connection line of the any ring subnet, and a vertex of the any ring subnet and a specified point are located on the third connection line; and determine a direction of a line connecting the coordinate origin of the corresponding third graph coordinate system and the target intersection point as the second direction of the corresponding third graph coordinate system, and determine a direction perpendicular to the second direction as the first direction of the corresponding third graph coordinate system.

Optionally, when determining, based on the location information of the start ring network element and the end ring network element in the any ring subnet, the third graph coordinate system corresponding to the any ring subnet, the second determining module 903 is configured to:

determine, based on the graph parameters corresponding to the any ring subnet, a first relative location, in the third graph, of a geometric center of the third graph corresponding to the any ring subnet;

determine, based on the first relative location and the layout width that correspond to the any ring subnet, a second relative location that is of the geometric center corresponding to the any ring subnet and that is in a target second network element group in which the any ring subnet is located;

determine, based on the second relative location corresponding to the any ring subnet and location information of a home point, location information of a geometric center corresponding to the any ring subnet, where the home point is a ring network element that exists in each of at least one ring subnet in the target second network element group; and determine the location information of the geometric center corresponding to the any ring subnet as location information of the origin of the corresponding third graph coordinate system, determine a direction of a line connecting the geometric center corresponding to the any ring subnet and the corresponding home point as the first direction of the third graph coordinate system corresponding to the any ring subnet, and determine a direction perpendicular to the first direction as the second direction of the third graph coordinate system corresponding to the any ring subnet.

Optionally, when determining the graph parameters of the third graph corresponding to the ring network elements in the any ring subnet, the second determining module 903 is configured to:

estimate, based on the sixth total quantity corresponding to the any ring subnet, a first perimeter of the third graph corresponding to the any ring subnet;

determine a second perimeter of the third graph according to a perimeter formula of the third graph corresponding to the any ring subnet; and obtain, based on the first perimeter and the second perimeter, the graph parameters corresponding to the any ring subnet.

Optionally, when obtaining, based on the first perimeter and the second perimeter, the graph parameters corresponding to the any ring subnet, the second determining module 903 is configured to:

obtain, based on the first perimeter and the second perimeter that correspond to the any ring subnet, a first sub-parameter in the graph parameters corresponding to the any ring subnet; and determine, based on the first sub-parameter corresponding to the any ring subnet, the layout width corresponding to the any ring subnet, and the distance between the start ring network element and the end ring network element in the any ring subnet, another sub-parameter in the graph parameters corresponding to the any ring subnet, to obtain the graph parameters corresponding to the any ring subnet.

Optionally, when classifying the at least one ring subnet into at least one second network element group, the second determining module 903 is configured to:

classify ring subnets having a same start ring network element and a same end ring network element into a same second network element group, to obtain at least one second network element group.

Optionally, when classifying the at least one ring subnet into at least one second network element group, the second determining module 903 is configured to: classify ring subnets of a same ring level into a same second network element group, to obtain the at least one second network element group.

Optionally, the layout width of the any ring subnet is represented by a third included angle of the any ring subnet. When determining the layout width of the any ring subnet based on the fifth total quantity of ring subnets in each second network element group, the second determining module 903 is configured to: determine a quotient obtained by dividing 180 degrees by the fifth total quantity corresponding to any second network element group as the third included angle occupied by each ring subnet in the any second network element group.

Optionally, the layout width of the any ring subnet is represented by a third included angle of the any ring subnet. When determining the layout width of the any ring subnet based on the fifth total quantity of ring subnets in each second network element group, the second determining module 903 is configured to:

determine a fourth included angle formed by a first connection line and a second connection line, where the first connection line connects a specified point and a start ring network element in the any second network element group, and the second connection line connects the specified point and an end ring network element in the any second network element group; and determine a quotient obtained by dividing the fourth included angle by a target total quantity as a third included angle formed by third connection lines of every two adjacent ring subnets in the any second network element group, where a vertex of the ring subnet and the specified point are located on the third connection line, and the target total quantity is equal to the fifth total quantity corresponding to the any second network element group minus 1.

Optionally, the layout width of the any ring subnet is represented by a third included angle of the any ring subnet. When determining the layout width of the any ring subnet based on the fifth total quantity of ring subnets in each second network element group, the second determining module 903 is configured to: determine the layout width of the any ring subnet based on the sixth total quantity corresponding to the any ring subnet.

Optionally, the second determining module 903 is configured to:

determine a first root network element from a plurality of tree network elements that are included in a tree subnet, where network elements in the tree subnet are connected in a tree shape, and the network elements belonging to the tree subnet are tree network elements;

obtain a layout start location and a layout width of each tree network element; and determine location information of any other tree network element based on a layout start location and a layout width of the any other tree network element and location information of the first root network element, where the other tree network element is a tree network element other than the first root network element in the plurality of tree network elements.

Optionally, the second determining module 903 is further configured to:

obtain a depth of each other network element.

When determining the location information of any other tree network element based on the layout start location and the layout width of the any other tree network element and the location information of the first root network element, the second determining module 903 is configured to:

determine the location information of the any other tree network element based on a depth, the layout start location, and the layout width of the any other tree network element, and the location information of the first root network element.

Optionally, the layout start location of each tree network element is represented by a layout start angle. When obtaining the layout start location of each tree network element, the second determining module 903 is configured to:

determine, based on the location information of the first root network element, a straight line through which the first root network element and a specified point are connected as a target straight line;

and determine an included angle formed by a target ray and a specified straight line as a layout start angle of the first root network element, where the target ray is a ray that is perpendicular to the target straight line and that extends in a direction away from the specified point.

Alternatively, the second determining module 903 is configured to determine that the layout start angle of the first root network element is −180 degrees.

Optionally, the layout start location of each tree network element is represented by a layout start angle. When obtaining the layout start location of each tree network element, the second determining module 903 is configured to:

sequence, based on a connection relationship between the tree network elements, a plurality of sub-network elements connected to a same parent network element, to obtain a third network element queue; and determine a layout start angle of any other tree network element based on a layout start angle, a layout width, and a width of a parent network element connected to the any other tree network element, and a width of another tree network element that is in the third network element queue and that is located before the any other tree network element.

Optionally, the layout width of each tree network element is represented by a fifth included angle. When obtaining the layout width of each tree network element, the second determining module 903 is configured to:

determine, that a fifth included angle of the first root network element is 180 degrees;

and/or determine a fifth included angle of the any other tree network element based on the connection relationship between the tree network elements, the width of the any other tree network element, and a fifth included angle and the width of the parent network element connected to the any other tree network element.

Optionally, the second determining module 903 is further configured to:

sequence second root network elements in all isolated tree subnets to obtain a fourth network element queue, where network elements in the isolated tree subnet are connected in a tree shape, the network elements belonging to the isolated tree subnet are isolated tree network elements, there is no connection path between the isolated tree network element and the core network element, and the core network element is a network element of a highest network grade in the plurality of network elements; and determine location information of any second root network element based on a specified radius, a sum of widths of all the second root network elements, and a sum of widths of other second root network elements that are in the fourth network element queue and that are before the any second root network element.

Optionally, the layout start location of each tree network element is represented by the layout start angle. When obtaining the layout start location of each tree network element, the second determining module 903 is configured to: determine a layout start location of the second root network element based on a width of another second root network element that is in the fourth network element queue and that is located before the any second root network element.

Optionally, the layout width of each tree network element is represented by a fifth included angle. When obtaining the layout width of each tree network element, the second determining module 903 is configured to:

obtain a width of each tree network element based on the connection relationship between the tree network elements; and determine the layout width of each tree network element based on the width of each tree network element.

Optionally, the plurality of other tree network elements connected to the same first root network element are arranged on a circle using the first root network element as a circle center and using the specified length as a radius.

Optionally, the second determining module 903 is configured to:

obtain location information of a second gravity center of an entire network comprising a plurality of tree subnets;

obtain a width of each tree subnet;

sequence the plurality of tree subnets based on location information of a third root network element in each tree subnet, to obtain a second network queue;

determine the location information of the third root network element in any tree subnet based on the width of each tree subnet, the location information of the second gravity center, and a width of another tree subnet that is in the second network queue and that is before the any tree subnet;

sequence, based on the connection relationship between the tree network elements, a plurality of sub-network elements connected to a same parent network element, to obtain a fifth network element queue; and determine location information of any other tree network element based on location information of a parent network element connected to the any other tree network element, a width of the any other tree network element, and location information and a width of another tree network element that is in the fifth network element queue and that is before the any other tree network element.

Optionally, the first determining module 902 is configured to determine, as a core subnet, a network comprising core network elements that are connected, where the core network elements are network elements of highest network grades.

Optionally, the first determining module 902 is configured to:

determine a network, as a ring subnet, formed by other network elements that are connected in a ring shape, where the other network elements are network elements other than the core network element in the network; and/or determine, as a tree subnet, a network comprising other network elements that are connected in a tree shape.

Optionally, network elements in the network topology are arranged from inside to outside in a descending order of network grades by using a network element that is of the highest network grade as a start point.

Optionally, network elements in the network topology are arranged from top to bottom in a descending order of network grades by using a network element that is of the highest network grade as a start point.

In conclusion, this application provides the network topology determining apparatus. The first determining module determines a plurality of subnets based on the connection relationship between a plurality of network elements and the network grade of each network element. The second determining module determines the location information of each network element in a descending order of network grades of the network elements in the network based on the connection relationship between the network elements in each subnet; and the establishment module establishes the network topology based on the connection relationship between the plurality of network elements and the location information of each network element. Compared with a related technology, in this application, the location information of the network element can be automatically obtained, and the network topology does not need to be manually adjusted. This effectively improves efficiency of obtaining the network topology. In addition, link crossings in the network topology can be effectively reduced, and an initial location of the network element does not need to be preset, so that an obtained network topology result is unique. Further, the obtained network topology can clearly present a relationship among a network structure, the network grades of the network elements, and different subnets. In addition, during determining of the location information of the network element, all used graphs are graphs with relatively good symmetry, so that the obtained network topology has comparatively good symmetry. In addition, in a process of calculating the location information of the network element, a calculation amount is simplified by using a definite integral, binary iteration, graph parameter solving, coordinate transformation, and the like. This can reduce time consumed in determining the location information of the network element, and resolve problems of non-convergence and low efficiency in a related algorithm.

It may be clearly understood by a person skilled in the art that, for the purpose of convenient and brief description, for a detailed working process of the foregoing apparatuses, modules, and submodules, refer to a corresponding process in the foregoing method embodiment, and details are not described herein again.

The modules in the foregoing apparatus may be implemented by using software, hardware, or a combination of software and hardware. When at least one module is hardware, the hardware may be a logic integrated circuit module, and may specifically include a transistor, a logic gate array, an algorithm logic circuit, or the like. When the at least one module is software, the software exists in a form of a computer program product and is stored in a computer-readable storage medium. The software may be executed by a processor. In other words, when a computer program product corresponding to the software runs, the software is executed to implement functions of the foregoing modules. Therefore, alternatively, the network topology determining apparatus may be implemented by a processor by executing a software program. This is not limited in this embodiment.

An example embodiment of this application further provides a network topology determining apparatus. For example, the network topology determining apparatus may be a terminal. The network topology determining apparatus includes a processor and a memory. When the processor executes the computer program stored in the memory, the network topology determining apparatus performs the network topology determining method provided in the embodiments of this application. For example, the processor is configured to: obtain a connection relationship between a plurality of network elements that are included in a network and a network grade of each network element, where the network grade is used to indicate an importance degree of the network element in the network; determine a plurality of subnets based on the connection relationship between the plurality of network elements and the network grade of each network element; determine location information of each network element in a descending order of network grades of the network elements in the network based on a connection relationship between network elements in each subnet; and establish a network topology based on the connection relationship between the plurality of network elements and the location information of each network element.

Figure 42:
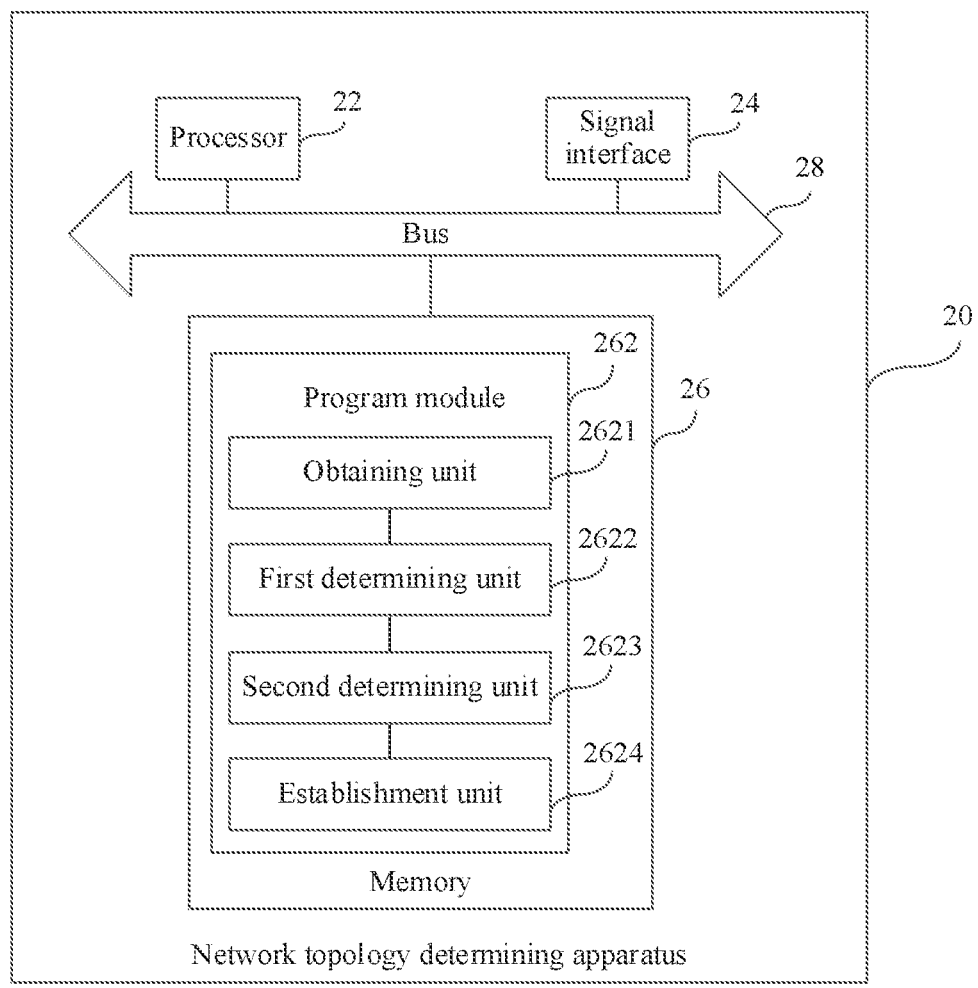
FIG. 42 is a structural block diagram of a network topology determining apparatus according to an example embodiment of this application.

For example, FIG. 42 is a schematic structural diagram of a network topology determining apparatus 20 according to an example embodiment of this application. The network topology determining apparatus 20 may include a processor 22 and a signal interface 24.

The processor 22 includes one or more processing cores. The processor 22 performs various function applications and data processing by running a software program and a module. The processor 22 may be a general purpose processor, for example, a central processing unit (central processing unit, CPU), a forwarding chip, or a combination of a CPU and a forwarding chip. Alternatively, the processor may be a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), generic array logic (generic array logic, GAL), or any combination thereof. The forwarding chip may include a network processor (network processor, NP), an FPGA, or an ASIC.

There may be a plurality of signal interfaces 24. The signal interface 24 is configured to establish a connection to another apparatus or module. For example, the signal interface 24 may be used to connect to a transceiver. Therefore, optionally, the apparatus 20 may further include the transceiver (not shown in the figure). The transceiver specifically performs signal sending and receiving. When the processor 22 needs to perform a signal sending/receiving operation, the processor 22 may invoke or drive the transceiver to perform a corresponding sending/receiving operation. Therefore, when the apparatus 20 performs signal sending and receiving, the processor 22 is configured to determine or initiate a sending and receiving operation, which is equivalent to an initiator. The transceiver is configured to specifically perform sending and receiving, which is equivalent to an executor. The transceiver may alternatively be a transceiver circuit, a radio frequency circuit, or a radio frequency unit. This is not limited in this embodiment.

Optionally, the network topology determining apparatus 20 further includes components such as a memory 26 and a bus 28. The memory 26 and the signal interface 24 each are connected to the processor 22 through the bus 28.

The memory 26 may be configured to store a software program and a module.

Specifically, the memory 26 may store a program module 262 required by at least one function, and the program may be an application program or a driver.

The program module 262 may include:
an obtaining unit 2621 that has a function the same as or similar to that of the obtaining module 901;
a first determining unit 2622 that has a function the same as or similar to that of the first determining module 902;
a second determining unit 2623 that has a function the same as or similar to that of the second determining module 903; and
an establishment unit 2624 that has a function the same as or similar to that of the establishment module 904.

An embodiment of this application further provides a storage medium. The storage medium may be a non-volatile computer readable storage medium. The storage medium stores a computer program, and the computer program indicates a network topology determining apparatus to perform any network topology determining method provided in the embodiments of this application. The storage medium may include: any medium that can store program code, for example, a read-only memory (ROM), a random access memory (RAM), a magnetic disk, or an optical disc.

An embodiment of this application further provides a computer program product including an instruction. When the computer program product runs on a computer, the computer is enabled to perform the network topology determining method provided in the embodiments of this application. The computer program product may include one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium, or may be transmitted by using a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may understand that all or some of the steps in the foregoing embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, improvement, or the like made without departing from the spirit and principle of this application shall fall within the protection scope of this application.

What is claimed is:

1. A network topology determining apparatus, comprising: at least one processor; and a memory, wherein the memory is configured to store a program, and wherein the program, when executed by the at least one processor, causes the network topology determining apparatus to:
    obtain a connection relationship between a plurality of network elements that are comprised in a network and a network grade of each network element, wherein the network grade is used to indicate an importance degree of the network element in the network;
    determine a plurality of subnets based on the connection relationship between the plurality of network elements and the network grade of each network element;
    automatically determine location information of each network element in a descending order of network grades of the plurality of network elements in the network based on a connection relationship between network elements in each subnet;
    establish a network topology based on the connection relationship between the plurality of network elements and the location information of each network element; and
    generating a graph representing the network based on the network topology, wherein the graph displays how the plurality of network elements are interconnected in the network,
        wherein to automatically determine the location information of each network element, the program, when executed by the at least one processor, further causes the network topology determining apparatus to:
        sequence a plurality of core network elements that are comprised in a core subnet of the network, to obtain a first network element queue, wherein the plurality of core network elements comprises network elements of a highest network grade in the plurality of network elements;
        obtain a first spacing between every two adjacent core network elements in the first network element queue; and
        determine location information of each core network element based on the first spacing and a total quantity of the core network elements in the first network element queue.

2. The apparatus according to claim 1, wherein the plurality of core network elements are arranged on a boundary of a first graph; and when determining the location information of each core network element based on the first spacing and the total quantity of the core network elements, the program, when executed by the at least one processor, further causes the network topology determining apparatus to:
    determine a first fixed-length parameter of the first graph based on the total quantity of the core network elements, wherein the first fixed-length parameter is used to indicate a geometric feature satisfied by points on the first graph; and
    sequentially determine location information of all core network elements in the first network element queue in order of positions in the first network element queue, wherein the sequentially determining location information is performed based on the first fixed-length parameter and the first spacing.

3. The apparatus according to claim 1, wherein when obtaining the first spacing between every two adjacent core network elements in the first network element queue, the program, when executed by the at least one processor, further causes the network topology determining apparatus to:
    determine the first spacing based on a first total quantity of connected network elements between the two adjacent core network elements.

4. The apparatus according to claim 3, wherein the first spacing is represented by a first included angle formed by lines connecting a specified point and the two adjacent core network elements; and when determining the first spacing based on the first total quantity of connected network elements between the two adjacent core network elements, the program, when executed by the at least one processor, further causes the network topology determining apparatus to:
    determine a first total quantity proportion of the first total quantity in a second total quantity, wherein the second total quantity is a total quantity of connected network elements of all the core network elements; and
    determine a product of the first total quantity proportion and 360 degrees as the first included angle.

5. The apparatus according to claim 1, wherein the program, when executed by the at least one processor, further causes the network topology determining apparatus to:
    classify a plurality of secondary network elements in a secondary subnet into a plurality of first network element groups based on the connection relationship between the network elements, wherein the secondary network elements are network elements directly connected to the core network elements in the plurality of network elements, and the core network elements are the network elements of the highest network grade in the plurality of network elements;
    sequence at least one secondary network element in each first network element group to obtain a second network element queue;
    sequence the plurality of first network element groups to obtain a network element group queue;
    determine a layout width of each first network element group based on a third total quantity of connected network elements of all secondary network elements in each first network element group;
    determine a layout start location of any first network element group based on the layout width of each first network element group and a position of the any first network element group in the network element group queue; and
    determine location information of each secondary network element based on the layout width, the layout start location, a total group quantity of the plurality of first network element groups, the second network element queue, the network element group queue, and a total quantity of secondary network elements in each first network element group.

6. The apparatus according to claim 5, wherein the plurality of secondary network elements are arranged on a boundary of at least one second graph; and when determining the location information of each secondary network element based on the layout width, the layout start location, the total group quantity of the plurality of first network element groups, the second network element queue, the network element group queue, and the total quantity of secondary network elements in each first network element group, the program, when executed by the at least one processor, further causes the network topology determining apparatus to:

determine, based on a position of the first network element group in which each secondary network element is located in the network element group queue, a second graph on which each secondary network element is located;

determine a second fixed-length parameter of each second graph based on the total quantity of secondary network elements and the total group quantity of the first network element groups, wherein the second fixed-length parameter is used to indicate a geometric feature satisfied by points on the corresponding second graph; and determine the location information of the secondary network element based on a position of each secondary network element in the second network element queue, the second fixed-length parameter corresponding to the secondary network element, the layout width, the layout start location, and the total quantity of secondary network elements in the first network element group in which each secondary network element is located.

7. The apparatus according to claim 5, wherein the layout width of each first network element group is represented by a second included angle formed by lines connecting a specified point and two secondary network elements on an outermost side of the first network element group; and when determining the layout width of each first network element group based on the third total quantity of connected network elements of the secondary network elements in each first network element group, the program, when executed by the at least one processor, further causes the network topology determining apparatus to:

determine a second total quantity proportion of the third total quantity corresponding to any first network element group in a fourth total quantity, wherein the fourth total quantity is a total quantity of connected network elements of all the secondary network elements in the plurality of first network element groups; and determine the second included angle of the any first network element group based on the second total quantity proportion corresponding to the any first network element group.

8. The apparatus according to claim 5, wherein the layout start location of each first network element group is represented by a layout start angle; the layout start angle is an offset angle, relative to a specified 0 degree, of a line connecting the layout start location and a specified point; and when determining a layout start location of any first network element group based on the layout width of each first network element group and a position of the any first network element group in the network element group queue, the program, when executed by the at least one processor, further causes the network topology determining apparatus to:

obtain a layout start angle of the any first network element group based on the position of the any first network element group in the network element group queue and a layout width of another first network element group that is in the network element group queue and that is before the any first network element group.

9. The apparatus according to claim 1, wherein the program, when executed by the at least one processor, further causes the network topology determining apparatus to:

classify at least one ring subnet into at least one second network element group, wherein network elements in the ring subnet are connected in a ring shape, and the network elements belonging to the ring subnet are ring network elements;

determine a layout width of any ring subnet based on a fifth total quantity of ring subnets in each second network element group;

determine graph parameters of a third graph corresponding to the ring network elements in the any ring subnet, wherein the ring network elements that are comprised in the any ring subnet are arranged on a boundary of the corresponding third graph, and the graph parameters are used to indicate a geometric feature satisfied by points on the corresponding third graph; and determine location information of each ring network element in the any ring subnet based on a sixth total quantity of connected network elements in the any ring subnet, the corresponding graph parameters, the corresponding layout width, and location information of a start ring network element and an end ring network element in the any ring subnet.

10. The apparatus according to claim 9, wherein when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the program, when executed by the at least one processor, further causes the network topology determining apparatus to:

obtain, based on the sixth total quantity of connected network elements in the any ring subnet, the corresponding graph parameters, the corresponding layout width, and the location information of the start ring network element and the end ring network element in the any ring subnet, location information, in a first direction, of each ring network element in the any ring subnet by using a dichotomous iterative algorithm; and determine location information, in a second direction, of any ring network element based on the corresponding graph parameters and the location information of the any ring network element in the first direction, wherein the second direction is perpendicular to the first direction.

11. The apparatus according to claim 9, wherein the program, when executed by the at least one processor, further causes the network topology determining apparatus to:

sequence at least one ring subnet in any second network element group based on location information of a start ring network element and an end ring network element in each ring subnet in the any second network element group, to obtain a first network queue; and when determining the graph parameters of the third graph corresponding to the ring network elements in the any ring subnet, the program, when executed by the at least one processor, further causes the network topology determining apparatus to:

determine location information of a first gravity center of any second network element group based on the location information of the start ring network element and the end ring network element in the ring subnet in the any second network element group;

determine, based on the location information of the first gravity center of the any second network element group, the layout width of the any ring subnet, a position of the any ring subnet in the first network queue, and a ring level of the any ring subnet, location information of at least one target ring network element in a ring network element directly connected to the start ring network element and a ring network element directly connected to the end ring network element; and determine the graph parameters based on a function relationship between the location information of the target ring network element corresponding to the any ring subnet and the corresponding third graph.

12. The apparatus according to claim 9, wherein when determining the location information of each ring network element in the any ring subnet based on the sixth total quantity of connected network elements in the any ring subnet, the corresponding graph parameters, the corresponding layout width, and the location information of the start ring network element and the end ring network element in the any ring subnet, the program, when executed by the at least one processor, further causes the network topology determining apparatus to:

determine, based on the location information of the start ring network element and the end ring network element in the any ring subnet, a third graph coordinate system corresponding to the any ring subnet; and determine the location information of each ring network element in the any ring subnet based on the sixth total quantity, the third graph coordinate system, and the graph parameters that correspond to the any ring subnet.

13. The apparatus according to claim 12, wherein when determining the location information of each ring network element in the any ring subnet based on the sixth total quantity, the third graph coordinate system, and the graph parameters that correspond to the any ring subnet, the program, when executed by the at least one processor, further causes the network topology determining apparatus to:

determine, based on the layout width, the corresponding sixth total quantity, and the corresponding graph parameters that correspond to the any ring subnet, and a distance between the start ring network element and the end ring network element in the any ring subnet, a target ring network element, from the plurality of ring network elements comprised in the any ring subnet, that is used as a vertex of the any ring subnet; and determine the location information of each ring network element based on the layout width corresponding to the any ring subnet, a position of the target ring network element in the plurality of ring network elements in the any ring subnet, the distance between the start ring network element and the end ring network element in the any ring subnet, and the third graph coordinate system and graph parameters that correspond to the any ring subnet.

14. The apparatus according to claim 1, wherein to determine the location information of each network element, the program, when executed by the at least one processor, further causes the network topology determining apparatus to:

determine a first root network element from a plurality of tree network elements that are comprised in a tree subnet of the network, wherein network elements in the tree subnet are connected in a tree shape, and the network elements belonging to the tree subnet are tree network elements;

obtain a layout start location and a layout width of each tree network element; and determine location information of any other tree network element based on a layout start location and a layout width of the any other tree network element and location information of the first root network element, wherein the any other tree network element is a tree network element other than the first root network element in the plurality of tree network elements.

15. The apparatus according to claim 1, wherein the program, when executed by the at least one processor, further causes the network topology determining apparatus to:

obtain location information of a second gravity center of an entire network comprising a plurality of tree subnets;

obtain a width of each tree subnet;

sequence the plurality of tree subnets based on location information of a third root network element in each tree subnet, to obtain a second network queue;

determine the location information of the third root network element in any tree subnet based on the width of each tree subnet, the location information of the second gravity center, and a width of another tree subnet that is in the second network queue and that is before the any tree subnet;

sequence, based on the connection relationship between the tree network elements, a plurality of sub-network elements connected to a same parent network element, to obtain a fifth network element queue; and determine location information of any other tree network element based on location information of a parent network element connected to the any other tree network element, a width of the any other tree network element, and location information and a width of another tree network element that is in the fifth network element queue and that is before the any other tree network element.

16. The apparatus according to claim 1, wherein the program, when executed by the at least one processor, further causes the network topology determining apparatus to:

determine, as the core subnet, a first network comprising the core network elements that are connected, wherein the core network elements are the network elements of the highest network grade.

17. The apparatus according to claim 1, wherein network elements in the network topology are arranged from inside to outside in a descending order of network grades by using a network element that is of the highest network grade as a start point.

18. The apparatus according to claim 1, wherein network elements in the network topology are arranged from top to bottom in a descending order of network grades by using a network element that is of the highest network grade as a start point.

19. A network topology determining method performed by a network topology determining apparatus comprising: at least one processor and a memory, wherein the memory stores a program, and the program, when executed by the at least one processor, causes the network topology determining apparatus to perform the method comprising:

obtaining a connection relationship between a plurality of network elements that are comprised in a network and a network grade of each network element, wherein the network grade is used to indicate an importance degree of the network element in the network;

determining a plurality of subnets based on the connection relationship between the plurality of network elements and the network grade of each network element;

automatically determining location information of each network element in a descending order of network grades of the network elements in the network based on a connection relationship between network elements in each subnet;

establishing a network topology based on the connection relationship between the plurality of network elements and the location information of each network element; and generating a graph representing the network based on the network topology, wherein the graph displays how the plurality of network elements are interconnected in the network, and wherein the automatically determining location information of each network element comprises:

sequencing a plurality of core network elements that are comprised in a core subnet of the network, to obtain a first network element queue, wherein the plurality of core network elements comprises network elements of a highest network grade in the plurality of network elements;

obtaining a first spacing between every two adjacent core network elements in the first network element queue; and determining location information of each core network element based on the first spacing and a total quantity of the core network elements in the first network element queue.

* * * * *

UNITED STATES PATENT AND TRADEMARK OFFICE
CERTIFICATE OF CORRECTION

PATENT NO. : 11,929,905 B2
APPLICATION NO. : 17/337694
DATED : March 12, 2024
INVENTOR(S) : Hualin Huang et al.

Page 1 of 1

It is certified that error appears in the above-identified patent and that said Letters Patent is hereby corrected as shown below:

In the Claims

In Column 71, Lines 6-7, in Claim 1, delete "comprising:" and insert -- comprising --.

In Column 71, Line 7, in Claim 1, delete "processor;" and insert -- processor --.

Signed and Sealed this
Twenty-first Day of May, 2024

Katherine Kelly Vidal
*Director of the United States Patent and Trademark Office*